US010991980B2

(12) United States Patent
Hiasa et al.

(10) Patent No.: US 10,991,980 B2
(45) Date of Patent: Apr. 27, 2021

(54) ELECTROLYTIC SOLUTION FOR SECONDARY BATTERY, SECONDARY BATTERY, BATTERY PACK, ELECTRICALLY-DRIVEN VEHICLE, ELECTRIC POWER STORAGE SYSTEM, ELECTRICALLY-DRIVEN TOOL, AND ELECTRONIC DEVICE

(71) Applicant: MURATA MANUFACTURING CO., LTD., Kyoto (JP)

(72) Inventors: Takumi Hiasa, Kyoto (JP); Toru Odani, Kyoto (JP); Kazumasa Takeshi, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 83 days.

(21) Appl. No.: 16/411,926

(22) Filed: May 14, 2019

(65) Prior Publication Data
US 2019/0267672 A1    Aug. 29, 2019

Related U.S. Application Data

(63) Continuation of application No. PCT/JP2017/036642, filed on Oct. 10, 2017.

(30) Foreign Application Priority Data

Nov. 15, 2016    (JP) ............................. JP2016-222239

(51) Int. Cl.
| | | |
|---|---|---|
| *H01M 10/0567* | (2010.01) | |
| *H01M 10/0525* | (2010.01) | |
| *H01M 10/42* | (2006.01) | |
| *H01M 4/38* | (2006.01) | |
| *H01M 4/587* | (2010.01) | |
| *H01M 10/48* | (2006.01) | |
| *H01M 10/0566* | (2010.01) | |
| *H01M 10/052* | (2010.01) | |
| *H01M 10/44* | (2006.01) | |
| *H01M 50/20* | (2021.01) | |
| *H01M 4/02* | (2006.01) | |

(52) U.S. Cl.
CPC ......... *H01M 10/0567* (2013.01); *H01M 4/38* (2013.01); *H01M 4/386* (2013.01); *H01M 4/387* (2013.01); *H01M 4/587* (2013.01); *H01M 10/052* (2013.01); *H01M 10/0525* (2013.01); *H01M 10/0566* (2013.01); *H01M 10/425* (2013.01); *H01M 10/44* (2013.01); *H01M 10/48* (2013.01); *H01M 50/20* (2021.01); *H01M 2004/027* (2013.01); *H01M 2010/4271* (2013.01); *H01M 2300/0025* (2013.01); *Y02E 60/10* (2013.01); *Y02T 10/70* (2013.01)

(58) Field of Classification Search
CPC .......... H01M 10/052; H01M 10/0525; H01M 10/0566; H01M 10/0567; H01M 10/425; H01M 10/44; H01M 10/48; H01M 2004/027; H01M 2010/4271; H01M 2220/20; H01M 2220/30; H01M 2300/0025; H01M 2/10; H01M 4/38; H01M 4/386; H01M 4/387; H01M 4/587
See application file for complete search history.

(56) References Cited

U.S. PATENT DOCUMENTS

| | | | | |
|---|---|---|---|---|
| 5,731,106 | A * | 3/1998 | Tsutsumi | ......... H01M 10/0567 429/332 |
| 6,472,100 | B1 * | 10/2002 | Maruta | ................. H01M 4/485 429/218.1 |
| 2006/0016472 | A1 | 1/2006 | Park et al. | |
| 2011/0129738 | A1 | 6/2011 | Kawashima | |
| 2012/0171576 | A1 | 7/2012 | Tsai et al. | |
| 2013/0004859 | A1 | 1/2013 | Yu et al. | |

FOREIGN PATENT DOCUMENTS

| | | |
|---|---|---|
| JP | H1050344 A | 2/1998 |
| JP | H10189007 A | 7/1998 |
| JP | H10189008 A | 7/1998 |
| JP | 2002359002 A | 12/2002 |
| JP | 2003092137 A | 3/2003 |
| JP | 2006012848 A | 1/2006 |
| JP | 2011119097 A | 6/2011 |
| JP | 2012142260 A | 7/2012 |
| JP | 2013016488 A | 1/2013 |

OTHER PUBLICATIONS

International Search Report for Application No. PCT/JP2017/036642, dated Nov. 21, 2017.

* cited by examiner

*Primary Examiner* — Carlos Barcena
(74) *Attorney, Agent, or Firm* — K&L Gates LLP

(57) ABSTRACT

The secondary battery includes a positive electrode, a negative electrode, and an electrolytic solution including at least one kind of cyclic nitrogen compounds and at least one of a first nitrile compound and a second nitrile compound.

18 Claims, 6 Drawing Sheets

ELECTROLYTIC SOLUTION FOR SECONDARY BATTERY, SECONDARY BATTERY, BATTERY PACK, ELECTRICALLY-DRIVEN VEHICLE, ELECTRIC POWER STORAGE SYSTEM, ELECTRICALLY-DRIVEN TOOL, AND ELECTRONIC DEVICE

CROSS REFERENCE TO RELATED APPLICATIONS

The present application is a continuation of PCT patent application no. PCT/JP2017/036642, filed on Oct. 10, 2017, which claims priority to Japanese patent application no. JP2016-222239 filed on Nov. 15, 2016, the entire contents of which are being incorporated herein by reference.

BACKGROUND

The present technology generally relates to an electrolytic solution to be used in a secondary battery, a secondary battery using the electrolytic solution, and a battery pack, an electrically-driven vehicle, an electric power storage system, an electrically-driven tool, and an electronic device using the secondary battery.

Various electronic devices such as mobile phones and personal digital assistants (PDAs) are widely spread, and there is a demand for miniaturization, weight saving, and long service life of the electronic devices. Hence, development of batteries, particularly secondary batteries which are compact, lightweight, and capable of providing a high energy density as an electric power source is under way.

Application of secondary batteries is not limited to the above-mentioned electronic devices, but other applications of secondary batteries are also investigated. Examples thereof may include battery packs to be detachably mounted on electronic devices and the like, electrically-driven vehicles such as electric vehicles, electric power storage systems such as electric power servers for home use, and electrically-driven tools such as electric drills.

These secondary batteries include an electrolytic solution together with a positive electrode and a negative electrode. The composition of electrolytic solution greatly affects the battery characteristics, and thus various investigations on the composition of electrolytic solution have been carried out.

Specifically, in order to improve the cycle characteristics and the like, 1,3,5-triazine and the like are contained in electrolytic solutions.

SUMMARY

Electronic devices and the like are increasingly equipped with higher performance and multi-functionalized. Hence, the frequency of use of electronic devices and the like is increasing as well as the use environment of the electronic devices and the like is expanding. Accordingly, there is still room for improvement in the battery characteristics of the secondary battery.

Consequently, it is desirable to provide an electrolytic solution for secondary battery capable of providing excellent battery characteristics, a secondary battery, a battery pack, an electrically-driven vehicle, an electric power storage system, an electrically-driven tool, and an electronic device.

According to an embodiment of the present technology, an electrolytic solution for a secondary battery is provided. The electrolytic solution includes at least one kind of cyclic nitrogen compounds represented by chemical formulas (1) to (6) and at least one of a first nitrile compound represented by chemical formula (7) and a second nitrile compound represented by chemical formula (8).

[chemical formulas (1) to (6)]

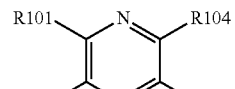

(1)

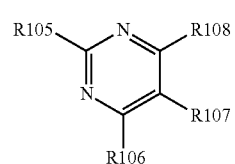

(2)

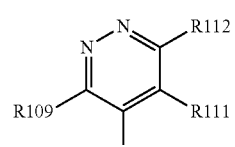

(3)

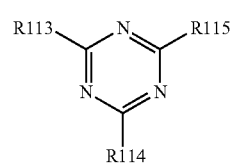

(4)

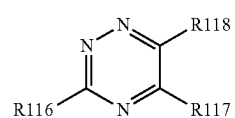

(5)

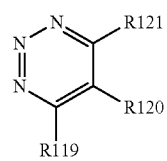

(6)

($R101$ to $R121$ each represent one of a hydrogen group, a halogen group, a monovalent hydrocarbon group, a monovalent halogenated hydrocarbon group, or a monovalent group in which two or more kinds of these groups are bonded to each other.)

[chemical formula (7)]

$R122\text{-}(\text{—CN})_n$ (7)

($R122$ represents one of an n-valent hydrocarbon group, an n-valent halogenated hydrocarbon group, an n-valent oxygen-containing group, an n-valent nitrogen-containing group, an n-valent sulfur-containing group, an n-valent phosphorus-containing group, or an n-valent group in which two or more kinds of these groups are bonded to each other, and n represents an integer of 1 or more.)

[chemical formula (8)]

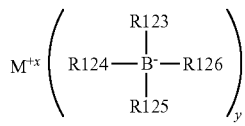

(M represents a metal element. R123 to R126 each represent any of a hydrogen group, a halogen group, a nitrile group (—CN), a monovalent hydrocarbon group, a monovalent halogenated hydrocarbon group, a monovalent oxygen-containing group, a monovalent nitrogen-containing group, a monovalent sulfur-containing group, a monovalent phosphorus-containing group, or a monovalent group in which two or more kinds of these groups are bonded to each other, at least one of R123 to R126 represents one of a nitrile group, a monovalent group in which a nitrile group and a monovalent hydrocarbon group are bonded to each other, a monovalent group in which a nitrile group and a monovalent halogenated hydrocarbon group are bonded to each other, a monovalent group in which a nitrile group and a monovalent oxygen-containing group are bonded to each other, a monovalent group in which a nitrile group and a monovalent nitrogen-containing group are bonded to each other, a monovalent group in which a nitrile group and a monovalent sulfur-containing group are bonded to each other, a monovalent group in which a nitrile group and a monovalent phosphorus-containing group are bonded to each other, or a monovalent group in which two or more kinds of these groups are bonded to each other, x and y each represent an integer of 1 or more.)

According to an embodiment of the present technology, a secondary battery is provided. The secondary battery includes a positive electrode, a negative electrode, and an electrolytic solution, and this electrolytic solution has the same configuration as that of the electrolytic solution for secondary battery according to an embodiment of the present technology as described herein.

A battery pack, an electrically-driven vehicle, an electric power storage system, an electrically-driven tool, and an electronic device according to an embodiment of the present technology each include a secondary battery, and the secondary battery has the same configuration as that of the secondary battery of an embodiment of the present technology as described herein.

Here, the "monovalent hydrocarbon group" is a generic term for monovalent groups composed of carbon (C) and hydrogen (H). This monovalent hydrocarbon group may be linear, branched having one or two or more branches, cyclic, or in a state in which two or more kinds thereof are bonded to each other. In addition, the monovalent hydrocarbon group may contain one or two or more unsaturated carbon-to-carbon bonds or may not contain the unsaturated carbon-to-carbon bond. This unsaturated carbon-to-carbon bond is either or both of a carbon-to-carbon double bond and a carbon-to-carbon triple bond. The "monovalent halogenated hydrocarbon group" is a group in which at least one hydrogen group in the monovalent hydrocarbon groups described above has been substituted with a halogen group.

The "n-valent hydrocarbon group" is a generic term for groups in which n hydrogen groups have been eliminated from a compound (hydrocarbon) composed of carbon and hydrogen. Details on the n-valent hydrocarbon group are the same as those of the monovalent hydrocarbon group described above except that the valence is different from each other. The "n-valent halogenated hydrocarbon group" is a group in which at least one hydrogen group in the n-valent hydrocarbon group described above has been substituted with a halogen group. The "n-valent oxygen-containing group" is a generic term for n-valent groups containing oxygen (O) as a constituent element. The "n-valent nitrogen-containing group" is a generic term for n-valent groups containing nitrogen (N) as a constituent element. The "n-valent sulfur-containing group" is a generic term for n-valent groups containing sulfur (S) as a constituent element. The "n-valent phosphorus-containing group" is a generic term for n-valent groups containing phosphorus (P) as a constituent element.

The "monovalent oxygen-containing group" is a generic term for monovalent groups containing oxygen as a constituent element. The "monovalent nitrogen-containing group" is a generic term for monovalent groups containing nitrogen as a constituent element. The "monovalent sulfur-containing group" is a generic term for monovalent groups containing sulfur as a constituent element. The "monovalent phosphorus-containing group" is a generic term for monovalent groups containing phosphorus as a constituent element.

According to the electrolytic solution for batteries or a secondary battery of an embodiment of the present technology, excellent battery characteristics can be obtained since the electrolytic solution contains at least one kind of cyclic nitrogen compounds and at least either of a first nitrile compound or a second nitrile compound. In addition, the same effect can be obtained in the battery pack, electrically-driven vehicle, electric power storage system, electrically-driven tool, and electronic device according to an embodiment of the present technology.

In addition, the effects described here are not necessarily limited but may be any of the effects described in the present technology.

DETAILED DESCRIPTION

Figure 1:
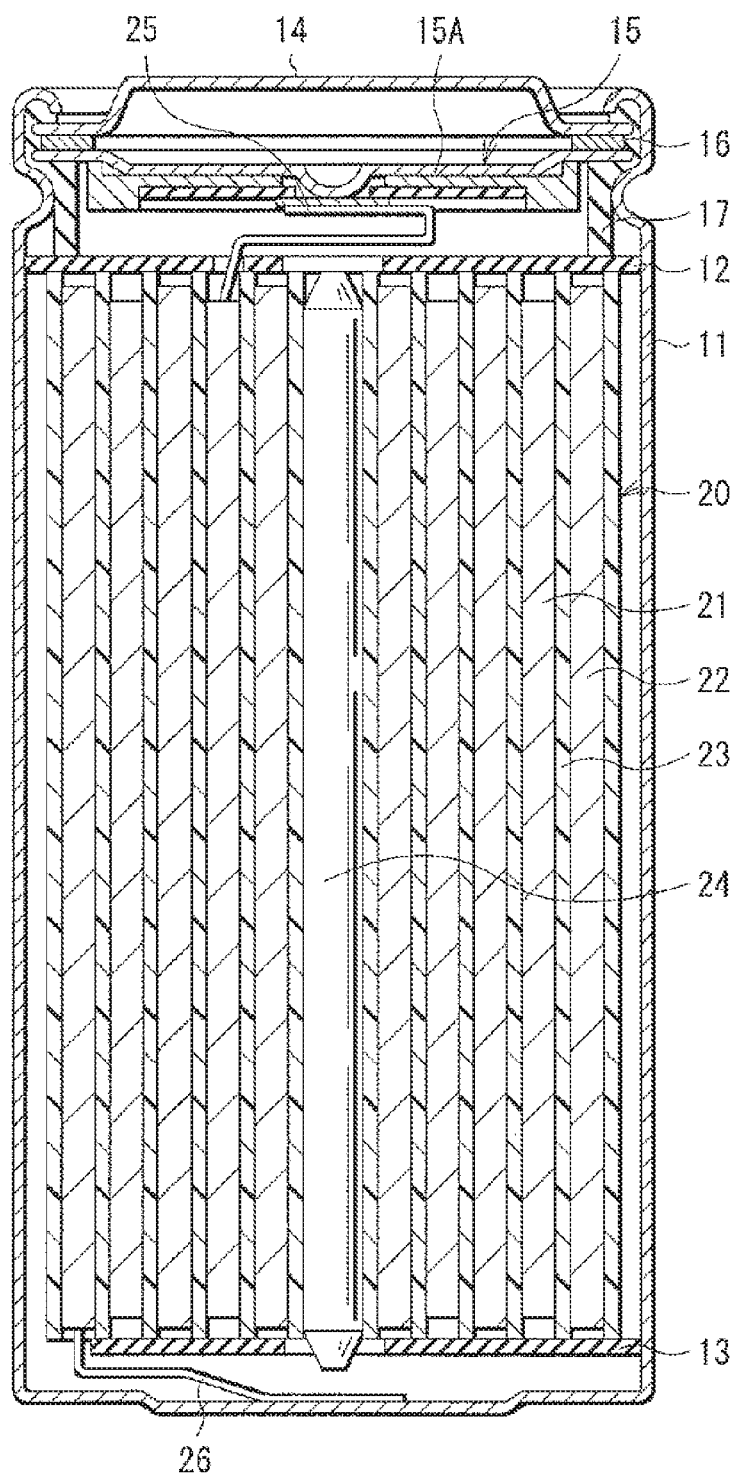
FIG. 1 is a cross-sectional view which illustrates a configuration of a (cylindrical type) secondary battery according to an embodiment of the present technology.

As described herein, the present disclosure will be described based on examples with reference to the drawings, but the present disclosure is not to be considered limited to the examples, and various numerical values and materials in the examples are considered by way of example.

First, an electrolytic solution for secondary battery according to an embodiment of the present technology will be described.

The electrolytic solution for secondary battery (hereinafter, simply referred to as "electrolytic solution") described here is used in, for example, secondary batteries such as a lithium ion secondary battery. However, the kind of secondary battery in which the electrolytic solution is used is not limited to a lithium ion secondary battery.

The electrolytic solution contains a nitrile compound together with a cyclic nitrogen compound. This nitrile compound is either or both of a first nitrile compound and a second nitrile compound.

In other words, the electrolytic solution may contain only the first nitrile compound together with a cyclic nitrogen compound, only the second nitrile compound together with a cyclic nitrogen compound, or both of the first nitrile compound and the second nitrile compound together with a cyclic nitrogen compound.

The kind of cyclic nitrogen compound may be only one kind or two or more kinds. In the same manner, the kind of first nitrile compound may be only one kind or two or more kinds as well as the kind of second nitrile compound may be only one kind or two or more kinds.

The cyclic nitrogen compound is a compound each represented by the following chemical formulas (1) to (6). The first nitrile compound is a compound represented by the following chemical formula (7). The second nitrile compound is a compound represented by the following chemical formula (8).

[chemical formulas (1) to (6)]

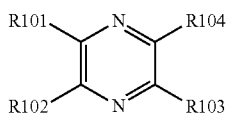
(1)

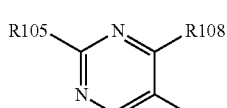
(2)

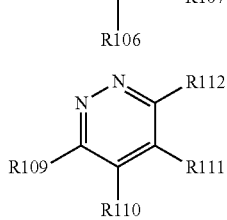
(3)

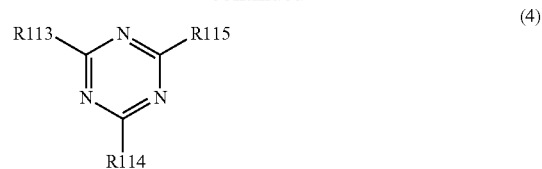
(4)

(5)

(6)

(R101 to R121 each represent any of a hydrogen group, a halogen group, a monovalent hydrocarbon group, a monovalent halogenated hydrocarbon group, or a monovalent group in which two or more kinds of these groups are bonded to each other.)

[chemical formula (7)]

R122$(\text{—CN})_n$ (7)

(R122 represents any of an n-valent hydrocarbon group, an n-valent halogenated hydrocarbon group, an n-valent oxygen-containing group, an n-valent nitrogen-containing group, an n-valent sulfur-containing group, an n-valent phosphorus-containing group, or a divalent group in which two or more kinds of these groups are bonded to each other. n represents an integer of 1 or more.)

[chemical formula (8)]

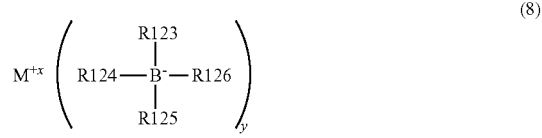
(8)

(M represents a metal element. R123 to R126 each represent any of a hydrogen group, a halogen group, a nitrile group, a monovalent hydrocarbon group, a monovalent halogenated hydrocarbon group, a monovalent oxygen-containing group, a monovalent nitrogen-containing group, a monovalent sulfur-containing group, a monovalent phosphorus-containing group, or a monovalent group in which two or more kinds of these groups are bonded to each other. Provided that at least one of R123 to R126 represents any of a nitrile group, a monovalent group in which a nitrile group and a monovalent hydrocarbon group are bonded to each other, a monovalent group in which a nitrile group and a monovalent halogenated hydrocarbon group are bonded to each other, a monovalent group in which a nitrile group and a monovalent oxygen-containing group are bonded to each other, a monovalent group in which a nitrile group and a monovalent nitrogen-containing group are bonded to each other, a monovalent group in which a nitrile group and a monovalent sulfur-containing group are bonded to each other, a monovalent group in which a nitrile group and a monovalent phosphorus-containing group are bonded to each other, or a monovalent group in which two or more kinds of these groups are bonded to each other. x and y each represent an integer of 1 or more.)

In the following description, in order to distinguish the six kinds of cyclic nitrogen compounds described above from one another, the compound represented by the formula (1) is referred to as the "first cyclic nitrogen compound", the compound represented by the formula (2) as the "second cyclic nitrogen compound", the compound represented by the formula (3) as the "third cyclic nitrogen compound", the compound represented by the formula (4) as the "fourth cyclic nitrogen compound", the compound represented by the formula (5) as the "fifth cyclic nitrogen compound", and the compound represented by the formula (6) as the "sixth cyclic nitrogen compound". In addition, the six kinds of cyclic nitrogen compounds described above are collectively referred to as the "cyclic nitrogen compounds".

Detailed configurations of the cyclic nitrogen compounds, first nitrile compound, and second nitrile compound will be described later.

The reason why the electrolytic solution contains the nitrile compound together with the cyclic nitrogen compound is because the chemical stability of the electrolytic solution is specifically improved by the synergistic action of the cyclic nitrogen compound and the nitrile compound. The decomposition reaction of the electrolytic solution is remarkably suppressed by this, and the battery characteristics of a secondary battery using the electrolytic solution are thus improved. In this case, the decomposition reaction of the electrolytic solution is sufficiently suppressed even when the secondary battery is used (charged and discharged) particularly in a severe environment such as a high temperature environment as well as the secondary battery is preserved in the same environment, and the battery characteristics are thus greatly improved.

As apparent from the chemical formulas (1) to (6), the cyclic nitrogen compound contains a nitrogen-based heterocyclic aromatic compound as a skeleton. This nitrogen-based heterocyclic aromatic compound has an unsaturated six-membered ring structure containing two or three nitrogen atoms as a constituent element.

Specifically, the first cyclic nitrogen compound contains pyrazine as a skeleton, and the pyrazine contains two nitrogen atoms as a constituent element. The second cyclic nitrogen compound contains pyrimidine as a skeleton, and the pyrimidine contains two nitrogen atoms as a constituent element. The third cyclic nitrogen compound contains pyridazine as a skeleton, and the pyridazine contains two nitrogen atoms as a constituent element.

The fourth cyclic nitrogen compound contains 1,3,5-triazine as a skeleton, and the 1,3,5-triazine contains three nitrogen atoms as a constituent element. The fifth cyclic nitrogen compound contains 1,2,4-triazine as a skeleton, and the 1,2,4-triazine contains three nitrogen atoms as a constituent element. The sixth cyclic nitrogen compound contains 1,2,3-triazine as a skeleton, and the 1,2,3-triazine contains three nitrogen atoms as a constituent element.

Details on the configuration of the cyclic nitrogen compounds are as described below.

R101 to R121 each represent any of a hydrogen group, a halogen group, a monovalent hydrocarbon group, a monovalent halogenated hydrocarbon group, or a monovalent bonding group as described above. This "monovalent bonding group" is a monovalent group in which two or more kinds among the hydrogen group, halogen group, monovalent hydrocarbon group, and monovalent halogenated hydrocarbon group described above are bonded to each other.

R101 to R104 in the chemical formula (1) may each represent the same kind or different kinds. Of course, only some of R101 to R104 may represent the same kind. Here, the description on each of R101 to R104 also applies to each of R105 to R108 in the chemical formula (2), each of R109 to R112 in the chemical formula (3), each of R113 to R115 in the chemical formula (4), each of R116 to R118 in the chemical formula (5), and each of R119 to R121 in the chemical formula (6).

The kind of halogen group is not particularly limited, but it is, for example, a fluorine group, a chlorine group, a bromine group, or an iodine group, and it may be a group other than these.

Among these, the halogen group is preferably a fluorine group. This is because the chemical stability of the electrolytic solution is further improved while securing the solubility and compatibility of the cyclic nitrogen compound.

The "monovalent hydrocarbon group" is a generic term for monovalent groups composed of carbon and hydrogen as described above. This monovalent hydrocarbon group may be linear, branched having one or two or more branches, cyclic, or in a state in which two or more kinds thereof are bonded to each other. Incidentally, in a case in which the monovalent hydrocarbon group has two or more branches, the branches may be bonded to each other to form one or two or more rings. In addition, the monovalent hydrocarbon group may contain one or two or more unsaturated carbon-to-carbon bonds or may not contain the unsaturated carbon-to-carbon bond. This unsaturated carbon-to-carbon bond is, for example, either or both of a carbon-to-carbon double bond and a carbon-to-carbon triple bond.

The monovalent hydrocarbon group is, for example, a group in which one hydrogen group has been eliminated from a hydrocarbon, and the hydrocarbon is, for example, an alkane, an alkene, an alkyne, an alicyclic hydrocarbon, an aromatic hydrocarbon, and a bonding compound. This bonding compound is a compound in which two or more kinds among the alkane, alkene, alkyne, alicyclic hydrocarbon, and aromatic hydrocarbon described above are bonded to each other.

The position at which the hydrogen group has been eliminated from the hydrocarbon may be arbitrary. The fact that the eliminated position of hydrogen group may be arbitrary in this manner also applies to the following description.

The kind of alkane is not particularly limited, but the alkane is, for example, methane, ethane, propane, butane, pentane, hexane, heptane, octane, nonane, and decane.

The kind of alkene is not particularly limited, but the alkene is, for example, ethylene (ethene), propene (propylene), butene, pentene, hexene, heptene, octene, nonene, and decene.

The kind of alkyne is not particularly limited, but the alkyne is, for example, ethyne (acetylene), propyne, butyne, pentyne, hexyne, heptyne, octyne, nonyne, and decyne.

The kind of alicyclic hydrocarbon is not particularly limited, but the alicyclic hydrocarbon is, for example, cyclopropane, cyclobutane, cyclopentane, cyclohexane, cycloheptane, cyclooctane, cyclononane, and cyclodecane.

The kind of aromatic hydrocarbon is not particularly limited, but the aromatic hydrocarbon is, for example, benzene, naphthalene, anthracene, biphenyl, and terphenyl.

The kind of bonding compound is not particularly limited, but the bonding compound is, for example, a compound in which an alkane and an alkene are bonded to each other, a compound in which an alkane and an alkyne are bonded to each other, a compound in which an alkene and an alkyne are bonded to each other, a compound in which one or more kinds among an alkane, an alkene, and an alkyne and an alicyclic hydrocarbon are bonded to each other, a compound in which one or more kinds among an alkane, an alkene, and an alkyne and an aromatic hydrocarbon are bonded to each other, and a compound in which one or more kinds among an alkane, an alkene, and an alkyne, an alicyclic hydrocarbon and an aromatic hydrocarbon are bonded to one another.

A group in which one hydrogen group has been eliminated from an alkane is a so-called alkyl group. The kind of alkyl group is not particularly limited, but the alkyl group is, for example, a methyl group, an ethyl group, a propyl group, a butyl group, a pentyl group, a hexyl group, a heptyl group, an octyl group, a nonyl group, and a decyl group.

A group in which one hydrogen group has been eliminated from an alkene is a so-called alkenyl group. The kind of alkenyl group is not particularly limited, but the alkenyl group is, for example, an ethenyl group, a propenyl group, a butenyl group, a pentenyl group, a hexenyl group, a heptenyl group, an octenyl group, a nonenyl group, and a decenyl group.

A group in which one hydrogen group has been eliminated from an alkyne is a so-called alkynyl group. The kind of alkynyl group is not particularly limited, but the alkynyl group is, for example, an ethynyl group, a propynyl group, a butynyl group, a pentynyl group, a hexynyl group, a heptynyl group, an octynyl group, a nonylyl group, and a decynyl group.

A group in which one hydrogen group has been eliminated from an alicyclic hydrocarbon is a so-called cycloalkyl group. The kind of cycloalkyl group is not particularly limited, but the cycloalkyl group is, for example, a cyclopropyl group, a cyclobutyl group, a cyclopentyl group, a cyclohexyl group, a cycloheptyl group, a cyclooctyl group, a cyclononyl group, and a cyclodecyl group.

A group in which one hydrogen group has been eliminated from an aromatic hydrocarbon is a so-called aryl group. The kind of aryl group is not particularly limited, but the aryl group is, for example, a phenyl group and a naphthyl group.

A group in which one hydrogen group has been eliminated from a bonding compound is the monovalent bonding group described above. The kind of monovalent bonding group is not particularly limited, but the monovalent bonding group is, for example, a group in which an alkyl group and an alkenyl group are bonded to each other, a group in which an alkyl group and alkynyl are bonded to each other, a group in which an alkenyl group and an alkynyl group are bonded to each other, a group in which a cycloalkyl group and an aryl group are bonded to each other, a group in which one or more kinds among an alkyl group, an alkenyl group, and an alkynyl group and a cycloalkyl group are bonded to each other, a group in which one or more kinds among an alkyl group, an alkenyl group, and an alkynyl group and an aryl group are bonded to each other, and a group in which one or more kinds among an alkyl group, an alkenyl group, and an alkynyl group, a cycloalkyl group, and an aryl group are bonded to one another.

The "monovalent halogenated hydrocarbon group" is a group in which one or two or more hydrogen groups in a monovalent hydrocarbon group have been substituted with a halogen group as described above. However, in a case in which the monovalent halogenated hydrocarbon group contains two or more halogen groups, the kinds of the two or more halogen groups may be only one kind or two or more kinds.

The monovalent halogenated hydrocarbon group is, for example, a group in which one or two or more hydrogen groups in each of the alkyl group, alkenyl group, alkynyl group, cycloalkyl group, aryl group, and monovalent bonding group have been substituted with a halogen group.

A group in which one or two or more hydrogen groups in an alkyl group have been substituted with a halogen group is a so-called halogenated alkyl group. The kind of halogenated alkyl group is not particularly limited, but the halogenated alkyl group is, for example, a fluoromethyl group, a difluoromethyl group, a perfluoromethyl group, a perfluoroethyl group, a perfluoropropyl group, a perfluorobutyl group, and a perfluorodecyl group.

A group in which one or two or more hydrogen groups in an alkenyl group have been substituted with a halogen group is a so-called halogenated alkenyl group. The kind of halogenated alkenyl group is not particularly limited, but the halogenated alkenyl group is, for example, a perfluoroethenyl group, a perfluoropropenyl group, a perfluorobutenyl group, and a perfluorodecenyl group.

A group in which one or two or more hydrogen atoms in an alkynyl group have been substituted with a halogen group is a so-called halogenated alkynyl group. The kind of halogenated alkynyl group is not particularly limited but the halogenated alkynyl group is, for example, a perfluoroethynyl group, a perfluoropropynyl group, a perfluorobutynyl group, and a perfluorodecynyl group.

A group in which one or two or more hydrogen groups in a cycloalkyl group have been substituted with a halogen group is a so-called halogenated cycloalkyl group. The kind of halogenated cycloalkyl group is not particularly limited but the halogenated cycloalkyl group is, for example, a perfluorocyclopropyl group, a perfluorocyclobutyl group, a perfluoropentyl group, a perfluorohexyl group, and a perfluorocyclodecyl group.

A group in which one or two or more hydrogen groups in an aryl group have been substituted with a halogen group is a so-called halogenated aryl group. The kind of halogenated aryl group is not particularly limited, but the halogenated aryl group is, for example, a fluorophenyl group, a perfluorophenyl group, a fluoronaphthyl group, and a perfluoronaphthyl group.

As described above, it is preferable that the halogen group is a fluorine group, and it is thus preferable that one or two or more hydrogen groups in the monovalent hydrocarbon group have been substituted with a fluorine group. In other words, the monovalent halogenated hydrocarbon group is preferably a monovalent fluorinated hydrocarbon group. This is because the chemical stability of the electrolytic solution is sufficiently improved while securing the solubility and compatibility of the cyclic nitrogen compound.

Among these, it is preferable that all the hydrogen groups in the monovalent hydrocarbon group have been substituted with a fluorine group. In other words, the monovalent fluorinated hydrocarbon group is preferably a monovalent perfluorohydrocarbon group. This is because the chemical stability of the electrolytic solution is further improved.

A group in which all the hydrogen groups in an alkyl group have been substituted with a fluorine group is a so-called perfluoroalkyl group. A group in which all the hydrogen groups in an alkenyl group have been substituted with fluorine groups is a so-called perfluoroalkenyl group. A group in which all the hydrogen groups in an alkynyl group have been substituted with a fluorine group is a so-called perfluoroalkynyl group. A group in which all the hydrogen groups in a cycloalkyl group have been substituted with a fluorine group is a so-called perfluorocycloalkyl group. A group in which all the hydrogen groups in an aryl group have been substituted with a fluorine group is a so-called perfluoroaryl group. A group in which all the hydrogen groups in a monovalent bonding group have been substituted with a fluorine group is a monovalent perfluoro bonding group.

The kind of each of the perfluoroalkyl group, the perfluoroalkenyl group, the perfluoroalkynyl group, the perfluorocycloalkyl group, and the perfluoroaryl group is not particularly limited, but each of these groups are, for example, as described above.

Among these, the monovalent fluorinated hydrocarbon group is preferably a perfluoroalkyl group. This is because the chemical stability of the electrolytic solution is further improved. The number of carbon atoms in the perfluoroalkyl group is not particularly limited, but it is preferably 1 to 3. This is because the solubility and compatibility of the cyclic nitrogen compound are further improved.

Incidentally, in the first cyclic nitrogen compound, R101 to R104 are each preferably a fluorine group, or R101 to R104 are each preferably a monovalent fluorinated hydrocarbon group. This is because the chemical stability of the electrolytic solution is further improved.

Here, the description on R101 to R104 also applies to R105 to R121. In other words, in the second cyclic nitrogen compound, it is preferable that R105 to R108 are each a fluorine group or R105 to R108 are each a monovalent fluorinated hydrocarbon group. In the third cyclic nitrogen compound, it is preferable that R109 to R112 are each a fluorine group or R109 to R112 are each a monovalent fluorinated hydrocarbon group. In the fourth cyclic nitrogen compound, it is preferable that R113 to R115 are each a fluorine group or R113 to R115 are each a monovalent fluorinated hydrocarbon group. In the fifth cyclic nitrogen compound, it is preferable that R116 to R118 are each a fluorine group or R116 to R118 are each a monovalent fluorinated hydrocarbon group. In the sixth cyclic nitrogen compound, it is preferable that R119 to R121 are each a fluorine group or R119 to R121 are each a monovalent fluorinated hydrocarbon group.

Among these, the cyclic nitrogen compound is preferably the second cyclic nitrogen compound containing pyrimidine as a skeleton and the fourth cyclic nitrogen compound containing 1,3,5-triazine as a skeleton as well as is more preferably the fourth cyclic nitrogen compound. This is because the chemical stability of the electrolytic solution is sufficiently improved.

Specific examples of the cyclic nitrogen compound are as follows. However, specific examples of the cyclic nitrogen compound are not limited to the compounds to be described below, and the cyclic nitrogen compound may be other compounds.

Specific examples of the first cyclic nitrogen compound are compounds represented by the following respective chemical formulas (1-1) to (1-11).

[chemical formulas (1-1) to (1-11)]

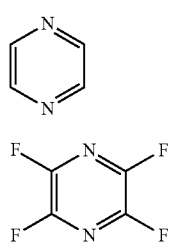

(1-1)

(1-2)

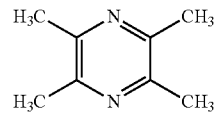

(1-3)

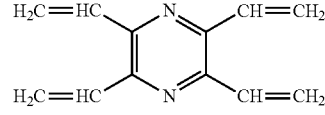

(1-4)

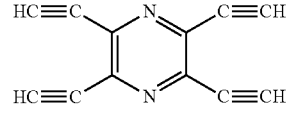

(1-5)

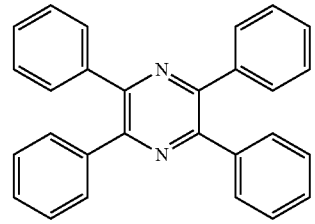

(1-6)

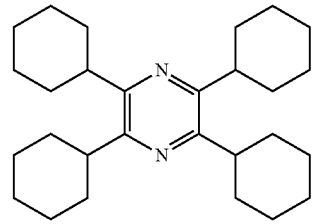

(1-7)

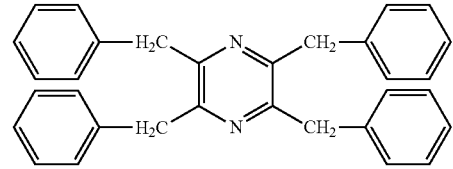

(1-8)

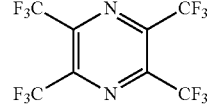

(1-9)

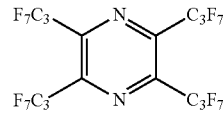

(1-10)

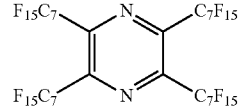

(1-11)

Specific examples of the second cyclic nitrogen compound are compounds represented by the following respective chemical formulas (2-1) to (2-11).

[chemical formulas (2-1) to (2-11)]
(2-1)
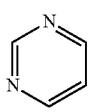
(2-2)
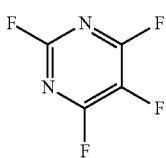
(2-3)
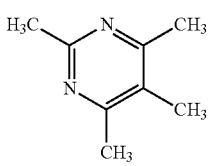
(2-4)
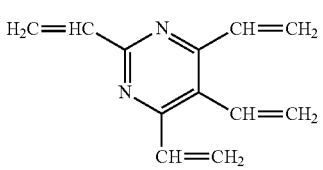
(2-5)
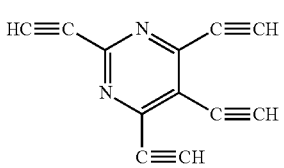
(2-6)
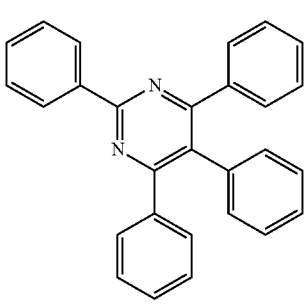
(2-7)
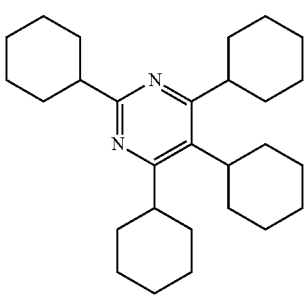
(2-8)
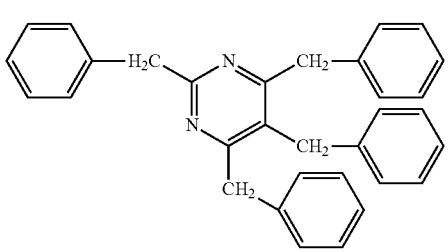
(2-9)
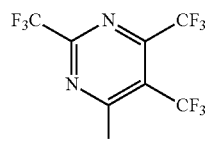
(2-10)
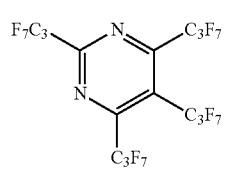
(2-11)
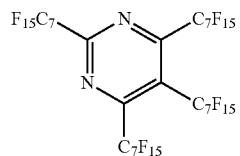
Specific examples of the third cyclic nitrogen compound are compounds represented by the following respective chemical formulas (3-1) to (3-11).
[chemical formulas (3-1) to (3-11)]
(3-1)
(3-2)
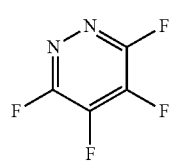
(3-3)
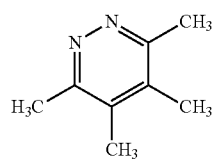
(3-4)
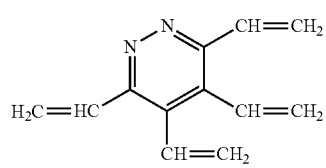
(3-5)
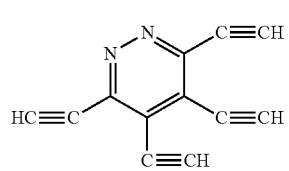

(3-6)
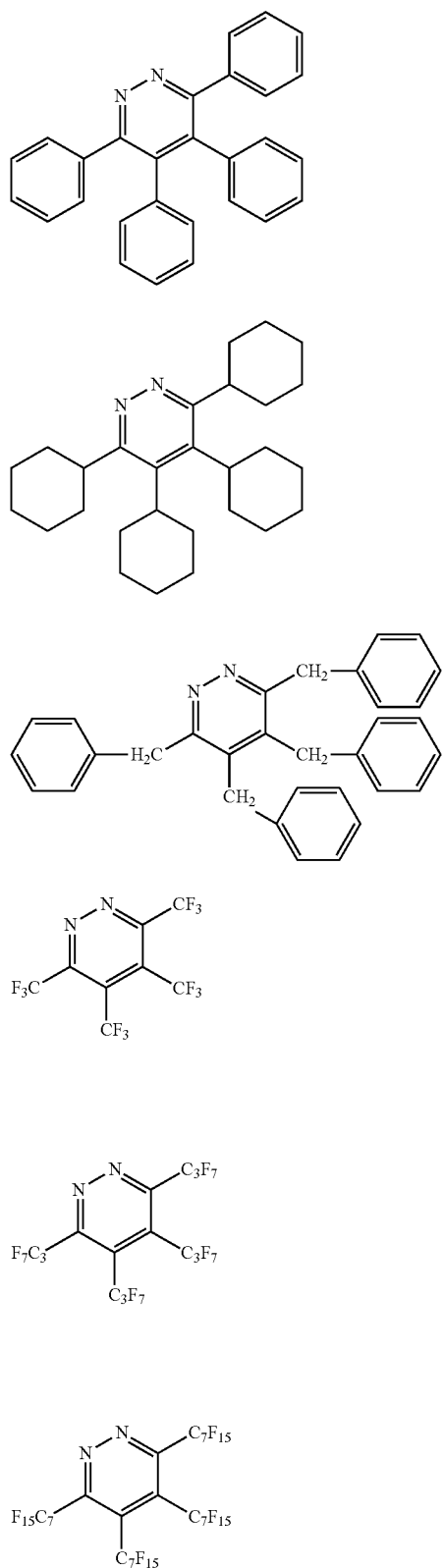
(3-7)
(3-8)
(3-9)
(3-10)
(3-11)
Specific examples of the fourth cyclic nitrogen compound are compounds represented by the following respective chemical formulas (4-1) to (4-11).
[chemical formulas (4-1) to (4-11)]
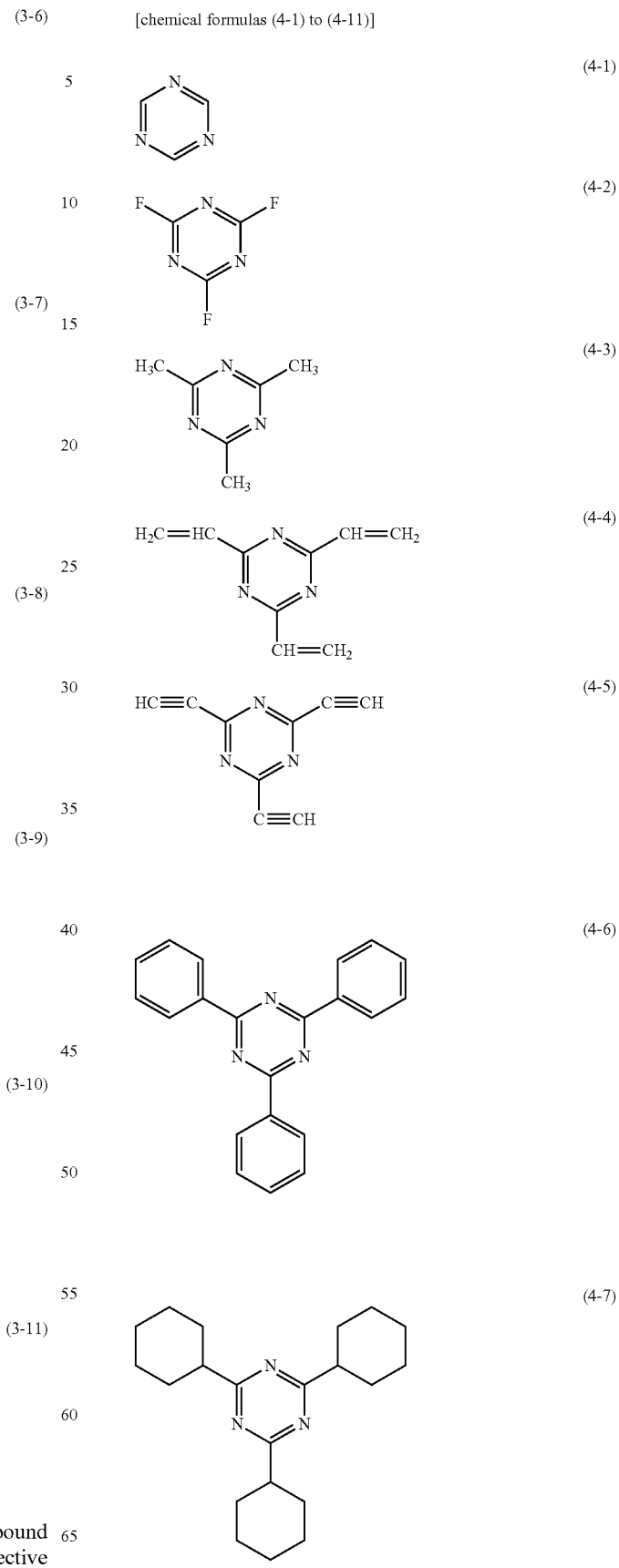
(4-1)
(4-2)
(4-3)
(4-4)
(4-5)
(4-6)
(4-7)

(4-8)
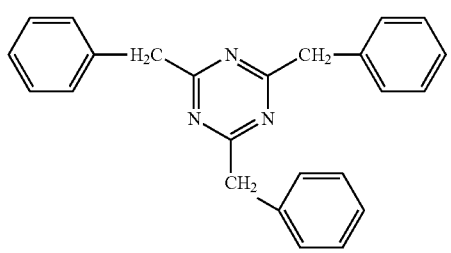
(4-9)
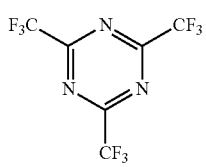
(4-10)
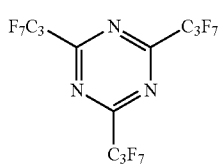
(4-11)
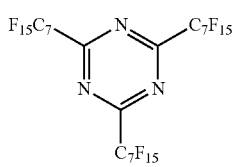
Specific examples of the fifth cyclic nitrogen compound are compounds represented by the following respective chemical formulas (5-1) to (5-11).
[chemical formulas (5-1) to (5-11)]
(5-1)
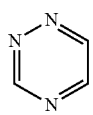
(5-2)
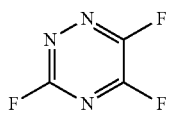
(5-3)
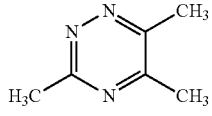
(5-4)
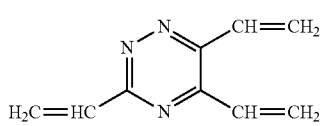
(5-5)
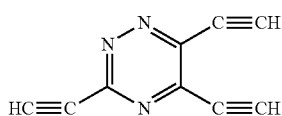
(5-6)
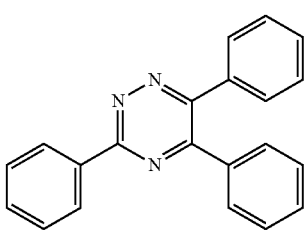
(5-7)
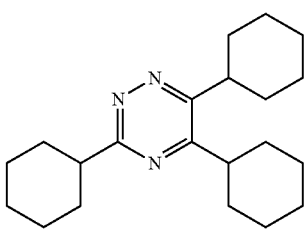
(5-8)
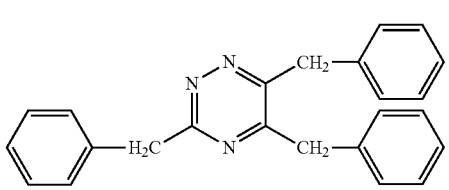
(5-9)
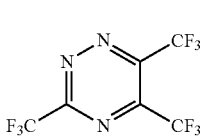
(5-10)
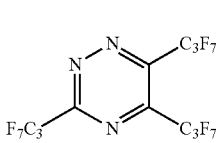
(5-11)
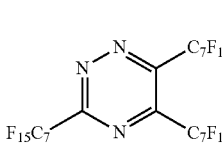
Specific examples of the sixth cyclic nitrogen compound are compounds represented by the following respective chemical formulas (6-1) to (6-11).
[chemical formulas (6-1) to (6-11)]
(6-1)
(6-2)
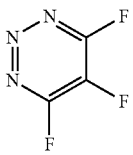

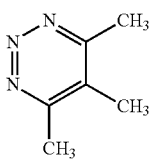
(6-3)

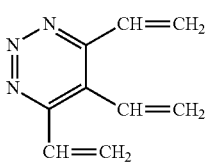
(6-4)

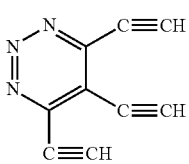
(6-5)

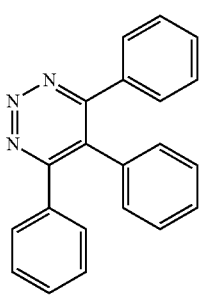
(6-6)

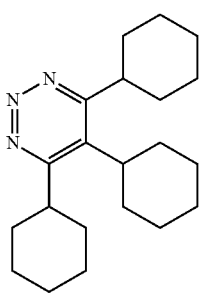
(6-7)

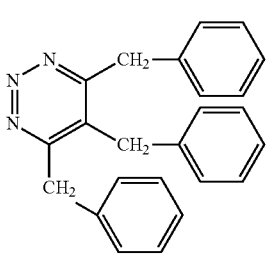
(6-8)

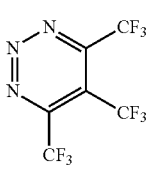
(6-9)

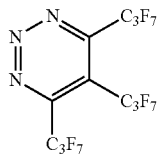
(6-10)

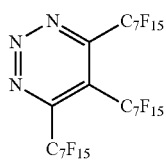
(6-11)

The content of the cyclic nitrogen compound in the electrolytic solution is not particularly limited but is preferably 0.1 wt % to 3 wt % and more preferably 1 wt % to 3 wt %. This is because the chemical stability of the electrolytic solution is sufficiently improved while securing the solubility and compatibility of the cyclic nitrogen compound.

In a case in which the electrolytic solution contains two or more kinds of cyclic nitrogen compounds, the "content of cyclic nitrogen compound" described above is the sum of contents of the respective cyclic nitrogen compounds.

As is apparent from the chemical formula (7), the first nitrile compound contains one or two or more nitrile groups (or cyano groups: —CN).

R122 represents any of an n-valent hydrocarbon group, an n-valent halogenated hydrocarbon group, an n-valent oxygen-containing group, an n-valent nitrogen-containing group, an n-valent sulfur-containing group, an n-valent phosphorus-containing group, or an n-valent bonding group as described above. This "n-valent bonding group" is an n-valent group in which two or more kinds among the n-valent hydrocarbon groups, n-valent halogenated hydrocarbon group, n-valent oxygen-containing group, n-valent nitrogen-containing group, n-valent sulfur-containing group, and n-valent phosphorus-containing group described above are bonded to each other.

The "n-valent hydrocarbon group" is a generic term for groups in which n hydrogen groups have been eliminated from compounds (hydrocarbons) composed of carbon and hydrogen as described above. This n-valent hydrocarbon group may be linear, branched having one or two or more branches, cyclic, or in a state in which two or more kinds among these are bonded to each other. Incidentally, in a case in which the n-valent hydrocarbon group has two or more branches, the branches may be bonded to each other to form one or two or more rings. In addition, the n-valent hydrocarbon group may contain one or two or more unsaturated carbon-to-carbon bonds or may not contain the unsaturated carbon-to-carbon bond.

The n-valent hydrocarbon group is, for example, a group in which n hydrogen groups have been eliminated from each of an alkane, an alkene, an alkyne, an alicyclic hydrocarbon, an aromatic hydrocarbon, and a bonding compound.

Details on a case in which the n-valent hydrocarbon group is a monovalent hydrocarbon group are, for example, as follows.

A group in which one hydrogen group has been eliminated from an alkane is an alkyl group. A group in which one hydrogen group has been eliminated from an alkene is an alkenyl group. A group in which one hydrogen group has been eliminated from an alkyne is an alkynyl group. A group in which one hydrogen group has been eliminated from an alicyclic hydrocarbon is a cycloalkyl group. A group in which one hydrogen group has been eliminated from an aromatic hydrocarbon is an aryl group. A group in which one hydrogen group has been eliminated from a bonding compound is a monovalent bonding group. Details on each of the alkyl group, the alkenyl group, the alkynyl group, the cycloalkyl group, the aryl group, and the monovalent bonding group are, for example, as described above.

Details on a case in which the n-valent hydrocarbon group is a divalent hydrocarbon group are, for example, as follows.

A group in which two hydrogen groups have been eliminated from an alkane is a so-called alkylene group. The kind of alkylene group is not particularly limited, but the alkylene group is, for example, a methylene group, an ethylene group, a propylene group, a butylene group, a pentylene group, a hexylene group, a heptylene group, an octylene group, a nonylene group, and a decylene group.

A group in which two hydrogen groups have been eliminated from an alkene is a so-called alkenylene group. The kind of alkenylene group is not particularly limited, but the alkenylene group is, for example, an ethenylene group, a propenylene group, a butenylene group, a pentenylene group, a hexenylene group, a heptenylene group, an octenylene group, a nonenylene group, and a decenylene group.

A group in which two hydrogen groups have been eliminated from an alkyne is a so-called alkynylene group. The kind of alkynylene group is not particularly limited, but the alkynylene group is, for example, an ethynylene group, a propynylene group, a butynylene group, a pentynylene group, a hexynylene group, a heptynylene group, an octynylene group, a nonylylene group, and a decynylene group.

A group in which two hydrogen groups have been eliminated from an alicyclic hydrocarbon is a so-called cycloalkylene group. The kind of cycloalkylene group is not particularly limited, but the cycloalkylene group is, for example, a cyclopropylene group, a cyclobutylene group, a cyclopentylene group, a cyclohexylene group, a cycloheptylene group, a cyclooctylene group, a cyclononylene group, and a cyclodecylene group.

A group in which two hydrogen groups have been eliminated from an aromatic hydrocarbon is a so-called arylene group. The kind of arylene group is not particularly limited, but the arylene group is, for example, a phenylene group and a naphthylene group.

A group in which two hydrogen groups have been eliminated from a bonding compound is a so-called divalent bonding group. The kind of divalent bonding group is not particularly limited, but the divalent bonding group is, for example, a group in which an alkylene group and an alkenylene group are bonded to each other, a group in which an alkylene group and an alkynylene are bonded to each other, a group in which an alkenylene group and an alkynylene group are bonded to each other, a group in which a cycloalkylene group and an arylene group are bonded to each other, a group in which one or more kinds among an alkylene group, an alkenylene group, and an alkynylene group and a cycloalkylene group are bonded to each other, a group in which one or more kinds among an alkylene group, an alkenylene group, and an alkynylene group and an arylene group are bonded to each other, and a group in which one or more kinds among an alkylene group, an alkenylene group, and an alkynylene group, a cycloalkylene group, and an arylene group are bonded to one another.

Details on a case in which the n-valent hydrocarbon group is a trivalent hydrocarbon group are, for example, as follows.

A group in which three hydrogen groups have been eliminated from an alkane is a group in which one hydrogen group has been eliminated from the alkylene group described above. A group in which three hydrogen groups have been eliminated from an alkene is a group in which one hydrogen group has been eliminated from the alkenylene group described above. A group in which three hydrogen groups have been eliminated from an alkyne is a group in which one hydrogen group has been eliminated from the alkynylene group described above. A group in which three hydrogen groups have been eliminated from an alicyclic hydrocarbon is a group in which one hydrogen group has been eliminated from the cycloalkylene group described above. A group in which three hydrogen groups have been eliminated from an aromatic hydrocarbon is a group in which one hydrogen group has been eliminated from the arylene group described above. A group in which three hydrogen groups have been eliminated from a bonding compound is a group in which one hydrogen group has been eliminated from the divalent bonding group described above.

Of course, the n-valent hydrocarbon group may be a tetra- or higher valent hydrocarbon group in which four or more hydrogen groups have been eliminated from each of an alkane, an alkene, an alkyne, an alicyclic hydrocarbon, an aromatic hydrocarbon, and a bonding compound.

The "n-valent halogenated hydrocarbon group" is a group in which one or two or more hydrogen groups in an n-valent hydrocarbon group have been substituted with a halogen group as described above. Details on the n-valent halogenated hydrocarbon group are the same as those on the monovalent halogenated hydrocarbon group described above except that, for example, the valence is different from each other.

In other words, the n-valent halogenated hydrocarbon group is, for example, a group in which one or two or more hydrogen groups in each of the alkyl group, alkenyl group, alkynyl group, cycloalkyl group, aryl group, monovalent bonding group, alkylene group, alkenylene group, alkynylene, cycloalkylene group, arylene group, and divalent bonding group described above have been substituted with a halogen group.

A group in which one or two or more hydrogen groups in an alkyl group have been substituted with a halogen group is a halogenated alkyl group. Details on the halogenated alkyl group are, for example, as described above.

A group in which one or two or more hydrogen groups in an alkenyl group have been substituted with a halogen group is a halogenated alkenyl group. Details on the halogenated alkenyl group are, for example, as described above.

A group in which one or two or more hydrogen groups in an alkynyl group have been substituted with a halogen group is a halogenated alkynyl group. Details on the halogenated alkynyl group are, for example, as described above.

A group in which one or two or more hydrogen groups in a cycloalkyl group have been substituted with a halogen group is a halogenated cycloalkyl group. Details on the halogenated cycloalkyl group are, for example, as described above.

A group in which one or two or more hydrogen groups in an aryl group have been substituted with a halogen group is a halogenated aryl group. Details on the halogenated aryl group are, for example, as described above.

A group in which one or two or more hydrogen groups in an alkylene group have been substituted with a halogen group is a so-called halogenated alkylene group. The kind of halogenated alkylene group is not particularly limited, but the halogenated alkylene group is, for example, a fluoromethylene group, a difluoromethylene group, a perfluoromethylene group, a perfluoroethylene group, a perfluoropropylene group, a perfluorobutylene group, and a perfluorodecylene group.

A group in which one or two or more hydrogen groups in an alkenylene group have been substituted with a halogen group is a so-called halogenated alkenylene group. The kind of halogenated alkenylene group is not particularly limited, but the halogenated alkenylene group is, for example, a perfluoroethenylene group, a perfluoropropynylene group, a perfluorobutenylene group, and a perfluorodecenylene group.

A group in which one or two or more hydrogen groups in an alkynylene group have been substituted with a halogen group is a so-called halogenated alkynylene group. The kind of halogenated alkynylene group is not particularly limited, but the halogenated alkynylene group is, for example, a perfluoroethynylene group, a perfluoropropynylene group, a perfluorobutynylene group, and a perfluorodecynylene group.

A group in which one or two or more hydrogen groups in a cycloalkylene group have been substituted with a halogen group is a so-called halogenated cycloalkylene group. The kind of halogenated cycloalkylene group is not particularly limited but the halogenated cycloalkylene group is, for example, a perfluorocyclopropylene group, a perfluorocyclobutylene group, a perfluoropentylene group, a perfluorohexylene group, and a perfluorocyclodecylene group.

A group in which one or two or more hydrogen atoms in an arylene group have been substituted with a halogen group is a so-called halogenated arylene group. The kind of halogenated arylene group is not particularly limited, but the halogenated arylene group is, for example, a fluorophenylene group, a perfluphenylene group, a fluoronaphthylene group, and a perfluoronaphthylene group.

The "n-valent oxygen-containing group" is a generic term for n-valent groups containing oxygen as a constituent element as described above. The n-valent oxygen-containing group is, for example, a group composed of oxygen and an oxygen-based bonding group. This "group composed of oxygen" is, for example, an ether bond (—O—). The "oxygen-based bonding group" is an n-valent group containing oxygen and any one kind or two or more kinds among hydrogen, carbon, and a halogen element as constituent elements. Incidentally, details on the alkyl group and the like to be described below are, for example, as described above.

Specifically, the monovalent oxygen-containing group is, for example, a hydroxyl group (—OH), an alkoxy group (—OR201: R201 represents either of an alkyl group or an aryl group), a carboxyl group (—COOH), a carboxylic acid ester group (—COOR202: R202 represents either of an alkyl group or an aryl group), an aldehyde group (—CHO), and an acyl group (—COR203: R203 represents either of an alkyl group or an aryl group).

The divalent oxygen-containing group is, for example, a group in which one hydrogen group has been eliminated from each of the alkoxy group, carboxylic acid ester group, and acyl group described above in addition to an ether group, an ester group (—COO—), a carbonyl group (—CO—), and an epoxy group (—COC—).

The trivalent oxygen-containing group is, for example, a group in which three hydrogen groups have been eliminated from each of the alkoxy group, carboxylic acid ester group, and acyl group described above.

Of course, the n-valent oxygen-containing group may be a tetra- or higher valent oxygen-containing group.

The "n-valent nitrogen-containing group" is a generic term for n-valent groups containing nitrogen as a constituent element as described above. The n-valent nitrogen-containing group is, for example, a group composed of nitrogen and a nitrogen-based bonding group. This "group composed of nitrogen" is, for example, an azide group (—N$_3$), a diazonium group (—N$_2^+$), and an azo group (—N=N—). The "nitrogen-based bonding group" is an n-valent group containing nitrogen and any one kind or two or more kinds among hydrogen, carbon, oxygen, and a halogen element as constituent elements.

Specifically, the monovalent nitrogen-containing group is, for example, an amino group (—NR204R205: R204 and R205 each represent any one of a hydrogen group, an alkyl group, or an aryl group), a nitro group (—NO$_2$), a nitroso group (—NO), and an isocyanate group (—NCO).

The divalent nitrogen-containing group is, for example, an azide group, a diazonium group, an azo group, an amide group (—NHCO—), a carbamate group (—NHCOO—), an amine group (—NH$_2$—), an azo group (—N=N—), a diazo group (—C=N$_2$—), and a diimide group (—N=C=N—).

The trivalent nitrogen-containing group is, for example, a group in which two hydrogen groups have been eliminated from the amino group described above.

Of course, the n-valent nitrogen-containing group may be a tetra- or higher valent nitrogen-containing group.

The "n-valent sulfur-containing group" is a generic term for n-valent groups containing sulfur as a constituent element as described above. The n-valent sulfur-containing group is, for example, a group composed of sulfur and a sulfur-based bonding group. This "group composed of sulfur" is, for example, a sulfide group (—S—) and a disulfide group (—S—S—). The "sulfur-based bonding group" is an n-valent group containing sulfur and any one kind or two or more kinds among hydrogen, carbon, oxygen, and a halogen element as constituent elements.

Specifically, the monovalent sulfur-containing group is, for example, a sulfo group (—SO$_3$H), a thiol group (—SH), a thioether group (—SR206: R206 represents either of an alkyl group or an aryl group), and a thioketone group (—CS—R207: R207 represents either of an alkyl group or an aryl group).

The divalent sulfur-containing group is, for example, a group in which one hydrogen group has been eliminated from each of the thioether group and thioketone group described above in addition to a sulfide group, a disulfide group, and a sulfonyl group (—SO$_2$—).

The trivalent sulfur-containing group is, for example, a group in which two hydrogen groups have been eliminated from each of the thioether group and thioketone group described above.

Of course, the n-valent sulfur-containing group may be a tetra- or higher valent sulfur-containing group.

The "n-valent phosphorus-containing group" is a generic term for n-valent groups containing phosphorus as a constituent element as described above. The n-valent phosphorus-containing group is, for example, a phosphorus-based bonding group. This "phosphorus-based bonding group" is an n-valent group containing phosphorus and any one kind or two or more kinds among hydrogen, carbon, oxygen, and a halogen element as constituent elements.

Specifically, the monovalent phosphorus-containing group is, for example, a phosphoric acid group (—PO$_4$H$_2$).

The divalent phosphorus-containing group is, for example, a group in which one hydrogen group has been eliminated from the phosphoric acid group described above.

The trivalent phosphorus-containing group is, for example, a group in which two hydrogen groups have been eliminated from the phosphoric acid group described above.

Of course, the n-valent phosphorus-containing group may be a tetra- or higher valent phosphorus-containing group.

The kind of halogen element is not particularly limited, but the halogen element is, for example, fluorine (F), chlorine (Cl), bromine (Br), and iodine (I) and may be other elements. However, in a case in which the number of halogen elements is two or more, the kinds of the two or more halogen groups may be only one kind or two or more kinds.

The n-valent oxygen-containing group, the n-valent nitrogen-containing group, the n-valent sulfur-containing group, and the n-valent phosphorus-containing group are distinguished from one another as described below. The n-valent group containing phosphorus as a constituent element is regarded as an n-valent phosphorus-containing group. A group which does not contain phosphorus as a constituent element but contains sulfur as a constituent element is regarded as an n-valent sulfur-containing group. A group which does not contain each of phosphorus and sulfur as a constituent element but contains nitrogen and sulfur as a constituent element is regarded as an n-valent nitrogen-containing group. A group which does not contain each of phosphorus, sulfur, and nitrogen as a constituent element but contains oxygen as a constituent element is regarded as an n-valent oxygen-containing group.

n is an integer of 1 or more as described above. In other words, the value of n is not particularly limited as long as it is an integer of 1 or more, and thus n may be 1 or 2 or more. Depending on the value of n, the valence of R122 is determined as well as the number of nitrile groups to be bonded to R122 is determined.

Among these, n is preferably 2 or more. In other words, n is preferably an integer of 2 or more. This is because the chemical stability of the electrolytic solution is further improved while securing the solubility and compatibility of the first nitrile compound.

The upper limit value of n is not particularly limited, but n is preferably 4 or less among these. In other words, n is preferably an integer of 1 to 4 and more preferably an integer of 2 to 4. This is because the chemical stability of the electrolytic solution is further improved as well as the solubility and compatibility of the first nitrile compound are further improved.

Among these, the first nitrile compound is preferably a compound represented by the following chemical formula (9). This is because the chemical stability of the electrolytic solution is sufficiently improved as well as the first nitrile compound is easily produced.

NC—R127-CN　(9)

(R127 represents any of a divalent hydrocarbon group, a divalent halogenated hydrocarbon group, a divalent oxygen-containing group, a divalent nitrogen-containing group, a divalent sulfur-containing group, a divalent phosphorus-containing group, or a divalent group in which two or more kinds of these groups are bonded to each other.)

The compound represented by the chemical formula (9) is a compound in which n is set to 2 in the chemical formula (7) and is a so-called dinitrile compound having two nitrile groups.

R127 represents a divalent hydrocarbon group, a divalent halogenated hydrocarbon group, a divalent oxygen-containing group, a divalent nitrogen-containing group, a divalent sulfur-containing group, a divalent phosphorus-containing group, or a divalent bonding group as described above. This "divalent bonding group" is a divalent group in which two or more kinds among a divalent hydrocarbon group, a divalent halogenated hydrocarbon group, a divalent oxygen-containing group, a divalent nitrogen-containing group, a divalent sulfur-containing group, and a divalent phosphorus-containing group are bonded to each other.

Details on each of the divalent hydrocarbon group, the divalent halogenated hydrocarbon group, the divalent oxygen-containing group, the divalent nitrogen-containing group, the divalent sulfur-containing group, the divalent phosphorus-containing group, and the divalent bonding group are the same as those on each of the n-valent hydrocarbon group, n-valent halogenated hydrocarbon group, n-valent oxygen containing group, n-valent nitrogen containing group, n-valent sulfur containing group, n-valent phosphorus containing group, and n-valent bonding group described above except that, for example, the valence is limited to divalent.

Among these, R127 is preferably an alkylene group which is a divalent hydrocarbon group. This is because the chemical stability of the electrolytic solution is further improved as well as the solubility and compatibility of the first nitrile compound are further improved.

The number of carbon atoms in the alkylene group is not particularly limited but is preferably 1 to 8. This is because the chemical stability of the electrolytic solution is sufficiently improved as well as the solubility and compatibility of the first nitrile compound are sufficiently improved.

Specific examples of the first nitrile compound are compounds represented by the following respective chemical formulas (7-1) to (7-20). However, specific examples of the first nitrile compound are not limited to the compounds to be described below, and the first nitrile compound may be other compounds.

[chemical formulas (7-1) to (7-20)]

 (7-1)

CH$_3$—CN

 (7-2)

C$_2$H$_5$—CN

 (7-3)

C$_4$H$_9$—CN

 (7-4)

C$_8$H$_{17}$—CN

 (7-5)

CH$_2$=CH—CN

 (7-6)

CH≡C—CN

 (7-7)

 (7-8)

 (7-9)

CF$_3$—CN

 (7-10)

C$_2$F$_5$—CN

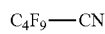 (7-11)

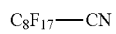 (7-12)

 (7-13)

 (7-14)

 (7-15)

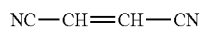 (7-16)

 (7-17)

 (7-18)

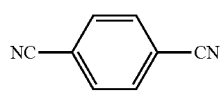 (7-19)

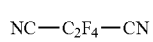 (7-20)

The compounds represented by the respective chemical formulas (7-1) to (7-12) are compounds in which n is set to 1 in the chemical formula (7). In addition, the compounds represented by the respective chemical formulas (7-13) to (7-20) are compounds in which n is set to 2 in the chemical formula (7).

The content of the cyclic nitrogen compound in the electrolytic solution is not particularly limited but is preferably 1 wt % to 5 wt % and more preferably 1 wt % to 3 wt %. This is because the chemical stability of the electrolytic solution is sufficiently improved while securing the solubility and compatibility of the first nitrile compound.

In a case in which the electrolytic solution contains two or more kinds of first nitrile compounds, the "content of first nitrile compound" described above is the sum of contents of the respective first nitrile compounds.

As is apparent from the chemical formula (8), the second nitrile compound is a metal salt containing one or more nitrile groups. In other words, the total number of nitrile groups contained in the second nitrile compound may be only one or two or more. This second nitrile compound contains a cation ($M^{+x}$) and an anion ($BR123R124R125R126'$).

M is a metal element as described above. More specifically, the metal element is, for example, either of an alkali metal element or an alkaline earth metal element. The kind of alkali metal element is not particularly limited, but the alkali metal element is, for example, lithium (Li), sodium (Na), and potassium (K). The kind of alkaline earth metal element is not particularly limited, but the alkaline earth metal element is, for example, magnesium (Mg) and calcium (Ca).

Among these, the metal element is preferably a metal element of the same kind as that of the electrode reactant. This "electrode reactant" is a substance to be used for advancing the electrode reaction (charge and discharge reaction) in a secondary battery using the electrolytic solution. For example, an electrode reactant to be used in a lithium ion secondary battery to be described later and the like is lithium. Accordingly, the metal element is preferably lithium in a case in which the electrolytic solution is used in a lithium ion secondary battery and the like in which lithium is used as an electrode reactant. This is because the chemical stability of the electrolytic solution is further improved.

R123 to R126 each represent a hydrogen group, a halogen group, a nitrile group, a monovalent hydrocarbon group, a monovalent halogenated hydrocarbon group, a monovalent oxygen-containing group, a monovalent nitrogen-containing group, a monovalent sulfur-containing group, a monovalent phosphorus-containing group, and a monovalent bonding group as described above. This "monovalent bonding group" is a monovalent group in which two or more kinds among a hydrogen group, a halogen group, a nitrile group, a monovalent hydrocarbon group, a monovalent halogenated hydrocarbon group, a monovalent oxygen-containing group, a monovalent nitrogen-containing group, a monovalent sulfur-containing group, and a monovalent phosphorus-containing group are bonded to each other.

The "monovalent oxygen-containing group" is a generic term for monovalent groups containing oxygen as a constituent element as described above. The "monovalent nitrogen-containing group" is a generic term for monovalent groups containing nitrogen as a constituent element as described above. The "monovalent sulfur-containing group" is a generic term for monovalent groups containing sulfur as a constituent element as described above. The "monovalent phosphorus-containing group" is a generic term for monovalent groups containing phosphorus as a constituent element as described above.

Details on each of the halogen group, the monovalent hydrocarbon group, and the monovalent halogenated hydrocarbon group are, for example, as described above. In addition, details on each of the monovalent oxygen-containing group, the monovalent nitrogen-containing group, the monovalent sulfur-containing group, and the monovalent phosphorus-containing group are the same as those on each of the n-valent oxygen containing group, n-valent nitrogen containing group, n-valent sulfur containing group, and n-valent phosphorus containing group described above except that, for example, the valence is limited to monovalent.

However, one or two or more of R123 to R126 are either of a nitrile group or a nitrile-containing group as described above. This "nitrile-containing group" is a group containing a nitrile group as described above. Specifically, the nitrile-containing group is a monovalent group in which a nitrile group and a monovalent hydrocarbon group are bonded to each other. The nitrile-containing group is a monovalent group in which a nitrile group and a monovalent halogenated hydrocarbon group are bonded to each other. The nitrile-containing group is a monovalent group in which a nitrile group and a monovalent oxygen-containing group are bonded to each other. The nitrile-containing group is a monovalent group in which a nitrile group and a monovalent nitrogen-containing group are bonded to each other. The nitrile-containing group is a monovalent group in which a nitrile group and a monovalent sulfur-containing group are bonded to each other. The nitrile-containing group is a monovalent group in which a nitrile group and a monovalent phosphorus-containing group are bonded to each other. The nitrile-containing group is a monovalent group in which two or more kinds among this series of monovalent groups are bonded to each other. However, the total number of nitrile groups contained in the nitrile-containing group may be only one or two or more.

In other words, the monovalent group in which a nitrile group and a monovalent hydrocarbon group are bonded to each other is a monovalent hydrocarbon group containing one or two or more nitrile groups. The monovalent group in which a nitrile group and a monovalent halogenated hydrocarbon group are bonded to each other is a monovalent halogenated hydrocarbon group containing one or two or more nitrile groups. The monovalent group in which a nitrile group and a monovalent oxygen-containing group are bonded to each other is a monovalent oxygen-containing group containing one or two or more nitrile groups. The monovalent group in which a nitrile group and a monovalent nitrogen-containing group are bonded to each other is a monovalent nitrogen-containing group containing one or two or more nitrile groups. The monovalent group in which a nitrile group and a monovalent sulfur-containing group are bonded to each other is a monovalent sulfur-containing group containing one or two or more nitrile groups. The monovalent group in which a nitrile group and a monovalent phosphorus-containing group are bonded to each other is a monovalent phosphorus-containing group containing one or two or more nitrile groups.

The kind of the monovalent group in which two kinds among the series of monovalent groups described above are bonded to each other is not particularly limited, but the monovalent group is, for example, a monovalent group in which a nitrile group, a monovalent hydrocarbon group, and a monovalent oxygen-containing group are bonded to one another, a monovalent group in which a nitrile group, a monovalent hydrocarbon group, and a monovalent nitrogen-containing group are bonded to one another, a monovalent group in which a nitrile group, a monovalent hydrocarbon group, and a monovalent sulfur-containing group are bonded to one another, a monovalent group in which a nitrile group, a monovalent hydrocarbon group, and a monovalent phosphorus-containing group are bonded to one another, a monovalent group in which a nitrile group, a monovalent halogenated hydrocarbon group, and a monovalent oxygen-containing group are bonded to one another, a monovalent group in which a nitrile group, a monovalent halogenated hydrocarbon group, and a monovalent nitrogen-containing group are bonded to one another, a monovalent group in which a nitrile group, a monovalent halogenated hydrocarbon group, and a monovalent sulfur-containing group are bonded to one another, and a monovalent group in which a nitrile group, a monovalent halogenated hydrocarbon group, and a monovalent phosphorus-containing group are bonded to one another.

Compounds in which R123 to R126 are all groups (provided that a nitrile-containing group is excluded) other than a nitrile group are excluded from the second nitrile compound described here. In addition, compounds in which R123 to R126 are all groups (provided that a nitrile group is excluded) other than a nitrile-containing group are also excluded from the second nitrile compound described here.

Among these, it is preferable that the second nitrile compound contains four nitrile groups, that is, R123 to R126 are all nitrile groups. This is because the chemical stability of the electrolytic solution is further improved.

$x$ is an integer of 1 or more as described above as well as $y$ is an integer of 1 or more as described above.

The value of $x$ is mainly determined depending on the kind of M (metal element). As an example, $x$ is 1 in a case in which the metal element is lithium as well as $x$ is 2 in a case in which the metal element is magnesium.

The value of $y$ is mainly determined depending on the value of $x$ described above. As an example, $y$ is 1 in a case in which $x$ is 1 since the metal element is lithium forming a monovalent ion. $y$ is 2 in a case in which $x$ is 2 since the metal element is magnesium forming a divalent ion.

Among these, the second nitrile compound is preferably a lithium salt, a sodium salt, a potassium salt, a magnesium salt, and a calcium salt and more preferably a lithium salt depending on the kind of suitable metal element described above. This is because the chemical stability of the electrolytic solution is sufficiently improved.

Specific examples of the second nitrile compound are $LiB(CN)_4$, $LiB(OCH_3)(CN)_3$, $LiB(OCH_3)_2(CN)_2$, $LiB(OCH_3)_3(CN)$, $LiB(OCH_2CN)_4$, $NaB(CN)_4$, $KB(CN)_4$, $Mg[B(CN)_4]_2$, and $Ca[B(CN)_4]_2$. However, specific examples of the second nitrile compound are not limited to the compounds described here, and the second nitrile compound may be other compounds.

The content of the second nitrile compound in the electrolytic solution is not particularly limited but is preferably 0.1 wt % to 1 wt %. This is because the chemical stability of the electrolytic solution is sufficiently improved while securing the solubility and compatibility of the second nitrile compound.

In a case in which the electrolytic solution contains two or more kinds of second nitrile compounds, the "content of second nitrile compound" described above is the sum of contents of the respective second nitrile compounds.

In the electrolytic solution may contain any one kind or two or more kinds among other materials in addition to the cyclic nitrogen compound and nitrile compound described above.

The other materials are, for example, any one kind or two or more kinds among solvents such as a nonaqueous solvent (organic solvent). An electrolytic solution containing a nonaqueous solvent is a so-called nonaqueous electrolytic solution.

Solvents are, for example, a cyclic carbonic acid ester, a chain carbonic acid ester, a lactone, and a chain carboxylic acid ester. This is because excellent battery capacity, cycle characteristics, storage characteristics and the like are obtained.

Specific examples of the cyclic carbonic acid ester are ethylene carbonate, propylene carbonate, and butylene carbonate. Specific examples of the chain carbonic acid ester are dimethyl carbonate, diethyl carbonate, ethyl methyl carbonate, and methyl propyl carbonate. Specific examples of the lactone are γ-butyrolactone and γ-valerolactone. Specific examples of the chain carboxylic acid ester are methyl acetate, ethyl acetate, methyl propionate, ethyl propionate, propyl propionate, methyl butyrate, methyl isobutyrate, methyl trimethylacetate, and ethyl trimethylacetate.

In addition to these, the solvent may be, for example, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. This is because the same advantages are obtained.

Among these, the solvent preferably contains any one kind or two or more kinds among ethylene carbonate, propylene carbonate, dimethyl carbonate, diethyl carbonate, and ethyl methyl carbonate. This is because a high battery capacity, excellent cycle characteristics, excellent storage characteristics and the like are obtained. In this case, a combination of solvents (for example, relative permittivity $ϑ≥30$) having a high viscosity (high dielectric constant) such as ethylene carbonate and propylene carbonate with solvents having a low viscosity (for example, viscosity≤1 mPa·s) such as dimethyl carbonate, ethyl methyl carbonate, and diethyl carbonate is more preferable. This is because the dissociation property of the electrolyte salt and the mobility of ions are improved.

Furthermore, the solvent may contain any one kind or two or more kinds among an unsaturated cyclic carbonic acid ester, a halogenated carbonic acid ester, a sulfonic acid ester, an acid anhydride, a diisocyanate compound and the like. This is because the chemical stability of the electrolytic solution is further improved.

The unsaturated cyclic carbonic acid ester is a cyclic carbonic acid ester containing one or two or more unsaturated carbon-to-carbon bonds (carbon-to-carbon double bond) and is, for example, a compound each represented by the following respective chemical formulas (9) to (11). The content of the unsaturated cyclic carbonic acid ester in the solvent is not particularly limited but is, for example, 0.01 wt % to 10 wt %.

[chemical formulas (9) to (11)]

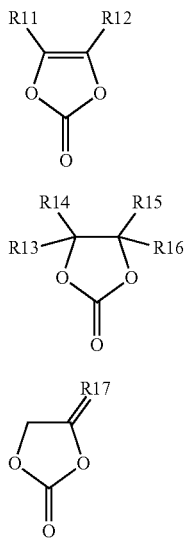

(R11 and R12 each represent either of a hydrogen group or an alkyl group. R13 to R16 each represent any of a hydrogen group, an alkyl group, a vinyl group, or an allyl group, and at least one of R13 to R16 represents either of a vinyl group or an allyl group. R17 represents a group represented by >CR171R172, and R171 and R172 each represent either of a hydrogen group or an alkyl group.)

The compound represented by the chemical formula (9) is a vinylene carbonate type compound. R11 and R12 may each represent the same kind of group as or different kinds of groups from each other. Details on the alkyl group are as described above. Specific examples of the vinylene carbonate type compound are vinylene carbonate (1,3-dioxol-2-one), methyl vinylene carbonate (4-methyl-1,3-dioxol-2-one), ethyl vinylene carbonate (4-ethyl-1,3-dioxol-2-one), 4,5-dimethyl-1,3-dioxol-2-one, 4,5-diethyl-1,3-dioxol-2-one, 4-fluoro-1,3-dioxol-2-one, and 4-trifluoromethyl-1,3-dioxol-2-one.

The compound represented by the chemical formula (10) is a vinyl ethylene carbonate type compound. R13 to R16 may each represent the same kind of group as or different kinds of groups from one another. Of course, some of R13 to R16 may represent the same kind of group as one another. Specific examples of the vinyl ethylene carbonate type compound are vinylethylene carbonate (4-vinyl-1,3-dioxolan-2-one), 4-methyl-4-vinyl-1,3-dioxolan-2-one, 4-ethyl-4-vinyl-1,3-dioxolan-2-one, 4-n-propyl-4-vinyl-1,3-dioxolan-2-one, 5-methyl-4-vinyl-1,3-dioxolan-2-one, 4,4-divinyl-1,3-dioxolan-2-one, and 4,5-divinyl-1,3-dioxolan-2-one.

The compound represented by the chemical formula (11) is a methylene ethylene carbonate type compound. R171 and R172 may each represent the same kind of group as or different kinds of groups from each other. Specific examples of the methylene ethylene carbonate type compound are methylene ethylene carbonate (4-methylene-1,3-dioxolan-2-one), 4,4-dimethyl-5-methylene-1,3-dioxolan-2-one, and 4,4-diethyl-5-methylene-1,3-dioxolan-2-one.

In addition to these, the unsaturated cyclic carbonic acid ester may be carbonate catechol (catechol carbonate) having a benzene ring and the like.

The halogenated carbonic acid ester is a cyclic or chain carbonic acid ester containing one or two or more halogens as a constituent element and is, for example, a compound represented by the following respective chemical formulas (12) and (13). The content of the halogenated carbonic acid ester in the solvent is not particularly limited but is, for example, 0.01 wt % to 10 wt %.

[chemical formulas (12) to (13)]

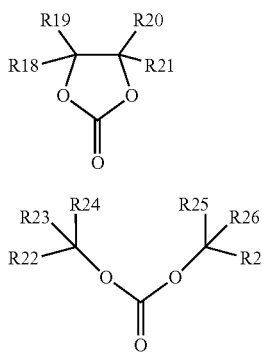

(R18 to R21 each represent any of a hydrogen group, a halogen group, an alkyl group, or a halogenated alkyl group, and at least one of R18 to R21 represents either of a halogen group or a halogenated alkyl group. R22 to R27 represent any of a hydrogen group, a halogen group, an alkyl group, or a halogenated alkyl group, and at least one of R22 to R27 represents either of a halogen group or a halogenated alkyl group.)

The compound represented by the chemical formula (12) is a cyclic halogenated carbonic acid ester. R18 to R21 may each represent the same kind of group as or different kinds of groups from one another. Of course, some of R18 to R21 may represent the same kind of group as one another.

The kind of halogen group is not particularly limited, but among these, the halogen group is preferably any one kind or two or more kinds among a fluorine group, a chlorine group, a bromine group, and an iodine group and more preferably a fluorine group. In addition, the number of halogen groups may be one or two or more.

Details on the alkyl group are as described above. The halogenated alkyl group is a group in which one or two or more hydrogen groups in an alkyl group are substituted (halogenated) with a halogen group. Details on the halogen group are as described above.

Specific examples of the cyclic halogenated carbonic acid ester are compounds represented by the following chemical formulas (12-1) to (12-21), and geometric isomers are also included in these compounds. Among these, 4-fluoro-1,3-dioxolan-2-one represented by the formula (12-1), 4,5-difluoro-1,3-dioxolan-2-one represented by the formula (12-3), and the like are preferable. Incidentally, as 4,5-difluoro-1,3-dioxolan-2-one, a trans isomer is preferred to a cis isomer. This is because a trans isomer is easily procurable as well as provides a high effect.

[chemical formulas (12-1) to (12-21)]

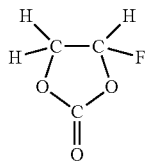
(12-1)

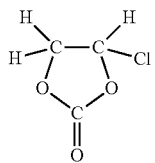
(12-2)

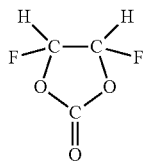
(12-3)

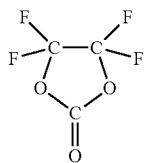
(12-4)

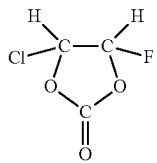
(12-5)

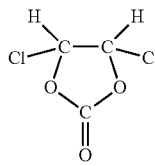
(12-6)

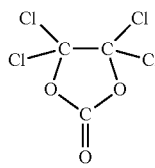
(12-7)

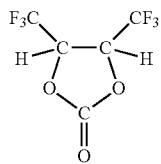
(12-8)

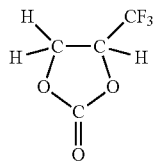
(12-9)

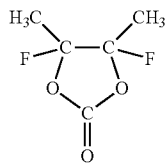
(12-10)

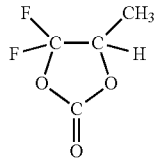
(12-11)

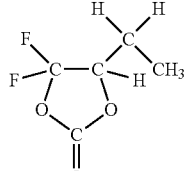
(12-12)

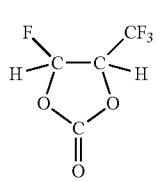
(12-13)

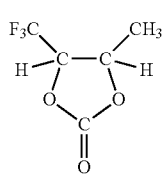
(12-14)

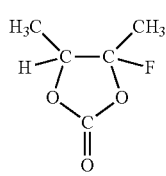
(12-15)

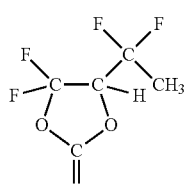
(12-16)

-continued

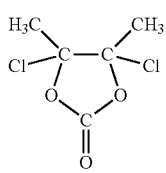 (12-17)

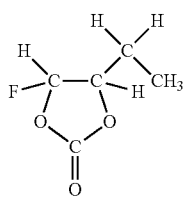 (12-18)

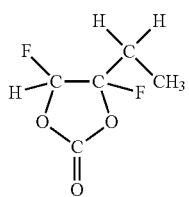 (12-19)

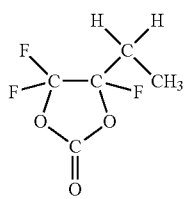 (12-20)

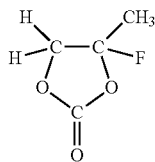 (12-21)

The compound represented by the chemical formula (13) is a chain halogenated carbonic acid ester. R22 to R27 may each represent the same kind of group as or different kinds of groups from one another. Of course, some of R22 to R27 may represent the same kind of group as one another.

Specific examples of the chain halogenated carbonic acid ester are fluoromethyl methyl carbonate, bis(fluoromethyl) carbonate, and difluoromethyl methyl carbonate.

The sulfonic acid ester includes, for example, a monosulfonic acid ester and a disulfonic acid ester. The content of the sulfonic acid ester in the solvent is not particularly limited but is, for example, 0.01 wt % to 10 wt %.

The monosulfonic acid ester may be a cyclic monosulfonic acid ester or a chain monosulfonic acid ester. Specific examples of the cyclic monosulfonic acid ester are sultones such as 1,3-propane sultone and 1,3-propene sultone. Specific examples of the chain monosulfonic acid ester are a compound in which a cyclic monosulfonic acid ester has been cut in the middle, and the like.

The disulfonic acid ester may be a cyclic disulfonic acid ester or a chain disulfonic acid ester. Specific examples of the cyclic disulfonic acid ester are compounds represented by the following respective chemical formulas (14-1) to (14-3), and the like. Specific examples of the chain disulfonic acid ester are a compound in which a cyclic disulfonic acid ester is cut in the middle, and the like.

[chemical formulas (14-1) to (14-3)]

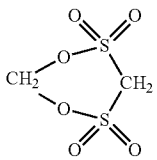 (14-1)

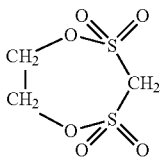 (14-2)

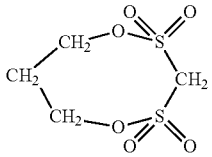 (14-3)

The acid anhydride is, for example, a carboxylic acid anhydride, a disulfonic acid anhydride, and a carboxylic acid and sulfonic acid anhydride. The content of the acid anhydride in the solvent is not particularly limited but is, for example, 0.01 wt % to 10 wt %.

Specific examples of the carboxylic acid anhydride are succinic anhydride, glutaric anhydride, and maleic anhydride. Specific examples of the disulfonic acid anhydride are ethanedisulfonic anhydride and propanedisulfonic anhydride. Specific examples of the carboxylic acid and sulfonic acid anhydride are sulfobenzoic anhydride, sulfopropionic anhydride, and sulfobutyric anhydride.

The diisocyanate compound is, for example, a compound represented by OCN—$C_nH_{2n}$—NCO (n represents an integer of 1 or more). The content of the diisocyanate compound in the solvent is not particularly limited but is, for example, 0.1 wt % to 10 wt %. Specific examples of the diisocyanate compound include OCN—$C_6H_{12}$—NCO.

In addition, the other materials are, for example, any one kind or two or more kinds among electrolyte salts such as a lithium salt. However, the second nitrile compound described above is excluded from the electrolyte salt described here.

The electrolyte salt may contain, for example, a salt other than a lithium salt. The salt other than a lithium salt is, for example, a salt of a light metal other than lithium.

Specific examples of the lithium salt are lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr).

Among these, any one kind or two or more kinds among lithium hexafluorophosphate, lithium tetrafluoroborate, lithium perchlorate, and lithium hexafluoroarsenate are preferable and lithium hexafluorophosphate is more preferable. This is because the internal resistance decreases.

In addition to these, the electrolyte salt may be any one kind or two or more kinds among compounds represented by the following respective chemical formulas (15) to (17). R41 and R43 may each represent the same kind of group as or different kinds of groups from each other. R51 to R53 may each represent the same kind of group as or different kinds of groups from each other. Of course, some of R51 to R53 may represent the same kind of group as each other. R61 and R62 may each represent the same kind of group as or different kinds of groups from each other.

[chemical formula 15]

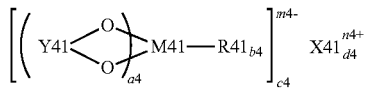

(15)

(X41 represents one of a group 1 element, a group 2 element in the long periodic table, or aluminum (Al). M41 represents any of a transition metal, a group 13 element, a group 14 element, or a group 15 element in the long periodic table. R41 represents a halogen group. Y41 represents any of —C(=O)—R42-C(=O)—, —C(=O)—CR43$_2$-, or —C(=O)—C(=O)—. Provided that R42 represents any of an alkylene group, a halogenated alkylene group, an arylene group, or a halogenated arylene group. R43 represents any of an alkyl group, a halogenated alkyl group, an aryl group, or a halogenated aryl group. a4 represents an integer of 1 to 4, b4 represents an integer of 0, 2, or 4, and c4, d4, m4, and n4 each represent an integer of 1 to 3.)

[chemical formula 16]

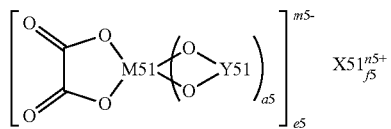

(16)

(X51 represents either of a group 1 element or a group 2 element in the long periodic table. M51 represents any of a transition metal, a group 13 element, a group 14 element, or a group 15 element in the long periodic table. Y51 represents any of —C(=O)—(CR51$_2$)$_{b5}$-C(=O)—, —R53$_2$C—(CR52$_2$)$_{c5}$-C(=O)—, —R53$_2$C—(CR52$_2$)$_{c5}$-CR53$_2$-, —R53$_2$C—(CR52$_2$)$_{c5}$-S(=O)$_2$—, —S(=O)$_2$—(CR52$_2$)$_{d5}$-S(=O)$_2$—, or —C(=O)—(CR52$_2$)$_{d5}$-S(=O)$_2$—. R51 and R53 each represent any of a hydrogen group, an alkyl group, a halogen group, or a halogenated alkyl group. Provided that at least one of R51 represents either of a halogen group or a halogenated alkyl group, and at least one of R53 represents either of a halogen group or a halogenated alkyl group. R52 represents any of a hydrogen group, an alkyl group, a halogen group, or a halogenated alkyl group.
a5, e5, and n5 each represent an integer of 1 or 2, b5 and d5 each represent an integer of 1 to 4, c5 represents an integer of 0 to 4, and f5 and m5 each represent an integer of 1 to 3.)

[chemical formula 17]

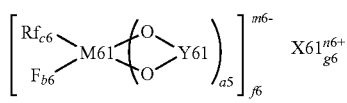

(17)

(X61 represents either of a group 1 element or a group 2 element in the long periodic table. M61 represents any of a transition metal, a group 13 element, a group 14 element, or a group 15 element in the long periodic table. Rf represents either of a fluorinated alkyl group or a fluorinated aryl group, and the fluorinated alkyl group and the fluorinated aryl group each have 1 to 10 carbon atoms. Y61 represents any of —C(=O)—(CR61)$_{d6}$-C(=O)—, —R62$_2$C—(CR61$_2$)$_{d6}$-C(O)—, —R62$_2$C—(CR61$_2$)$_{d6}$-CR62$_2$-, —R62$_2$C—(CR61$_2$)$_{d6}$-S(=O)$_2$-, —S(=O)$_2$—(CR61$_2$)$_{e6}$-S(=O)$_2$—, or —C(=O)—(CR61$_2$)$_{e6}$-S(=O)$_2$—. Provided that R61 represents any of a hydrogen group, an alkyl group, a halogen group, or a halogenated alkyl group. R62 represents any of a hydrogen group, an alkyl group, a halogen group, or a halogenated alkyl group, and at least one of R62 represents either of a halogen group or a halogenated alkyl group. a6, f6, and n6 each represent an integer of 1 or 2, b6, c6, and e6 each represent an integer of 1 to 4, d6 represents an integer of 0 to 4, and g6 and m6 each represent an integer of 1 to 3.)

The group 1 element is hydrogen (H), lithium (Li), sodium (Na), potassium (K), rubidium (Rb), cesium (Cs), and francium (Fr). The group 2 element is beryllium (Be), magnesium (Mg), calcium (Ca), strontium (Sr), barium (Ba), and radium (Ra). The group 13 element is boron (B), aluminum (Al), gallium (Ga), indium (In), and thallium (Tl). The group 14 element is carbon (C), silicon (Si), germanium (Ge), tin (Sn), and lead (Pb). The group 15 element is nitrogen (N), phosphorus (P), arsenic (As), antimony (Sb), and bismuth (Bi).

Specific examples of the compound represented by the chemical formula (15) are compounds represented by the following respective chemical formulas (15-1) to (15-6), and the like. Specific examples of the compound represented by the chemical formula (16) are compounds represented by the following respective chemical formulas (16-1) to (16-8), and the like. Specific examples of the compound represented by the chemical formula (17) are a compound represented by the following chemical formula (17-1), and the like.

[chemical formulas (15-1) to (15-6)]

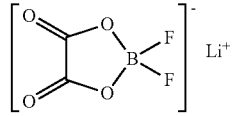

[15-1]

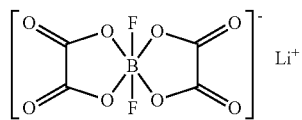

[15-2]

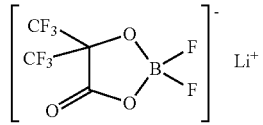

[15-3]

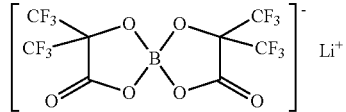

[15-4]

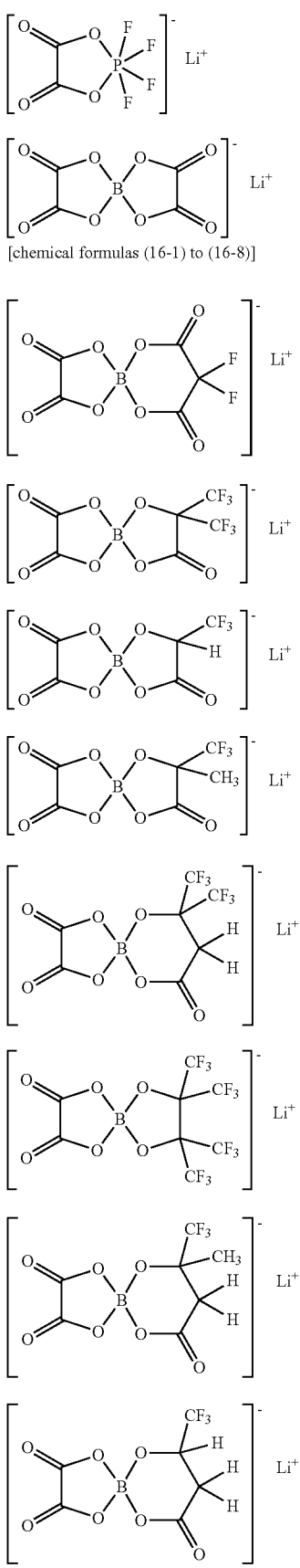

[chemical formulas (16-1) to (16-8)]

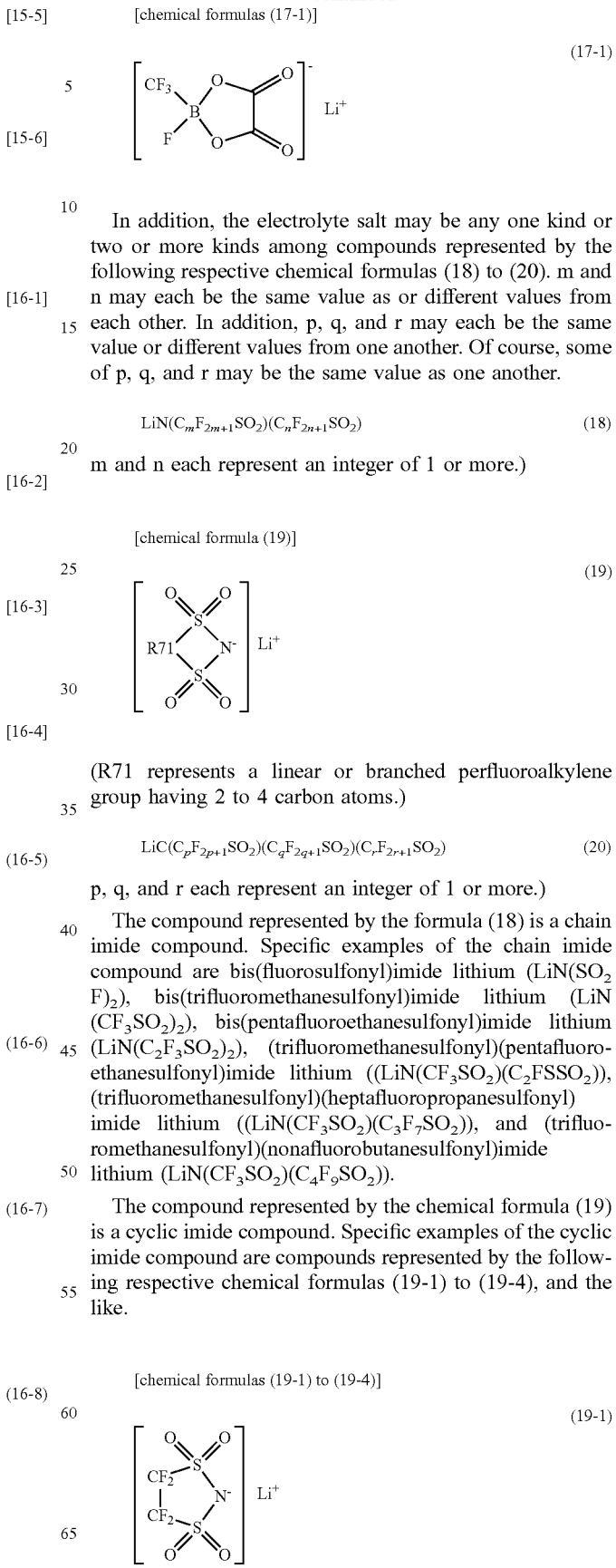

In addition, the electrolyte salt may be any one kind or two or more kinds among compounds represented by the following respective chemical formulas (18) to (20). m and n may each be the same value as or different values from each other. In addition, p, q, and r may each be the same value or different values from one another. Of course, some of p, q, and r may be the same value as one another.

$$LiN(C_mF_{2m+1}SO_2)(C_nF_{2n+1}SO_2) \qquad (18)$$

m and n each represent an integer of 1 or more.)

[chemical formula (19)]

(19)

(R71 represents a linear or branched perfluoroalkylene group having 2 to 4 carbon atoms.)

$$LiC(C_pF_{2p+1}SO_2)(C_qF_{2q+1}SO_2)(C_rF_{2r+1}SO_2) \qquad (20)$$

p, q, and r each represent an integer of 1 or more.)

The compound represented by the formula (18) is a chain imide compound. Specific examples of the chain imide compound are bis(fluorosulfonyl)imide lithium (LiN(SO$_2$F)$_2$), bis(trifluoromethanesulfonyl)imide lithium (LiN(CF$_3$SO$_2$)$_2$), bis(pentafluoroethanesulfonyl)imide lithium (LiN(C$_2$F$_5$SO$_2$)$_2$), (trifluoromethanesulfonyl)(pentafluoroethanesulfonyl)imide lithium ((LiN(CF$_3$SO$_2$)(C$_2$F$_5$SO$_2$)), (trifluoromethanesulfonyl)(heptafluoropropanesulfonyl)imide lithium ((LiN(CF$_3$SO$_2$)(C$_3$F$_7$SO$_2$)), and (trifluoromethanesulfonyl)(nonafluorobutanesulfonyl)imide lithium (LiN(CF$_3$SO$_2$)(C$_4$F$_9$SO$_2$)).

The compound represented by the chemical formula (19) is a cyclic imide compound. Specific examples of the cyclic imide compound are compounds represented by the following respective chemical formulas (19-1) to (19-4), and the like.

[chemical formulas (19-1) to (19-4)]

(19-1)

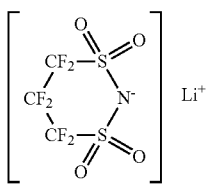

(19-2)

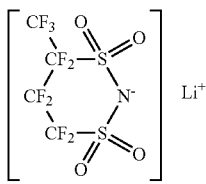

(19-3)

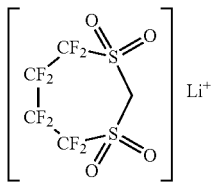

(19-4)

The compound represented by the chemical formula (20) is a chain methide compound. Specific examples of the chain methide compound are lithium tris(trifluoromethanesulfonyl)methide ($LiC(CF_3SO_2)_3$), and the like.

The content of the electrolyte salt is not particularly limited, but among these, it is preferably 0.3 mol/kg to 3.0 mol/kg with respect to the solvent. This is because high ion conductivity is obtained.

In addition, the other materials may be any one kind or two or more kinds among materials other than the materials described above. The materials other than the materials described above are, for example, phosphorus and fluorine-containing salts such as lithium difluorophosphate ($LiPF_2O_2$) and lithium fluorophosphate ($Li_2PFO_3$). The content of the phosphorus and fluorine-containing salt in the electrolytic solution is not particularly limited.

This electrolytic solution is produced, for example, according to the following procedure.

In the case of producing an electrolytic solution, for example, an electrolyte salt is added to a solvent, and then the solvent is stirred to dissolve or disperse the electrolyte salt in the solvent. Subsequently, the cyclic nitrogen compound and the nitrile compound are added to the solvent in which the electrolyte salt is dissolved or dispersed, and then the solvent is stirred to dissolve or disperse each of the cyclic nitrogen compound and the nitrile compound in the solvent.

In this case, as the nitrile compound, only the first nitrile compound may be used, only the second nitrile compound may be used, or the first nitrile compound and the second nitrile compound may be used concurrently.

The kind of cyclic nitrogen compound may be only one kind or two or more kinds. In the same manner, the kind of first nitrile compound may be only one kind or two or more kinds as well as the kind of second nitrile compound may be only one kind or two or more kinds.

An electrolytic solution containing a nitrile compound together with a cyclic nitrogen compound is completed by this. This electrolytic solution may contain, for example, the first nitrile compound together with the cyclic nitrogen compound, the second nitrile compound together with the cyclic nitrogen compound, or the first nitrile compound and the second nitrile compound together with the cyclic nitrogen compound.

According to this electrolytic solution, a nitrile compound (either or both of a first nitrile compound and a second nitrile compound) is contained together with a cyclic nitrogen compound. In this case, the chemical stability of the electrolytic solution is specifically improved by the synergistic action of the cyclic nitrogen compound and the nitrile compound as described above unlike a case in which the electrolytic solution does not contain a nitrile compound together with a cyclic nitrogen compound.

Hence, the decomposition reaction of the electrolytic solution is remarkably suppressed, and thus the battery characteristics of a secondary battery using this electrolytic solution can be improved.

The case in which the electrolytic solution does not contain a nitrile compound together with a cyclic nitrogen compound is, for example, the following cases. Firstly, it is a case in which the electrolytic solution contains only a cyclic nitrogen compound, and thus the electrolytic solution does not contain a nitrile compound. Secondly, it is a case in which the electrolytic solution contains only a nitrile compound, and thus the electrolytic solution does not contain a cyclic nitrogen compound. Thirdly, it is a case in which the electrolytic solution does not contain both of a cyclic nitrogen compound and a nitrile compound.

The chemical stability of the electrolytic solution is further improved particularly when the halogen group is a fluorine group or the like, the monovalent hydrocarbon group is an alkyl group or the like, and the monovalent halogenated hydrocarbon group is a group in which one or two or more hydrogen groups in a monovalent hydrocarbon group are substituted with a halogen group, with regard to each of the chemical formulas (1) to (6). Consequently, the decomposition reaction of the electrolytic solution is further suppressed and thus a higher effect can be obtained.

In addition, chemical stability of the electrolytic solution is further improved when the n-valent hydrocarbon group is a group in which n hydrogen groups have been eliminated from a hydrocarbon, the n-valent halogenated hydrocarbon group is a group in which one or two or more hydrogen groups in an n-valent hydrocarbon group have been substituted with a halogen group, the n-valent oxygen-containing group is an oxygen-based bonding group or the like, the n-valent nitrogen-containing group is a nitrogen-based bonding group or the like, the n-valent sulfur-containing group is a sulfur-based bonding group or the like, the n-valent phosphorus-containing group is a phosphorus-based bonding group or the like, and the halogen element is fluorine or the like, with regard to the chemical formula (7). Consequently, the decomposition reaction of the electrolytic solution is further suppressed and thus a higher effect can be obtained.

In addition, chemical stability of the electrolytic solution is further improved when the metal element is lithium or the like, the halogen group is a fluorine group or the like, the monovalent hydrocarbon group is an alkyl group or the like, the monovalent halogenated hydrocarbon group is a group in which one or two or more hydrogen groups in a monovalent hydrocarbon group have been substituted with a halogen group, the monovalent oxygen-containing group is an oxygen-based bonding group or the like, the monovalent nitrogen-containing group is a nitrogen-based bonding group or the like, the monovalent sulfur-containing group is a sulfur-based bonding group or the like, the monovalent phosphorus-containing group is a phosphorus-based bonding group or the like, and the halogen element is fluorine or the like, with regard to the chemical formula (8). Consequently, the decomposition reaction of the electrolytic solution is further suppressed and thus a higher effect can be obtained.

In addition, when R101 to R121 are each either of a fluorine group or a monovalent fluorinated hydrocarbon group, the chemical stability of the electrolytic solution is further improved and thus a higher effect can be obtained. In this case, when the monovalent fluorinated hydrocarbon group is a perfluoroalkyl group and the perfluoroalkyl group has 1 to 3 carbon atoms, the chemical stability of the electrolytic solution is further improved and thus a higher effect can be obtained.

In addition, when R101 to R121 are each a fluorine group or R101 to R121 are each a monovalent fluorinated hydrocarbon group, the chemical stability of the electrolytic solution is further improved and thus a higher effect can be obtained.

In addition, when the second nitrile compound contains the compound represented by the chemical formula (9), the chemical stability of the electrolytic solution is further improved and thus a higher effect can be obtained. In this case, when R127 is an alkylene group and the alkylene group has 1 to 8 carbon atoms, the chemical stability of the electrolytic solution is further improved and thus a still higher effect can be obtained.

In addition, when R123 to R126 are each a nitrile group, the chemical stability of the electrolytic solution is further improved and thus a higher effect can be obtained.

In addition, when the content of the cyclic nitrogen compound in the electrolytic solution is 0.1 wt % to 3 wt, the content of the first nitrile compound in the electrolytic solution is 1 wt % to 5 wt %, and the content of the second nitrile compound in the electrolytic solution is 0.1 wt % to 1 wt %, the chemical stability of the electrolytic solution is further improved and thus a higher effect can be obtained.

Next, a secondary battery in which the electrolytic solution described above is used will be described.

Figure 2:
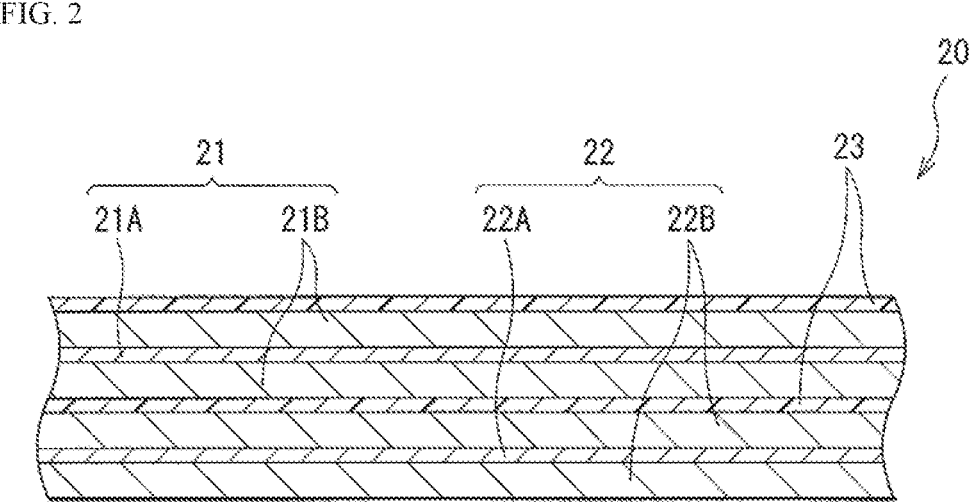
FIG. 2 is an enlarged cross-sectional view which illustrates a configuration of a part of a wound electrode body illustrated in FIG. 1.

FIG. 1 illustrates a cross-sectional configuration of a secondary battery, and FIG. 2 illustrates an enlarged cross-sectional configuration of a part of a wound electrode body 20 illustrated in FIG. 1.

The secondary battery described here is, for example, a lithium ion secondary battery in which the capacity of a negative electrode 22 is obtained by occlusion and release of lithium which is an electrode reactant.

This secondary battery has a so-called cylindrical battery structure, and for example, a pair of insulating plates 12 and 13 and the wound electrode body 20 which is a battery element are accommodated in a hollow columnar battery can 11 as illustrated in FIG. 1. In the wound electrode body 20, for example, a positive electrode 21 and the negative electrode 22 are stacked with a separator 23 interposed therebetween and then the positive electrode 21, the negative electrode 22, and the separator 23 are wound. This wound electrode body 20 is impregnated with an electrolytic solution which is a liquid electrolyte.

The battery can 11 has, for example, a hollow structure in which one end portion is closed and the other end portion is open and contains, for example, any one kind or two or more kinds among iron, aluminum, any alloy thereof, and the like. Nickel and the like may be plated on the surface of this battery can 11. A pair of insulating plates 12 and 13 are disposed so as to sandwich the wound electrode body 20 as well as to extend perpendicularly to the winding peripheral surface.

A battery lid 14, a safety valve mechanism 15, and a thermistor (PTC element) 16 are crimped at the open end portion of the battery can 11 with a gasket 17. The battery can 11 is hermetically sealed by this. The battery lid 14 is formed of, for example, the same material as that of the battery can 11. The safety valve mechanism 15 and the thermistor 16 are each provided inside the battery lid 14, and the safety valve mechanism 15 is electrically connected to the battery lid 14 via the thermistor 16. In this safety valve mechanism 15, a disk plate 15A is inverted when the internal pressure is equal to or higher than a certain value due to an internal short circuit, heating from the outside, or the like. The electrical connection between the battery lid 14 and the wound electrode body 20 is disconnected by this. In order to prevent abnormal heat generation due to a large current, the resistance of the thermistor 16 increases in association with an increase in temperature. The gasket 17 is formed of, for example, an insulating material, and the surface of the gasket 17 may be coated with asphalt and the like.

For example, a center pin 24 is inserted into the winding center of the wound electrode body 20. However, the center pin 24 may not be inserted into the winding center of the wound electrode body 20. A positive electrode lead 25 is attached to the positive electrode 21 as well as a negative electrode lead 26 is attached to the negative electrode 22. The positive electrode lead 25 contains, for example, a conductive material such as aluminum. This positive electrode lead 25 is, for example, attached to the safety valve mechanism 15 as well as is electrically connected to the battery lid 14. The negative electrode lead 26 contains, for example, a conductive material such as nickel. This negative electrode lead 26 is, for example, attached to the battery can 11 and is electrically connected to the battery can 11.

The positive electrode 21 includes, for example, a positive electrode current collector 21A and a positive electrode active material layer 21B provided on both sides of the positive electrode current collector 21A as illustrated in FIG. 2. However, the positive electrode active material layer 21B may be provided only on one side of the positive electrode current collector 21A.

The positive electrode current collector 21A contains, for example, any one kind or two or more kinds among conductive materials. The kind of conductive material is not particularly limited, but the conductive material is, for example, metal materials such as aluminum, nickel, and stainless steel. This positive electrode current collector 21A may be a single layer or a multilayer.

The positive electrode active material layer 21B contains any one kind or two or more kinds among positive electrode materials capable of occluding and releasing lithium as a positive electrode active material. However, the positive electrode active material layer 21B may contain any one kind or two or more kinds among other materials such as a positive electrode binder and a positive electrode conducting agent in addition to the positive electrode active material.

The positive electrode material is preferably a lithium-containing compound, and more specifically, the positive electrode material is preferably either or both of a lithium-containing composite oxide and a lithium-containing phosphate compound. This is because a high energy density is obtained.

The lithium-containing composite oxide is an oxide containing lithium and one or two or more other elements (elements other than lithium) as constituent elements and has, for example, any crystal structure of a layered rock salt type, a spinel type or the like. The lithium-containing phosphate compound is a phosphate compound containing lithium and one or two or more other elements as constituent elements and has, for example, an olivine type crystal structure.

The kinds of other elements are not particularly limited as long as the other elements are any one kind or two or more kinds among arbitrary elements. Among these, it is more preferable that the other elements be any one kind or two or more kinds among the elements belonging to groups 2 to 15 in the long periodic table. More specifically, it is more preferable that the other elements include any one kind or two or more kinds of metal elements among nickel (Ni), cobalt (Co), manganese (Mn), and iron (Fe). This is because a high voltage is obtained.

The lithium-containing composite oxide having a layered rock salt type crystal structure is, for example, a compound represented by the following respective chemical formulas (21) to (23), and the like.

$$Li_aMn_{(1-b-c)}Ni_bM11cO_{(2-d)}F_e \quad (21)$$

(M11 represents at least one kind among cobalt (Co), magnesium (Mg), aluminum (Al), boron (B), titanium (Ti), vanadium (V), chromium (Cr), iron (Fe), copper (Cu) zinc (Zn), zirconium (Zr), molybdenum (Mo), tin (Sn), calcium (Ca), strontium (Sr), and tungsten (W). a to e satisfy $0.8 \leq a \leq 1.2$, $0 < b < 0.5$, $0 \leq c \leq 0.5$, $(b+c)<$, $-0.1 \leq d \leq 0.2$, and $0 \leq e \leq 0.1$. Provided that the composition of lithium varies depending on the charge and discharge state, and a is a value in a fully discharged state.)

$$Li_aNi_{(1-b)}M12_bO_{(2-c)}F_d \quad (22)$$

(M12 represents at least one kind among cobalt (Co), manganese (Mn), magnesium (Mg), aluminum (Al), boron (B), titanium (Ti), vanadium (V), chromium (Cr), iron (Fe), copper (Cu) zinc (Zn), molybdenum (Mo), tin (Sn), calcium (Ca), strontium (Sr), and tungsten (W). a to d satisfy $0.8 \leq a \leq 1.2$, $0.005 \leq b \leq 0.5$, $-0.1 \leq c \leq 0.2$, and $0 \leq d \leq 0.1$. Provided that the composition of lithium varies depending on the charge and discharge state, and a is a value in a fully discharged state.)

$$Li_aCo_{(1-b)}M13_bO_{(2-c)}F_d \quad (23)$$

(M13 represents at least one kind among nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). a to d satisfy $0.8 \leq a \leq 1.2$, $0 \leq b \leq 0.5$, $-0.1 \leq c \leq 0.2$, and $0 \leq d \leq 0.1$. Provided that the composition of lithium varies depending on the charge and discharge state, and a is a value in a fully discharged state.)

Specific examples of the lithium-containing composite oxide having a layered rock salt type crystal structure are $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{0.2}Mn_{0.52}Co_{0.175}Ni_{0.1}O_2$, and $Li_{1.15}(Mn_{0.65}Ni_{0.22}Co_{0.13})O_2$, and the like.

Incidentally, in a case in which the lithium-containing composite oxide having a layered rock salt type crystal structure contains nickel, cobalt, manganese, and aluminum as constituent elements, the atomic ratio of nickel is preferably 50 atomic % or more. This is because a high energy density is obtained.

The lithium-containing composite oxide having a spinel type crystal structure is, for example, a compound represented by the following chemical formula (24).

$$Li_aMn_{(2-b)}M14_bO_cF_d \quad (24)$$

(M14 represents at least one kind among cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). a to d satisfy $0.9 \leq a \leq 1.1$, $0 \leq b \leq 0.6$, $3.7 \leq c \leq 4.1$, and $0 \leq d \leq 0.1$. Provided that the composition of lithium varies depending on the charge and discharge state, and a is a value in a fully discharged state.)

Specific examples of the lithium-containing composite oxide having a spinel type crystal structure are $LiMn_2O_4$ and the like.

The lithium-containing phosphate compound having an olivine type crystal structure is, for example, a compound represented by the following chemical formula (25), and the like.

$$Li_aM15PO_4 \quad (25)$$

(M15 represents at least one kind among cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr). a satisfies $0.9 \leq a \leq 1.1$. Provided that the composition of lithium varies depending on the charge and discharge state, and a is a value in a fully discharged state.)

Specific examples of the lithium-containing phosphate compound having an olivine type crystal structure are $LiFePO_4$, $LiMnPO_4$, $LiFe_{0.5}Mn_{0.5}PO_4$, and $LiFe_{0.3}Mn_{0.7}PO_4$, and the like.

The lithium-containing composite oxide may be a compound represented by the following chemical formula (26) and the like.

$$(Li_2MnO_3)_x(LiMnO_2)_{1-x} \quad (26)$$

(x satisfies $0 \leq x \leq 1$. Provided that the composition of lithium varies depending on the charge and discharge state, and x is a value in a fully discharged state.)

The positive electrode material may be, for example, any one kind or two or more kinds among an oxide, a disulfide, a chalcogenide, a conductive polymer, and the like in addition to these. The oxide is, for example, titanium oxide, vanadium oxide, and manganese dioxide. The disulfide is, for example, titanium disulfide and molybdenum sulfide. The chalcogenide is, for example, niobium selenide. The conductive polymer is, for example, sulfur, polyaniline, and polythiophene. However, the positive electrode material may be materials other than those described above.

The positive electrode binder contains, for example, any one kind or two or more kinds among synthetic rubber, a polymer compound, and the like. The synthetic rubber is, for example, styrene-butadiene-based rubber, fluorine-based rubber, and ethylene propylene diene. The polymer compound is, for example, polyvinylidene fluoride and polyimide.

The positive electrode conducting agent contains, for example, any one kind or two or more kinds among carbon materials and the like. This carbon material is, for example, graphite, carbon black, acetylene black, and ketjen black. However, the positive electrode conducting agent may be a metal material, a conductive polymer, and the like as long as it is a material exhibiting conductivity.

The negative electrode 22 includes, for example, a negative electrode current collector 22A and a negative electrode active material layer 22B provided on both sides of the negative electrode current collector 22A as illustrated in FIG. 2. However, the negative electrode active material layer 22B may be provided only on one side of the negative electrode current collector 22A.

The negative electrode current collector 22A contains, for example, any one kind or two or more kinds among conductive materials. The kind of conductive material is not particularly limited, but the conductive material is, for example, metal material such as copper, aluminum, nickel, and stainless steel. This negative electrode current collector 22A may be a single layer or a multilayer.

It is preferable that the surface of the negative electrode current collector 22A be roughened. This is because the close contact property of the negative electrode active material layer 22B with respect to the negative electrode current collector 22A is improved by a so-called anchor effect. In this case, the surface of the negative electrode current collector 22A may be roughened at least in a region facing the negative electrode active material layer 22B. The method of roughening is, for example, a method in which fine particles are formed by utilizing an electrolytic treatment. In the electrolytic treatment, fine particles are formed on the surface of the negative electrode current collector 22A in an electrolytic bath by an electrolytic process and thus irregularities are provided on the surface of the negative electrode current collector 22A. A copper foil fabricated by an electrolytic process is generally called an electrolytic copper foil.

The negative electrode active material layer 22B contains any one kind or two or more kinds among negative electrode materials capable of occluding and releasing lithium as a negative electrode active material. However, the negative electrode active material layer 22B may contain any one kind or two or more kinds among other materials such as a negative electrode binder and a negative electrode conducting agent in addition to the negative electrode active material.

In order to prevent inadvertent precipitation of lithium metal on the negative electrode 22 during charge, it is preferable that the chargeable capacity of the negative electrode material be larger than the discharge capacity of the positive electrode 21. In other words, it is preferable that the electrochemical equivalent of the negative electrode material capable of occluding and releasing lithium is larger than the electrochemical equivalent of the positive electrode 21.

The negative electrode material is, for example, any one kind or two or more kinds among carbon materials and the like. This is because the change in the crystal structure at the time of occlusion and release of lithium is significantly small and thus a high energy density is stably obtained. In addition, this is because a carbon material also functions as a negative electrode conducting agent and thus the conductivity of the negative electrode active material layer 22B is improved.

The carbon material is, for example, graphitizable carbon, non-graphitizable carbon, and graphite. However, the interplanar spacing of the (002) plane in non-graphitizable carbon is preferably 0.37 nm or more as well as the interplanar spacing of the (002) plane in graphite is preferably 0.34 nm or less. More specifically, the carbon material is, for example, a pyrolytic carbon, a coke, a glassy carbon fiber, a fired body of an organic polymer compound, activated carbon, and a carbon black. This coke includes pitch coke, needle coke, petroleum coke, and the like. The fired body of an organic polymer compound is a product obtained by firing (carbonizing) a polymer compound such as a phenol resin or a furan resin at a proper temperature. The carbon material may be low-crystalline carbon subjected to a heat treatment at a temperature of about 1000° C. or less or amorphous carbon in addition to these. Incidentally, the shape of the carbon material may be any one of a fibrous shape, a spherical shape, a granular shape, or a scaly shape.

In addition, the negative electrode material is, for example, a material (metal-based material) containing any one kind or two or more kinds among metal elements and metalloid elements as constituent elements.

This is because a high energy density is obtained.

The metal-based material may be any one of a simple substance, an alloy, or a compound, two or more kinds among these, or a material having a phase formed of one kind or two or more kinds among these at least at a part. However, the alloy includes a material containing one or more kinds of metal elements and one or more kinds of metalloid elements in addition to a material composed of two or more kinds of metal elements. In addition, the alloy may contain a nonmetallic element. The construction of this metal-based material is, for example, a solid solution, a eutectic crystal (eutectic mixture), an intermetallic compound, and coexisting material of two or more kinds thereof.

The metal element and metalloid element described above are, for example, any one kind or two or more kinds among metal elements and metalloid elements capable of forming an alloy with lithium. Specifically, the metal element and metalloid element is, for example, magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc, hafnium (Hf), zirconium, yttrium (Y), palladium (Pd), and platinum (Pt).

Among these, either or both of silicon and tin is preferable. This is because the ability thereof to occlude and release lithium is excellent and a remarkably high energy density is obtained.

The material containing either or both of silicon and tin as a constituent element may be any of a simple substance, an alloy, or a compound of silicon, any of a simple substance, an alloy, or a compound of tin, two or more kinds among these, or a material having a phase formed of one kind or two or more kinds among these at least at a part. The term "simple substance" described here means merely a single substance (which may contain impurities in trace amounts) in a general sense and does not necessarily mean a purity of 100%.

The alloy of silicon contains, for example, any one kind or two or more kinds among tin, nickel, copper, iron, cobalt, manganese, zinc, indium, silver, titanium, germanium, bismuth, antimony, chromium, and the like as a constituent element other than silicon. The compound of silicon contains, for example, any one kind or two or more kinds among carbon, oxygen and the like as a constituent element other than silicon. Incidentally, the compound of silicon may contain, for example, any one kind or two or more kinds among a series of elements described with regard to the alloy of silicon as a constituent element other than silicon.

Specific examples of each of the alloy of silicon and the compound of silicon are $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), and $LiSiO$. Incidentally, v in $SiOv$ may be $0.2<v<1.4$.

The alloy of tin contains, for example, any one kind or two or more kinds among silicon, nickel, copper, iron, cobalt, manganese, zinc, indium, silver, titanium, germanium, bismuth, antimony, chromium, and the like as a constituent element other than tin. The compound of tin contains, for example, any one kind or two or more kinds among carbon, oxygen and the like as a constituent element other than tin. Incidentally, the compound of tin may contain, for example, any one kind or two or more kinds among a series of elements described with regard to the alloy of tin as a constituent element other than tin.

Specific examples of the alloy of tin and the compound of tin are $SnO_w$ ($0<w\leq2$), $SnSiO_3$, $LiSnO$, $Mg_2Sn$, and the like.

Particularly the material containing tin as a constituent element is preferably, for example, a material (Sn-containing material) containing a second constituent element and a third constituent element together with tin which is the first constituent element. The second constituent element includes, for example, any one kind or two or more kinds among cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth, silicon, and the like. The third constituent element includes, for example, any one kind or two or more kinds among boron, carbon, aluminum, phosphorus, and the like. This is because a high battery capacity, excellent cycle characteristics and the like are obtained as the Sn-containing material contains the second and third constituent elements.

Among these, the Sn-containing material is preferably a material (SnCoC-containing material) containing tin, cobalt, and carbon as constituent elements. In this SnCoC-containing material, for example, the content of carbon is 9.9 mass % to 29.7 mass %, and the proportion (Co/(Sn+Co)) of content between tin and cobalt is 20 mass % to 70 mass %. This is because a high energy density is obtained.

The SnCoC-containing material has a phase containing tin, cobalt, and carbon, and the phase is preferably low crystalline or amorphous. This phase is a reaction phase capable of reacting with lithium, and thus excellent characteristics are obtained by the presence of this reaction phase. It is preferable that the half-value width (diffraction angle $2\theta$) of the diffraction peak of this reaction phase to be obtained by X-ray diffraction be 1° or more in a case in which CuK$\alpha$ ray is used as the specific X-ray as well as the scanning speed is set to 1°/min. This is because lithium is more smoothly occluded and released as well as the reactivity with the electrolytic solution is diminisded. Incidentally, in addition to the low crystalline or amorphous phase, the SnCoC-containing material includes a phase containing a single substance or a part of the respective constituent elements in some cases.

Whether or not the diffraction peak obtained by X-ray diffraction corresponds to the reaction phase capable of reacting with lithium can be easily judged by comparing the X-ray diffraction charts before and after the electrochemical reaction with lithium. For example, the diffraction peak corresponds to the reaction phase capable of reacting with lithium when the position of the diffraction peak changes before and after the electrochemical reaction with lithium. In this case, for example, a diffraction peak of a low crystalline or amorphous reaction phase is observed at between $2\theta=20°$ to 50°. Such a reaction phase contains, for example, the respective constituent elements described above, and it is considered that the reaction phase is low crystallized or amorphized mainly by the presence of carbon.

In the SnCoC-containing material, it is preferable that at least a part of carbon which is a constituent element be bonded to a metal element or a metalloid element which is another constituent element. This is because the aggregation or crystallization of tin and the like is suppressed. The bonding state of element can be confirmed using, for example, X-ray photoelectron spectroscopy (XPS). In commercially available devices, for example, Al-K$\alpha$ ray or Mg-K$\alpha$ ray is used as soft X-ray. In a case in which at least a part of carbon is bonded to a metal element, a metalloid element or the like, the peak of the associated wave of 1s orbital (C1s) of carbon appears in a region lower than 284.5 eV. Incidentally, It is assumed that the peak of 4f orbital (Au4f) of gold atom is energy-calibrated so as to be obtained at 84.0 eV. At this time, surface-contaminating carbon is usually present on the surface of the material, and thus the peak of C1s of the surface-contaminating carbon is set to 284.8 eV and is taken as an energy reference. In the XPS measurement, the waveform of the peak of C1s is obtained in a form including the peak of surface-contaminating carbon and the peak of carbon in the SnCoC-containing material. For this reason, the two peaks are separated from each other, for example, by analyzing the waveform using commercially available software. In the analysis of waveform, the position of the main peak present on the lowest bound energy side is taken as the energy reference (284.8 eV).

This SnCoC-containing material is not limited to a material (SnCoC) containing only tin, cobalt, and carbon as constituent elements. This SnCoC-containing material may contain any one kind or two or more kinds among silicon, iron, nickel, chromium, indium, niobium, germanium, titanium, molybdenum, aluminum, phosphorus, gallium, and bismuth as constituent elements in addition to tin, cobalt, and carbon.

In addition to the SnCoC-containing material, a material (SnCoFeC-containing material) containing tin, cobalt, iron, and carbon as constituent elements is also preferable. The composition of this SnCoFeC-containing material is arbitrary. As an example, the content of carbon is 9.9 mass % to 29.7 mass %, the content of iron is 0.3 mass % to 5.9 mass %, and the proportion (Co/(Sn+Co)) of content between tin and cobalt is 30 mass % to 70 mass % in a case in which the content of iron is set to be small. In addition, the content of carbon is 11.9 mass % to 29.7 mass %, the proportion ((Co+Fe)/(Sn+Co+Fe)) of content among tin, cobalt, and iron is 26.4 mass % to 48.5 mass %, and the proportion (Co/(Co+Fe)) of content between cobalt and iron is 9.9 mass % to 79.5 mass % in a case in which the content of iron is set to be great. This is because a high energy density is obtained in such a composition range. Incidentally, the physical properties (half-value width and the like) of the SnCoFeC-containing material are the same as those of the SnCoC-containing material described above.

The negative electrode material may be, for example, any one kind or two or more kinds among a metal oxide, a polymer compound, and the like in addition to this. The metal oxide is, for example, iron oxide, ruthenium oxide, and molybdenum oxide. The polymer compound is, for example, polyacetylene, polyaniline, and polypyrrole.

Among these, the negative electrode material preferably contains both a carbon material and a metal-based material for the following reasons.

The metal-based material, particularly a material containing either or both of silicon and tin as a constituent element has an advantage of having a high theoretical capacity but has a concern of being likely to severely expand and contract at the time of charge and discharge. On the other hand, the carbon material has a concern of having a low theoretical capacity but has an advantage of hardly expanding and contracting at the time of charge and discharge. Hence, expansion and contraction at the time of charge and discharge are suppressed while obtaining a high theoretical capacity (namely, battery capacity) by using both the carbon material and the metal-based material.

The negative electrode active material layer 22B is formed, for example, by any one kind or two or more kinds of methods among a coating method, a gas phase method, a liquid phase method, a thermal spraying method, a firing method (sintering method) and the like. The coating method is, for example, a method in which a particulate (powdery) negative electrode active material is mixed with a negative electrode binder and the like, and then the mixture is dispersed in an organic solvent or the like and then applied onto the negative electrode current collector 22A. The gas phase method is, for example, a physical deposition method and a chemical deposition method. More specifically, it is, for example, a vacuum evaporation method, a sputtering method, an ion plating method, a laser ablation method, thermal chemical vapor deposition, a chemical vapor deposition (CVD) method, and a plasma chemical vapor deposition method. The liquid phase method is, for example, an electrolytic plating method and an electroless plating method. The thermal spraying method is a method in which a negative electrode active material in a molten state or a semi-molten state is sprayed onto the negative electrode current collector 22A. The firing method is, for example, a method in which a mixture dispersed in an organic solvent or the like is applied onto the negative electrode current collector 22A by a coating method and then subjected to a heat treatment at a temperature higher than the melting point of the negative electrode binder and the like. As this firing method, for example, an atmosphere firing method, a reactive firing method, and a hot press firing method can be used.

In this secondary battery, the electrochemical equivalent of the negative electrode material capable of occluding and releasing lithium is larger than the electrochemical equivalent of the positive electrode in order to prevent inadvertent precipitation of lithium on the negative electrode 22 during charge as described above. In addition, when the open circuit voltage (namely, battery voltage) at the time of complete charge is 4.25 V or more, the amount of lithium released per unit mass increases as compared with a case in which the open circuit voltage at the time of complete charge is 4.20 V even when the same positive electrode active material is used, and thus the amounts of the positive electrode active material and the negative electrode active material are adjusted in accordance with this. A high energy density is obtained by this.

The open circuit voltage at the time of complete charge is not particularly limited but is preferably 4.25 V or more as described above. Among these, the open circuit voltage at the time of complete charge is more preferably 4.35 V or more. This is because advantages due to the cyclic nitrogen compound, the first nitrile compound, and the second nitrile compound described above are obtained even when the open circuit voltage at the time of complete charge is set to be remarkably high and thus excellent battery characteristics are obtained.

The separator 23 is disposed between the positive electrode 21 and the negative electrode 22, for example, as illustrated in FIG. 2. This separator 23 separates the positive electrode 21 and the negative electrode 22 from each other as well as allows lithium ions to pass while preventing a short circuit of the current caused by the contact between the two electrodes.

This separator 23 is, for example, any one kind or two or more kinds among porous membranes of synthetic resins, ceramics, and the like and may be a laminated membrane of two or more kinds of porous membranes. Synthetic resins are, for example, polytetrafluoroethylene, polypropylene, and polyethylene.

Particularly, the separator 23 may include, for example, the porous membrane (substrate layer) described above and a polymer compound layer provided on one side or both sides of the substrate layer. This is because the close contact property of the separator 23 with respect to each of the positive electrode 21 and the negative electrode 22 is improved and thus distortion of the wound electrode body 20 is suppressed. By this, leakage of the electrolytic solution impregnated in the substrate layer is also suppressed as well as the decomposition reaction of the electrolytic solution is suppressed and thus swelling of battery is suppressed as well as the resistance hardly increases even when charge and discharge are repeated.

The polymer compound layer contains, for example, a polymer compound such as polyvinylidene fluoride. This is because a polymer compound has an excellent physical strength as well as is electrochemically stable. However, the polymer compound may be one other than polyvinylidene fluoride. In the case of forming this polymer compound layer, for example, a substrate layer is coated with a solution in which a polymer compound is dissolved in an organic solvent or the like and then dried. Incidentally, the substrate layer may be immersed in the solution and then dried. This polymer compound layer may contain, for example, any one kind or two or more kinds among insulating particles such as inorganic particles. The kind of inorganic particles is, for example, aluminum oxide and aluminum nitride.

The wound electrode body 20 is impregnated with an electrolytic solution as described above. This electrolytic solution has the same configuration as that of the electrolytic solution of the present technology described above. In other words, the electrolytic solution contains a nitrile compound together with a cyclic nitrogen compound.

This secondary battery operates, for example, as follows.

At the time of charge, lithium ions are released from the positive electrode 21 as well as these lithium ions are occluded into the negative electrode 22 via the electrolytic solution. On the other hand, at the time of discharge, lithium ions are released from the negative electrode 22 as well as these lithium ions are occluded into the positive electrode 21 via the electrolytic solution.

This secondary battery is produced, for example, according to the following procedure.

In the case of fabricating the positive electrode 21, a positive electrode mixture is first prepared by mixing a positive electrode active material and, if necessary, a positive electrode binder, a positive electrode conducting agent and the like. Subsequently, a paste-like positive electrode mixture slurry is prepared by dispersing the positive electrode mixture in an organic solvent or the like. Subsequently, the positive electrode active material layer 21B is formed by applying the positive electrode mixture slurry onto both sides of the positive electrode current collector 21A and then drying the positive electrode mixture slurry. Subsequently, the positive electrode active material layer 21B is compression-molded using a roll press machine or the like while heating the positive electrode active material layer 21B if necessary. In this case, compression molding may be repeated a plurality of times.

In the case of fabricating the negative electrode 22, the negative electrode active material layer 22B is formed on both sides of the negative electrode current collector 22A according to the same procedure as that for the positive electrode 21 described above. Specifically, a paste-like negative electrode mixture slurry is prepared by mixing a negative electrode active material, a negative positive electrode binder, a negative electrode conducting agent, and the like to prepare a negative electrode mixture and then dispersing the negative electrode mixture in an organic solvent or the like. Subsequently, the negative electrode active material layer 22B is formed by applying the negative electrode mixture slurry onto both sides of the negative electrode current collector 22A and then drying the negative electrode mixture slurry. Finally, the negative electrode active material layer 22B is compression-molded using a roll press machine or the like.

In the case of assembling the secondary battery, the positive electrode lead 25 is attached to the positive electrode current collector 21A by a welding method or the like as well as the negative electrode lead 26 is attached to the negative electrode current collector 22A by a welding method or the like. Subsequently, the wound electrode body 20 is formed by stacking the positive electrode 21 and the negative electrode 22 with the separator 23 interposed therebetween and winding the positive electrode 21, the negative electrode 22, and the separator 23. Subsequently, the center pin 24 is inserted into the winding center of the wound electrode body 20.

Subsequently, the wound electrode body 20 is accommodated inside the battery can 11 while sandwiching the wound electrode body 20 with the pair of insulating plates 12 and 13. In this case, the tip portion of the positive electrode lead 25 is attached to the safety valve mechanism 15 by a welding method or the like as well as the tip portion of the negative electrode lead 26 is attached to the battery can 11 by a welding method or the like. Subsequently, the wound electrode body 20 is impregnated with the electrolytic solution by injecting the electrolytic solution into the battery can 11. Finally, the battery lid 14, the safety valve mechanism 15, and the thermistor 16 are crimped at the open end portion of the battery can 11 with the gasket 17. A cylindrical type secondary battery is completed in this manner.

According to this cylindrical type lithium ion secondary battery, the electrolytic solution has the same configuration as that of the electrolytic solution of the present technology and thus the chemical stability of the electrolytic solution is specifically improved by the synergistic action of the cyclic nitrogen compound and the nitrile compound as described above. Consequently, the decomposition reaction of the electrolytic solution is remarkably suppressed and thus excellent battery characteristics can be obtained.

A high energy density (battery capacity) is obtained particularly when the negative electrode active material contains either or both of a carbon material and a metal-based material. In addition, the decomposition reaction of the electrolytic solution is sufficiently suppressed even in a case in which the decomposition reactivity of the electrolytic solution on the surface of the highly reactive negative electrode active material is likely to proceed. Hence, a higher effect can be obtained.

Other actions and effects of the cylindrical type lithium ion secondary battery are the same as those of the electrolytic solution of the present technology.

Figure 3:
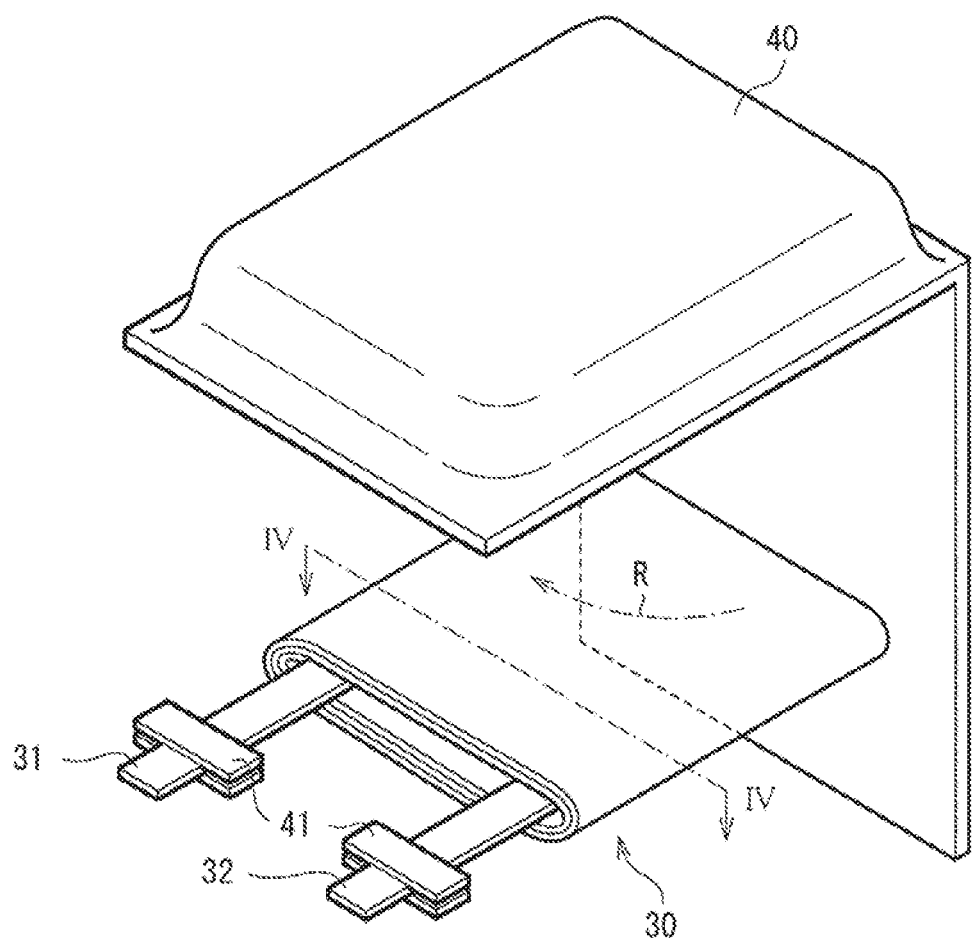
FIG. 3 is a perspective view which illustrates a configuration of a (laminated film type) secondary battery according to an embodiment of the present technology.
Figure 4:
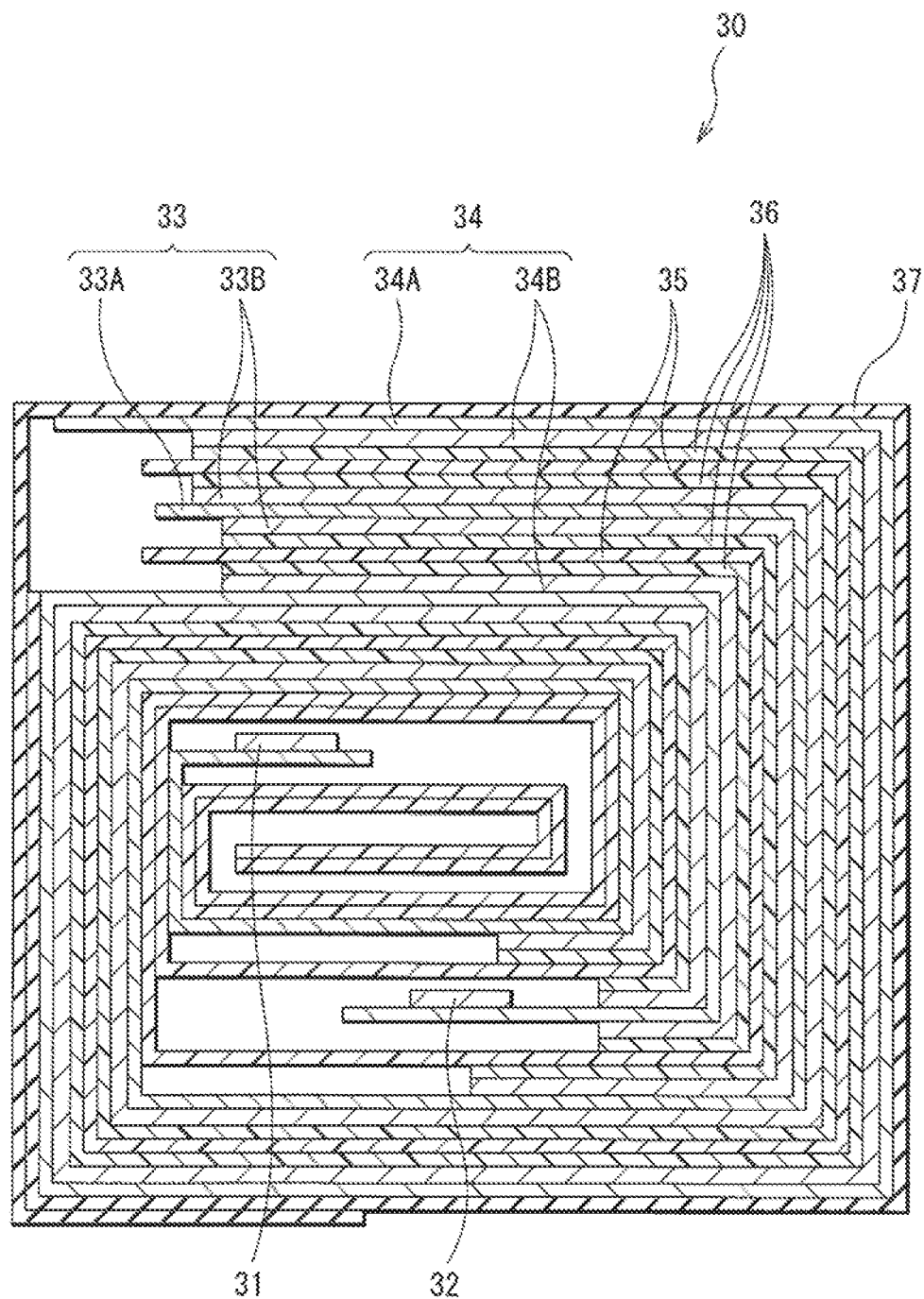
FIG. 4 is a cross-sectional view of the wound electrode body taken along the line IV-IV illustrated in FIG. 3.

FIG. 3 illustrates a perspective configuration of another secondary battery, and FIG. 4 illustrates a cross section of a wound electrode body 30 taken along the line IV-IV illustrated in FIG. 3. Incidentally, a state in which the wound electrode body 30 and an exterior member 40 are separated from each other is illustrated in FIG. 3.

In the following description, the constituents of the cylindrical type secondary battery already described are referred to as required.

This secondary battery is a lithium ion secondary battery having a so-called laminated film type battery structure, and the wound electrode body 30 which is a battery element is accommodated inside the film-like exterior member 40, for example, as illustrated in FIG. 3. In the wound electrode body 30, for example, a positive electrode 33 and a negative electrode 34 are stacked with a separator 35 and an electrolyte layer 36 interposed therebetween and then the positive electrode 33, the negative electrode 34, the separator 35, and the electrolyte layer 36 are wound. A positive electrode lead 31 is attached to the positive electrode 33 as well as a negative electrode lead 32 is attached to the negative electrode 34. The outermost peripheral portion of the wound electrode body 30 is protected by a protective tape 37.

Each of the positive electrode lead 31 and the negative electrode lead 32 is led out, for example, from the inside to the outside of the exterior member 40 in the same direction. The positive electrode lead 31 contains, for example, any one kind or two or more kinds among conductive materials such as aluminum (Al). The negative electrode lead 32 contains, for example, any one kind or two or more kinds among conductive materials such as copper (Cu), nickel (Ni), and stainless steel. These conductive materials have, for example, a thin plate shape or a mesh shape.

The exterior member 40 is, for example, a single film foldable in the direction of the arrow R illustrated in FIG. 3, and a part of the exterior member 40 is provided with a recess for accommodating the wound electrode body 30. This exterior member 40 is, for example, a laminated film in which a fusion layer, a metal layer, and a surface protective layer are laminated in this order. In the production process of the secondary battery, the exterior member 40 is folded so that the fusion layers face each other with the wound electrode body 30 interposed therebetween, and then the peripheral edge portions of the fusion layer are fused. However, the exterior member 40 may be one in which two laminated films are bonded to each other using an adhesive or the like. The fusion layer is, for example, any one kind or two or more kinds of films among polyethylene, polypropylene and the like. The metal layer is, for example, any one kind or two or more kinds among an aluminum foil and the like. The surface protective layer is, for example, any one kind or two or more kinds of films among nylon, polyethylene terephthalate and the like.

Among these, the exterior member 40 is preferably an aluminum laminated film in which a polyethylene film, an aluminum foil, and a nylon film are laminated in this order. However, the exterior member 40 may be a laminated film having another laminate structure, a polymer film such as polypropylene, or a metal film.

For example, a close contact film 41 is inserted between the exterior member 40 and the positive electrode lead 31 in order to prevent entry of outside air. In addition, for example, the close contact film 41 is inserted between the exterior member 40 and the negative electrode lead 32. This close contact film 41 contains a material exhibiting close contact property with respect to both of the positive electrode lead 31 and the negative electrode lead 32. This material exhibiting close contact property is, for example, a polyolefin resin, and more specifically, the material is any one kind or two or more kinds among polyethylene, polypropylene, modified polyethylene, modified polypropylene and the like.

The positive electrode 33 includes, for example, a positive electrode current collector 33A and a positive electrode active material layer 33B as well as the negative electrode 34 includes, for example, a negative electrode current collector 34A and a negative electrode active material layer 34B. The configuration of each of the positive electrode current collector 33A, the positive electrode active material layer 33B, the negative electrode current collector 34A, and the negative electrode active material layer 34B is, for example, the same as that of each of the positive electrode current collector 21A, the positive electrode active material layer 21B, the negative electrode current collector 22A, and the negative electrode active material layer 22B. The configuration of the separator 35 is, for example, the same as that of the separator 23.

The electrolyte layer 36 contains an electrolytic solution and a polymer compound, and this electrolytic solution has the same configuration as that of the electrolytic solution of the present technology. In other words, the electrolytic solution contains a nitrile compound together with a cyclic nitrogen compound. The electrolyte layer 36 described here is a so-called gel-like electrolyte, and the electrolytic solution is held by a polymer compound. This is because a high ionic conductivity (for example, 1 mS/cm or more at room temperature) is obtained as well as leakage of the electrolytic solution is prevented. Incidentally, the electrolyte layer 36 may further contain any one kind or two or more kinds among other materials such as additives.

The polymer compound is, for example, any one kind or two or more kinds among polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethyl methacrylate, polyacrylic acid, polymethacrylic acid, styrene-butadiene rubber, nitrile-butadiene rubber, polystyrene, polycarbonate and the like. In addition to this, the polymer compound may be a copolymer. This copolymer is, for example, a copolymer of vinylidene fluoride and hexafluoropyrene. Among these, polyvinylidene fluoride is preferable as a homopolymer as well as a copolymer of vinylidene fluoride and hexafluoropyrene is preferable as a copolymer. This is because these are electrochemically stable.

In the electrolyte layer 36 which is a gel-like electrolyte, the solvent to be contained in the electrolytic solution is a broad concept including not only a liquid material but also a material exhibiting ion conductivity capable of dissociating an electrolyte salt. Hence, in a case in which a polymer compound exhibiting ion conductivity is used, the polymer compound is also included in the nonaqueous solvent.

An electrolytic solution may be used as it is instead of the electrolyte layer 36. In this case, the wound electrode body 30 is impregnated with the electrolytic solution.

This secondary battery operates, for example, as follows. At the time of charge, lithium ions are released from the positive electrode 33 as well as these lithium ions are occluded into the negative electrode 34 via the electrolyte layer 36. On the other hand, at the time of discharge, lithium ions are released from the negative electrode 34 as well as these lithium ions are occluded into the positive electrode 33 via the electrolyte layer 36.

The secondary battery including the gel-like electrolyte layer 36 is produced, for example, according to the following three kinds of procedures.

In the first procedure, the positive electrode 33 and the negative electrode 34 are fabricated according to the same fabrication procedures as those for the positive electrode 21 and the negative electrode 22. In other words, the positive electrode active material layer 33B is formed on both sides of the positive electrode current collector 33A in the case of fabricating the positive electrode 33 as well as the negative electrode active material layer 34B is formed on both sides of the negative electrode current collector 34A in the case of fabricating the negative electrode 34.

Subsequently, a precursor solution is prepared by mixing an electrolytic solution, a polymer compound, and an organic solvent and the like. Subsequently, the gel-like electrolyte layer 36 is formed by coating the positive electrode 33 with the precursor solution and then drying the precursor solution. In addition, the gel-like electrolyte layer 36 is formed by coating the negative electrode 34 with the precursor solution and then drying the precursor solution.

Subsequently, the positive electrode lead 31 is attached to the positive electrode current collector 33A by a welding method or the like as well as the negative electrode lead 32 is attached to the negative electrode current collector 34A by a welding method or the like. Subsequently, the wound electrode body 30 is formed by stacking the positive electrode 33 and the negative electrode 34 with the separator 35 interposed therebetween and winding the positive electrode 33, the negative electrode 34, and the separator 35. Subsequently, the protective tape 37 is pasted to the outermost peripheral portion of the wound electrode body 30. Subsequently, the exterior member 40 is folded so as to sandwich the wound electrode body 30, and then the wound electrode body 30 is enclosed inside the exterior member 40 by bonding the peripheral edge portions of the exterior member 40 by a thermal fusion method or the like. In this case, the close contact film 41 is inserted between the positive electrode lead 31 and the exterior member 40 as well as between the negative electrode lead 32 and the exterior member 40.

In the second procedure, the positive electrode lead 31 is attached to the positive electrode 33 as well as the negative electrode lead 32 is attached to the negative electrode 34. Subsequently, a wound body which is a precursor of the wound electrode body 30 is fabricated by stacking the positive electrode 33 and the negative electrode 34 with the separator 35 interposed therebetween and winding these, and then the protective tape 37 is pasted to the outermost peripheral portion of the wound body. Subsequently, the exterior member 40 is folded so as to sandwich the wound electrode body 30, and then the wound body is accommodated inside the bag-shaped exterior member 40 by bonding the peripheral edge portions excluding the peripheral edge portion of one side of the exterior member 40 by a thermal fusion method or the like.

Subsequently, a composition for electrolyte is prepared by mixing an electrolytic solution, a monomer which is a raw material of a polymer compound, a polymerization initiator, and, if necessary, other materials such as a polymerization inhibitor. Subsequently, the composition for electrolyte is injected into the bag-shaped exterior member 40, and then the exterior member 40 is sealed by a thermal fusion method or the like. Subsequently, a polymer compound is formed by thermally polymerizing the monomer. The electrolytic solution is held by the polymer compound through this, and thus the gel-like electrolyte layer 36 is formed.

In the third procedure, a wound body is fabricated and accommodated inside the bag-shaped exterior member 40 in the same manner as in the second procedure except that the separator 35 on which a polymer compound layer is formed is used.

Subsequently, an electrolytic solution is prepared and injected into the exterior member 40, and then the opening portion of the exterior member 40 is sealed by a thermal fusion method or the like. Subsequently, the separator 35 is brought into close contact with the positive electrode 33 with the polymer compound layer interposed therebetween as well as the separator 35 is brought into close contact with the negative electrode 34 with the polymer compound layer interposed therebetween by heating the exterior member 40 while applying a load to the exterior member 40. The each of the polymer compound layers is impregnated with the electrolytic solution as well as each of the polymer compound layers gels through this, and thus the electrolyte layer 36 is formed.

In this third procedure, swelling of the secondary battery is suppressed more than in the first procedure. In addition, in the third procedure, the nonaqueous solvent, the monomer (raw material of the polymer compound) and the like hardly remain in the electrolyte layer 36 as compared with the second procedure, and thus the step of forming the polymer compound is favorably controlled. For this reason, each of the positive electrode 33, the negative electrode 34, and the separator 35 is sufficiently brought into close contact with the electrolyte layer 36.

According to this laminated film type lithium ion secondary battery, the electrolyte layer 36 contains an electrolytic solution, and this electrolytic solution has the same configuration as that of the electrolytic solution of the present technology. Consequently, excellent battery characteristics can be obtained for the same reasons as those for the cylindrical type lithium ion secondary battery described above. Other actions and effects of the laminated film type lithium ion secondary battery are the same as those of the cylindrical type lithium ion secondary battery.

The secondary battery to be described here is a cylindrical type lithium metal secondary battery in which the capacity of the negative electrode 22 is obtained by precipitation and dissolution of lithium metal. This secondary battery has the same configuration as that of the cylindrical type lithium ion secondary battery described above as well as is produced by the same procedure except that the negative electrode active material layer 22B is formed of lithium metal.

In this secondary battery, lithium metal is used as a negative electrode active material and thus a high energy density is obtained. The negative electrode active material layer 22B may be already present from the time of assembly, but it may not be present at the time of assembly but may be formed of lithium metal precipitated at the time of charge. In addition, the negative electrode current collector 22A may be omitted as the negative electrode active material layer 22B is utilized as a current collector.

This secondary battery operates, for example, as follows. At the time of charge, lithium ions are released from the positive electrode 21 as well as these lithium ions are precipitated on the surface of the negative electrode current collector 22A as lithium metal via the electrolytic solution. On the other hand, at the time of discharge, lithium metal is eluted from the negative electrode active material layer 22B into the electrolytic solution as lithium ions as well as the lithium ions are occluded into the positive electrode 21 via the electrolytic solution.

According to this cylindrical type lithium metal secondary battery, the electrolytic solution has the same configuration as that of the electrolytic solution of the present technology, and thus excellent battery characteristics can be obtained for the same reasons as those for the lithium ion secondary battery described above. Other actions and effects of the lithium metal secondary battery are the same as those of the lithium ion secondary battery.

The configuration of the lithium metal secondary battery described here may be applied to a laminated film type secondary battery instead of the cylindrical type secondary battery. The same effect can be obtained in this case as well.

Next, application examples of the secondary battery described above will be described.

The application of the secondary battery is not particularly limited as long as it is a machine, a device, an appliance, an apparatus, a system (aggregate of a plurality of devices and the like) and the like that can utilize the secondary battery as an electric power source for driving or an electric power storage source for electric power accumulation. The secondary battery to be used as an electric power source may be a main electric power source or an auxiliary electric power source. The main electric power source is an electric power source which is preferentially used regardless of the presence or absence of other electric power sources. The auxiliary electric power source may be, for example, an electric power source to be used instead of the main electric power source or an electric power source to be switched from the main electric power source if necessary. The kind of the main electric power source is not limited to a secondary battery in the case of using the secondary battery as an auxiliary electric power source.

The application of the secondary battery is, for example, as follows. Electronic devices (including portable electronic devices) such as video cameras, digital still cameras, mobile phones, notebook computers, cordless phones, headphone stereos, portable radios, portable televisions, and portable information terminals. Portable living appliances such as electric shavers. Memory devices such as backup electric power source and memory cards. Electrically-driven tools such as electric drills and electric saws. Battery packs installed in notebook computers as a detachable electric power source. Medical electronic devices such as pacemakers and hearing aids. Electrically-driven vehicles such as electric vehicles (including hybrid electric vehicles). Electric power storage systems such as battery system for home use for accumulating electric power for emergency and the like. Of course, the application of the secondary battery may be applications other than the above.

Among these, it is effective that the secondary battery is applied to a battery pack, an electrically-driven vehicle, an electric power storage system, an electrically-driven tool, an electronic device, and the like. These applications are required to exhibit excellent battery characteristics, and it is thus possible to effectively achieve improvement in the performance by using the secondary battery of the present technology. Incidentally, a battery pack is an electric power source using a secondary battery. This battery pack may use a single battery or an assembled battery as to be described later. An electrically-driven vehicle is a vehicle which operates (travels) using a secondary battery as an electric power source for driving and may be a motor vehicle (hybrid electric vehicle or the like) which is also equipped with a driving source other than the secondary battery as described above. The power storage system is a system using a secondary battery as an electric power storage source. For example, in the power storage system for home use, electric power is accumulated in the secondary battery which is an electric power storage source, and it is thus possible to use electric appliances for home use and the like by utilizing the electric power. An electrically-driven tool is a tool in which a movable unit (for example, a drill) moves using a secondary battery as an electric power source for driving. An electronic device is a device which exerts various kinds of functions using a secondary battery as an electric power source (power supply source) for driving.

Here, some application examples of the secondary battery will be specifically described. Incidentally, the configurations of the application examples to be described below are merely an example, and thus the configurations of the application examples can be appropriately changed.

Figure 5:
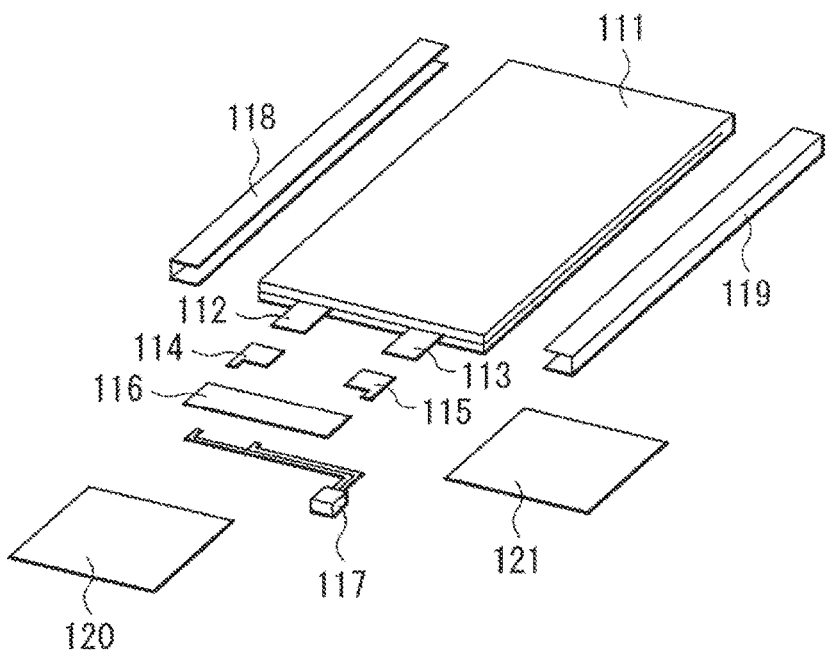
FIG. 5 is a perspective view which illustrates a configuration of an application example (battery pack: single battery) of a secondary battery according to an embodiment of the present technology.
Figure 6:
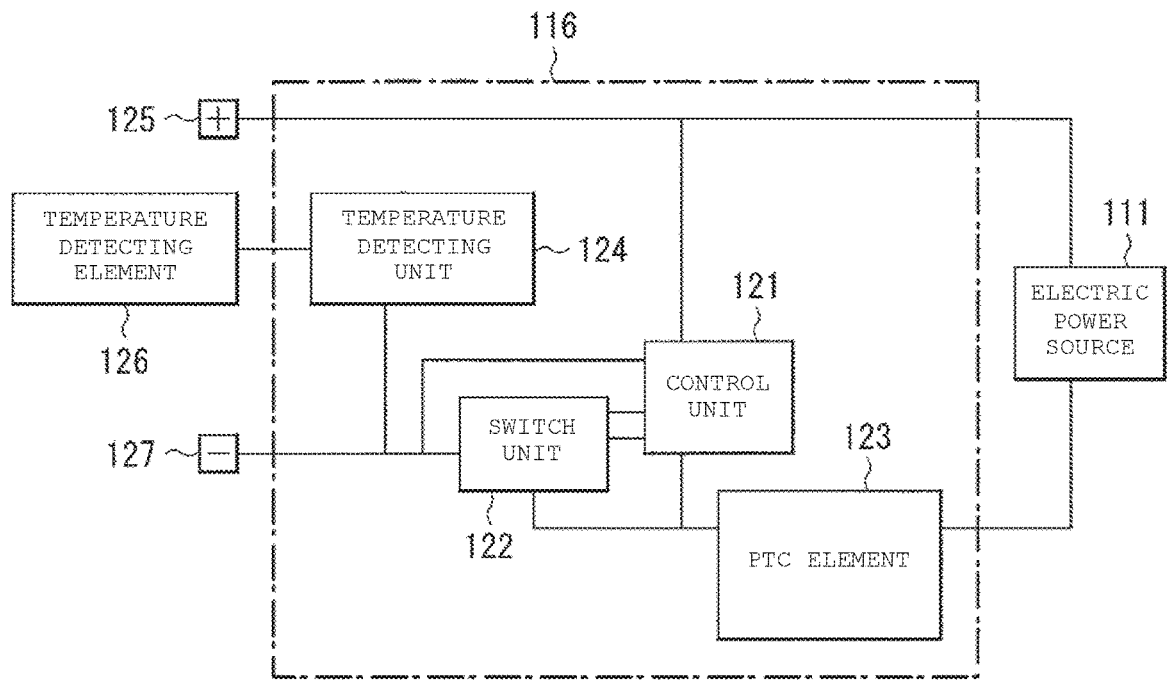
FIG. 6 is a block diagram which illustrates a configuration of the battery pack illustrated in FIG. 5.

FIG. 5 illustrates a perspective configuration of a battery pack using a single battery. FIG. 6 illustrates a block configuration of the battery pack illustrated in FIG. 5. Incidentally, a state in which the battery pack is disassembled is illustrated in FIG. 5.

The battery pack to be described here is a simplified type battery pack (so-called soft pack) using one secondary battery of the present technology and mounted on, for example, an electronic device typified by a smartphone. This battery pack includes an electric power source 111 which is a laminated film type secondary battery and a circuit board 116 connected to the electric power source 111, for example, as illustrated in FIG. 5. A positive electrode lead 112 and a negative electrode lead 113 are attached to this electric power source 111.

A pair of adhesive tapes 118 and 119 are pasted to both side surfaces of the electric power source 111. A protection circuit module (PCM) is formed on the circuit board 116. This circuit board 116 is connected to the positive electrode 112 via a tab 114 as well as to the negative electrode lead 113 via a tab 115. In addition, the circuit board 116 is connected to a connector-attached lead wire 117 for external connection. Incidentally, the circuit board 116 is protected by a label 120 and an insulating sheet 121 in a state in which the circuit board 116 is connected to the electric power source 111. The circuit board 116, the insulating sheet 121, and the like are fixed by being pasted with this label 120.

In addition, the battery pack includes an electric power source 111 and a circuit board 116, for example, as illustrated in FIG. 6. The circuit board 116 includes, for example, a control unit 121 (controller), a switch unit 122, a PTC element 123, and a temperature detecting unit 124. The electric power source 111 can be connected to the outside via a positive electrode terminal 125 and a negative electrode terminal 127, and thus the electric power source 111 is charged and discharged via the positive electrode terminal 125 and the negative electrode terminal 127. The temperature detecting unit 124 detects the temperature using a temperature detecting terminal (so-called T terminal) 126.

The control unit 121 controls the operation (including the use state of the electric power source 111) of the entire battery pack. This control unit 121 includes, for example, a central processing unit (CPU) or a processor, a memory, and the like.

For example, when the battery voltage reaches the overcharge detecting voltage, this control unit 121 disconnects the switch unit 122 so that the charge current does not flow through the current path of the electric power source 111. In addition, for example, when a large current flows at the time of charge, the control unit 121 cuts off the charge current by disconnecting the switch unit 122.

On the other hand, for example, when the battery voltage reaches the overdischarge detecting voltage, the control unit 121 disconnects the switch unit 122 so that the discharge current does not flow through the current path of the electric power source 111. In addition, for example, when a large current flows at the time of discharge, the control unit 121 cuts off the discharge current by disconnecting the switch unit 122.

The overcharge detecting voltage is, for example, 4.2 V±0.05 V as well as the overdischarge detecting voltage is, for example, 2.4 V±0.1 V.

In accordance with an instruction from the control unit 121, the switch unit 122 switches the use state of the electric power source 111, namely, the connection and disconnection of the electric power source 111 to an external device. This switch unit 122 includes, for example, a charge control switch and a discharge control switch. Each of the charge control switch and the discharge control switch is, for example, a semiconductor switch such as a metal-oxide semiconductor field-effect transistor (MOSFET). Incidentally, the charge and discharge currents are detected, for example, based on the ON resistance of the switch unit 122.

The temperature detecting unit 124 measures the temperature of the electric power source 111 as well as outputs the result of measurement on the temperature to the control unit 121. This temperature detecting unit 124 includes, for example, a temperature detecting element such as a thermistor. The result of measurement on the temperature to be measured by the temperature detecting unit 124 is used in a case in which the control unit 121 performs charge and discharge control at the time of abnormal heat generation, in a case in which the control unit 121 performs the correction processing when calculating the remaining capacity, and the like.

The circuit board 116 may not include the PTC element 123. In this case, a separate PTC element may be attached to the circuit board 116.

Figure 7:
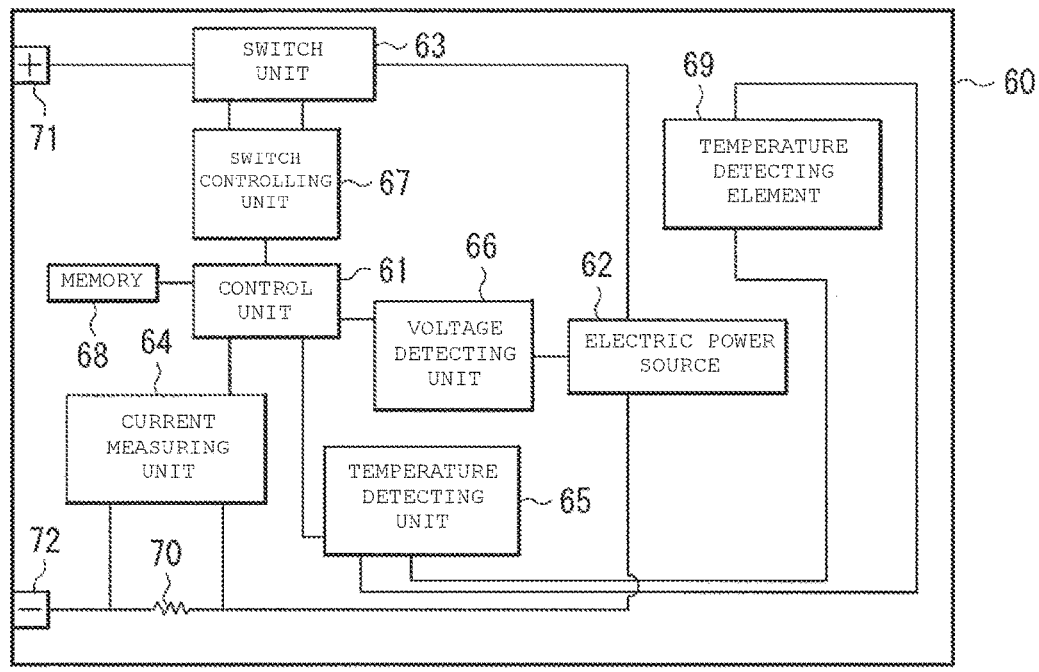
FIG. 7 is a block diagram which illustrates a configuration of an application example (battery pack: assembled battery) of a secondary battery according to an embodiment of the present technology.

FIG. 7 illustrates a block configuration of a battery pack using an assembled battery.

This battery pack includes, for example, a control unit 61 (controller), an electric power source 62, a switch unit 63, a current measuring unit 64, a temperature detecting unit 65, a voltage detecting unit 66, a switch controlling unit 67, a memory 68, a temperature detecting element 69, a current detecting resistor 70, a positive electrode terminal 71, and a negative electrode terminal 72 inside a casing 60. This casing 60 contains, for example, a plastic material.

The control unit 61 controls the operation (including the use state of the electric power source 62) of the entire battery pack. This control unit 61 includes, for example, a CPU or a processor. The electric power source 62 is an assembled battery including two or more kinds of secondary batteries of the present technology, and the connection form of the two or more kinds of secondary batteries may be a serial form, a parallel form, or a mixed form thereof. As an example, the electric power source 62 includes six secondary batteries connected so as to be two in parallel and three in series.

In accordance with an instruction from the control unit 61, the switch unit 63 switches the use state of the electric power source 62, namely, the connection and disconnection of the electric power source 62 to an external device. The switch unit 63 includes, for example, a charge control switch, a discharge control switch, a diode for charge, a diode for discharge, and the like. Each of the charge control switch and the discharge control switch is, for example, a semiconductor switch such as a metal-oxide semiconductor field-effect transistor (MOSFET).

The current measuring unit 64 measures the current using the current detecting resistor 70 as well as outputs the result of measurement on the current to the control unit 61. The temperature detecting unit 65 measures the temperature using the temperature detecting element 69 as well as outputs the result of measurement on the temperature to the control unit 61. This result of measurement on the temperature is used, for example, in a case in which the control unit 61 performs charge and discharge control at the time of abnormal heat generation and in a case in which the control unit 61 performs the correction processing when calculating the remaining capacity. The voltage detecting unit 66 measures the voltage of the secondary battery in the electric power source 62 as well as supplies the result of measurement on the analog-digital converted voltage to the control unit 61.

The switch controlling unit 67 controls the operation of the switch unit 63 in accordance with a signal to be input from each of the current measuring unit 64 and the voltage detecting unit 66.

For example, when the battery voltage reaches the overcharge detecting voltage, this switch controlling unit 67 disconnects the switch unit 63 (charge control switch) so that the charge current does not flow through the current path of the electric power source 62. By this, only discharge is possible in the electric power source 62 via the diode for discharge. Incidentally, the switch controlling unit 67 cuts off the charge current, for example, when a large current flows at the time of charge.

In addition, for example, when the battery voltage reaches the overdischarge detecting voltage, the switch controlling unit 67 disconnects the switch unit 63 (discharge control switch) so that the discharge current does not flow through the current path of the electric power source 62. By this, only charge is possible in the electric power source 62 via the diode for charge. Incidentally, the switch controlling unit 67 cuts off the discharge current, for example, when a large current flows at the time of discharge.

The overcharge detecting voltage is, for example, 4.2 V±0.05 V as well as the overdischarge detecting voltage is, for example, 2.4 V±0.1 V.

The memory 68 includes, for example, an EEPROM that is a nonvolatile memory. In this memory 68, for example, numerical values calculated by the control unit 61 and information (for example, internal resistance in the initial state) on the secondary battery measured at the manufacturing process stage are stored. Incidentally, the control unit 61 can grasp information such as the remaining capacity when the full charge capacity of the secondary battery is stored in the memory 68.

The temperature detecting element 69 measures the temperature of the electric power source 62 as well as outputs the result of measurement on the temperature to the control unit 61. This temperature detecting element 69 includes, for example, a thermistor.

Each of the positive electrode terminal 71 and the negative electrode terminal 72 is a terminal which is connected to an external device (for example, a notebook type personal computer) to be operated using the battery pack, an external device (for example, a charger) to be used for charging the battery pack, and the like. The electric power source 62 is charged and discharged via the positive electrode terminal 71 and the negative electrode terminal 72.

Figure 8:
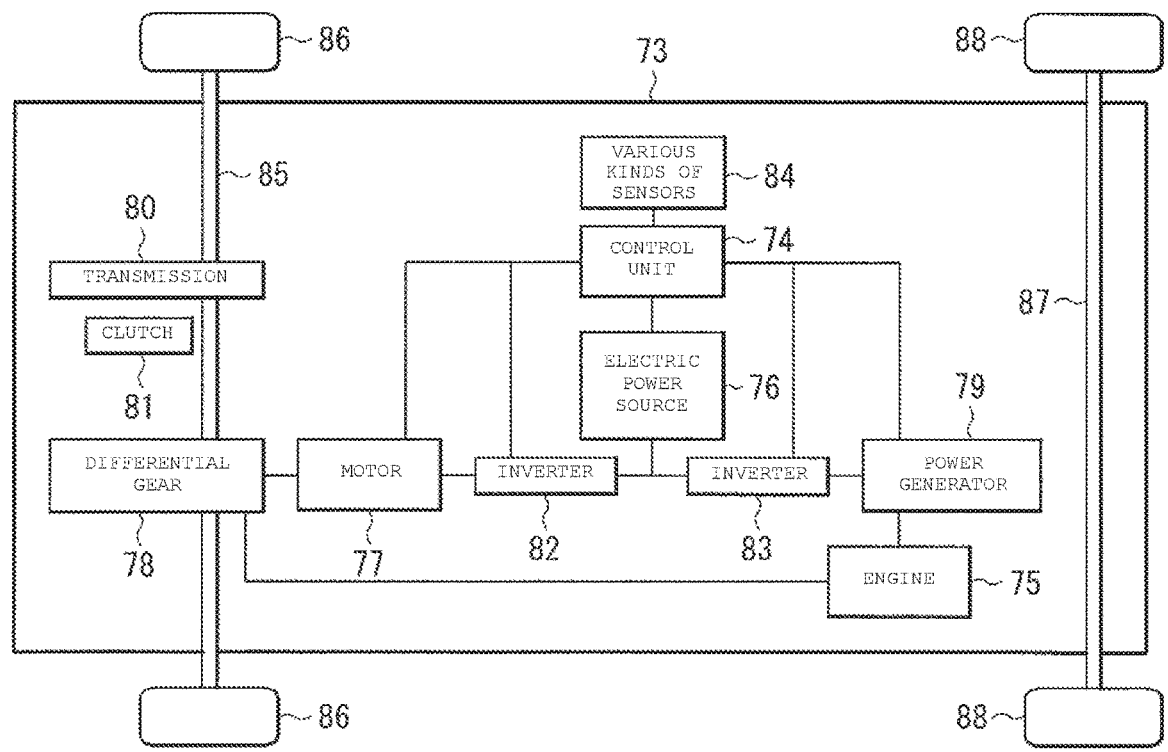
FIG. 8 is a block diagram which illustrates a configuration of an application example (electrically-driven vehicle) of a secondary battery according to an embodiment of the present technology.

FIG. 8 illustrates a block configuration of a hybrid electric vehicle which is an example of an electrically-driven vehicle.

This electrically-driven vehicle includes, for example, a control unit 74 (controller), an engine 75, an electric power source 76, a motor for driving 77, a differential gear 78, a power generator 79, a transmission 80 and a clutch 81, inverters 82 and 83, and various kinds of sensors 84 inside a metal casing 73. In addition to these, the electrically-driven vehicle includes, for example, a driving shaft for front wheel 85 and a front wheel 86 and a driving shaft for rear wheel 87 and a rear wheel 88 which are connected to the differential gear 78 and the transmission 80.

This electrically-driven vehicle can run, for example, using either of the engine 75 or the motor 77 as a driving source. The engine 75 is a main power source and is, for example, a gasoline engine. In a case in which the engine 75 is used as a power source, for example, the driving force (turning force) of the engine 75 is transmitted to the front wheel 86 and the rear wheel 88 through the differential gear 78, the transmission 80, and the clutch 81 which are driving units (driver). Incidentally, the turning force of the engine 75 is transmitted to the power generator 79, thus the power generator 79 generates alternating current power utilizing the turning force as well as the alternating current power is converted into direct current power by the inverter 83, and thus the direct current power is accumulated in the electric power source 76. Meanwhile, in a case in which the motor 77 which is a conversion unit (converter) is used as the power source, the electric power (direct current power) supplied from the electric power source 76 is converted into alternating current power by the inverter 82, and thus the motor 77 is driven utilizing the alternating current power. The driving force (turning force) converted from the electric power by this motor 77 is transmitted to the front wheel 86 and the rear wheel 88 via, for example, the differential gear 78, the transmission 80, and the clutch 81 which are driving units (driver).

When the electrically-driven vehicle decelerates via the braking mechanism, the resistance force at the time of deceleration is transmitted to the motor 77 as turning force, and thus the motor 77 may generate alternating current power by utilizing this turning force. This alternating current power is converted into direct current power by the inverter 82, it is thus preferable that the direct current regenerative electric power be accumulated in the electric power source 76.

The control unit 74 controls the operation of the entire electrically-driven vehicle. This control unit 74 includes, for example, a CPU or a processor. The electric power source 76 includes one or two or more kinds of secondary batteries of the present technology. This electric power source 76 is connected to an external electric power source as well as may receive electric power supply from the external electric power source to accumulate electric power. The various kinds of sensors 84 are used, for example, to control the number of revolutions of the engine 75 as well as the opening degree (throttle opening degree) of the throttle valve. These various kinds of sensors 84 include any one kind or two or more kinds among, for example, a speed sensor, an acceleration sensor, and an engine speed sensor.

A case in which the electrically-driven vehicle is a hybrid electric vehicle is described as an example, but the electrically-driven vehicle may be a vehicle (electric vehicle) which operates using only the electric power source 76 and the motor 77 without using the engine 75.

Figure 9:
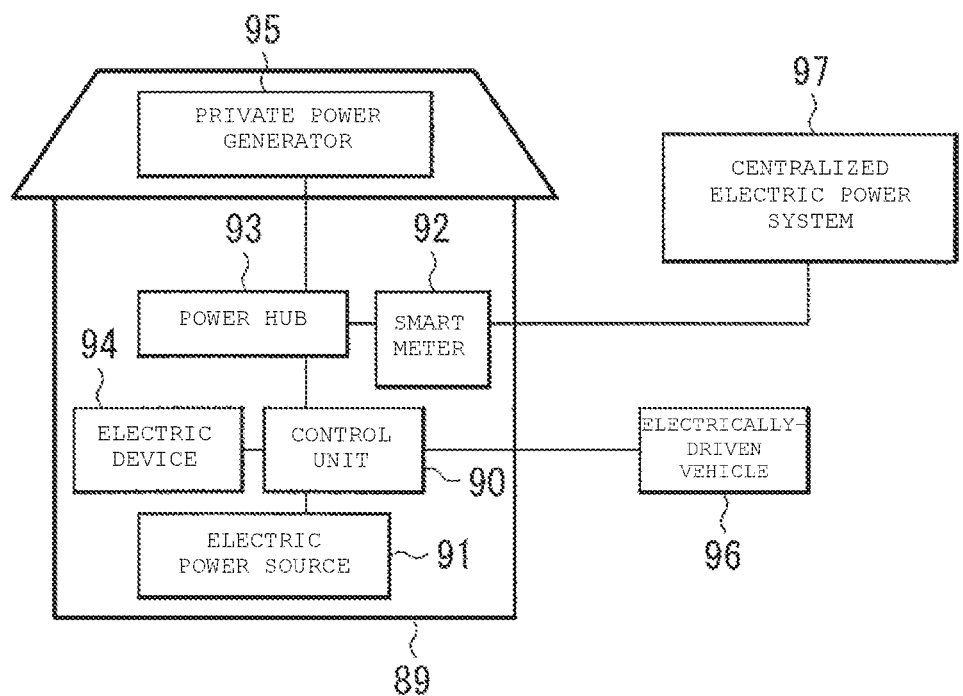
FIG. 9 is a block diagram which illustrates a configuration of an application example (electric power storage system) of a secondary battery according to an embodiment of the present technology.

FIG. 9 illustrates a block configuration of an electric power storage system.

This electric power storage system includes, for example, a control unit 90 (controller), an electric power source 91, a smart meter 92, and a power hub 93 inside a house 89 such as a general dwelling house or a commercial building.

Here, for example, the electric power source 91 can be connected to the electric device 94 installed inside the house 89 as well as can be connected to an electrically-driven vehicle 96 parked outside the house 89. In addition, for example, the electric power source 91 can be connected to a private power generator 95 installed in the house 89 via the power hub 93 as well as can be connected to an external centralized electric power system 97 via the smart meter 92 and the power hub 93.

The electric device 94 includes, for example, one or two or more kinds of household electric appliances, and the household electric appliances are, for example, a refrigerator, an air conditioner, a television, and a water heater. The private power generator 95 includes, for example, any one kind or two or more kinds among a solar photovoltaic power generator, a wind power generator, and the like. The electrically-driven vehicle 96 includes, for example, any one kind or two or more kinds among an electric vehicle, an electric motorcycle, a hybrid electric vehicle, and the like. The centralized electric power system 97 includes, for example, any one kind or two or more kinds among a thermal power plant, a nuclear power plant, a hydroelectric power plant, a wind power plant, and the like.

The control unit 90 controls the operation (including the use state of the electric power source 91) of the entire electric power storage system. This control unit 90 includes, for example, a CPU. The electric power source 91 includes one or two or more kinds of secondary batteries of the present technology. The smart meter 92 is, for example, a network operated watt-meter installed in the house 89 on the electric power demand side and can communicate with the electric power supply side. Accordingly, the smart meter 92 enables highly efficient and stable energy supply by, for example, controlling the balance between supply and demand of electric power in the house 89 while communicating with the outside.

In this electric power storage system, for example, electric power is accumulated in the electric power source 91 from the centralized electric power system 97 which is an external electric power source via the smart meter 92 and the power hub 93 as well as is accumulated in the electric power source 91 from the private power generator 95 which is an independent electric power source via the power hub 93. The electric power accumulated in this electric power source 91 is supplied to the electric device 94 and the electrically-driven vehicle 96 in accordance with an instruction of the control unit 90, and thus the electric device 94 can be operated as well as the electrically-driven vehicle 96 can be charged. In other words, the electric power storage system is a system which enables electric power to be accumulated in and supplied to the house 89 using the electric power source 91.

The electric power accumulated in the electric power source 91 can be used as required. Therefore, for example, it is possible to accumulate electric power in the electric power source 91 from the centralized electric power system 97 during midnight in which the electricity cost is low and it is possible to use the electric power accumulated in the electric power source 91 during the daytime in which the electricity cost is high.

The electric power storage system described above may be installed in every house (one family) or in every plural houses (plural families).

Figure 10:
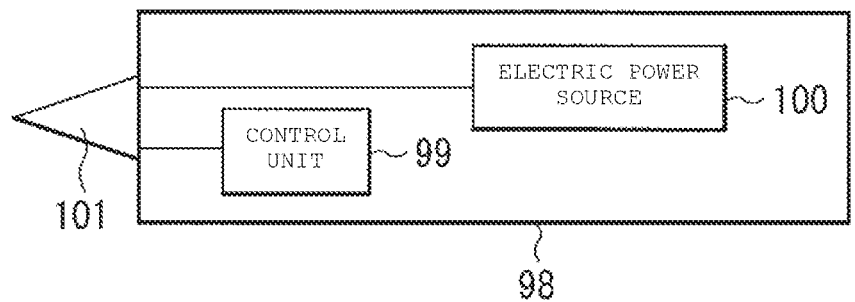
FIG. 10 is a block diagram which illustrates a configuration of an application example (electrically-driven tool) of a secondary battery according to an embodiment of the present technology.

FIG. 10 illustrates a block configuration of an electrically-driven tool.

The electrically-driven tool to be described here is, for example, an electric drill. The electrically-driven tool includes, for example, a control unit 99 and an electric power source 100 inside a tool body 98. For example, a drill unit 101 which is a movable unit is attached to the tool body 98 so as to be able to operate (rotate).

This tool body 98 contains, for example, a plastic material. The control unit 99 controls the operation of the entire electrically-driven tool (including the use state of the electric power source 100). This control unit 99 includes, for example, a CPU. The electric power source 100 includes one or two or more kinds of secondary batteries of the present technology. This control unit 99 supplies electric power from the electric power source 100 to the drill unit 101 in accordance with the operation of the operation switch.

Examples of the present technology will be described.

Experimental Examples 1-1 to 1-23

Laminated film type lithium ion secondary batteries illustrated in FIGS. 3 and 4 were fabricated according to the following procedure.

In the case of fabricating a positive electrode 33, first, lithium carbonate ($Li_2CO_3$) and cobalt carbonate ($CoCO_3$) were mixed and then the mixture was fired (firing temperature=900° C., firing time=5 hours) in an air atmosphere to obtain a lithium cobalt oxide ($LiCoO_2$) as a lithium-containing compound. In this case, the mixing ratio (molar ratio) of lithium carbonate to cobalt carbonate was set so that lithium carbonate:cobalt carbonate=0.5:1.

Subsequently, 91 parts by mass of a positive electrode active material ($LiCoO_2$), 3 parts by mass of a positive electrode binder (polyvinylidene fluoride), and 6 parts by mass of a positive electrode conducting agent (graphite) were mixed together to prepare a positive electrode mixture. Subsequently, the positive electrode mixture was put in an organic solvent (N-methyl-2-pyrrolidone) and then the organic solvent was stirred to prepare a paste-like positive electrode mixture slurry. Subsequently, both sides of the positive electrode current collector 33A (strip-like aluminum foil with a thickness of 12 μm) was coated with the positive electrode mixture slurry using a coating apparatus and then the positive electrode mixture slurry was dried to form a positive electrode active material layer 33B. Finally, the positive electrode active material layer 33B was compression-molded using a roll press machine.

In the case of fabricating a negative electrode 34, first, 97 parts by mass of a negative electrode active material (graphite, median diameter D50=15 μm), 1.5 parts by mass of a negative electrode binder (acrylic modified product of a styrene-butadiene rubber copolymer), and 1.5 parts by mass of a thickener (carboxymethyl cellulose) were mixed together to prepare a negative electrode mixture. Subsequently, the negative electrode mixture was put in pure water and the pure water was stirred to prepare a paste-like negative electrode mixture slurry. Subsequently, both sides of a negative electrode current collector 34A (strip-like copper foil with a thickness of 15 μm) was coated with the negative electrode mixture slurry using a coating apparatus and then the negative electrode mixture slurry was dried to form a negative electrode active material layer 34B. Finally, the negative electrode active material layer 34B was compression-molded using a roll press machine.

In the case of preparing an electrolytic solution, a solvent (ethylene carbonate (EC), propylene carbonate (PC) and vinylene carbonate (VC)) was stirred by adding an electrolyte salt ($LiPF_6$) to the solvent and the solvent was stirred by further adding a cyclic nitrogen compound and a nitrile compound (a first nitrile compound or a second nitrile compound) to the solvent. As the first nitrile compound, succinonitrile (SN) represented by a formula (7-13), adiponitrile (ADN) represented by a formula (7-14), and sebaconitrile (SBN) represented by a formula (7-15) were used.

In this case, the mixing ratio (weight ratio) of ethylene carbonate to propylene carbonate was set so that carbonate ethylene:propylene carbonate=50:50, and the content of the electrolyte salt was set to 1.2 mol/kg with respect to the solvent. In addition, the content of vinylene carbonate in the electrolytic solution was set to 1 wt %. Incidentally, the kind of cyclic nitrogen compound, the content (wt %) of cyclic nitrogen compound in the electrolytic solution, the kind of nitrile compound, and the content (wt %) of nitrile compound in the electrolytic solution are as presented in Table 1.

An electrolytic solution was prepared according to the same procedure except that both of a cyclic nitrogen compound and a nitrile compound were not used for comparison. In addition, an electrolytic solution was prepared according to the same procedure except that only either of a cyclic nitrogen compound or a nitrile compound was used for comparison. Furthermore, an electrolytic solution was prepared according to the same procedure except that another compound was used instead of a nitrile compound. As another compound, 1,3-propane sultone (PS) which is a sulfonic acid ester was used. The content (wt %) of another compound in the electrolytic solution is as presented in Table 1.

In the case of assembling a secondary battery, first, a positive electrode lead 31 made of aluminum was welded to the positive electrode current collector 33A as well as a negative electrode lead 32 made of copper was welded to the negative electrode current collector 34A. Subsequently, the positive electrode 33 and the negative electrode 34 were stacked with a separator 35 (a microporous polyethylene film having a thickness of 12 μm) interposed therebetween to obtain a stacked body. Subsequently, the stacked body was wound in the longitudinal direction, and then a protective tape 37 was pasted to the outermost peripheral portion of the stacked body, thereby fabricating a wound electrode body 30. Finally, an exterior member 40 was folded so as to sandwich the wound electrode body 30, and then the peripheral edge portions of the three sides of the exterior member 40 were thermally fused. This exterior member 40 is an aluminum laminated film in which a 25 μm thick nylon film, a 40 μm thick aluminum foil, and a 30 μm thick polypropylene film are laminated from the outside in this order. In this case, the close contact film 41 was inserted between the positive electrode lead 31 and the exterior member 40 as well as between the negative electrode lead 32 and the exterior member 40. Finally, the separator 35 was impregnated with the electrolytic solution by injecting the electrolytic solution into the exterior member 40, and then the peripheral edge portions of the remaining one side of the exterior member 40 were thermally fused in a reduced pressure environment. The wound electrode body 30 was enclosed in the exterior member 40 through this, and thus a laminated film type lithium ion secondary battery was completed.

In order to evaluate the battery characteristics of the secondary battery, the cycle characteristics and voltage characteristics of the secondary battery were examined and the results presented in Table 1 were obtained.

In the case of examining the cycle characteristics, the discharge capacity in the second cycle was first measured by charging and discharging (two cycles) the secondary battery in a normal temperature environment (temperature=23° C.). Subsequently, the discharge capacity in the 102th cycle was measured by charging and discharging (100 cycles) the secondary battery in the same environment. Finally, the capacity retention rate (%)=(discharge capacity in 102th cycle/discharge capacity in 2nd cycle)×100 was calculated.

Constant current charge was performed at a current of 0.2 C until the voltage reached 4.5 V and then constant voltage charge was performed at a voltage of 4.5 V until the current reached 0.05 C at the time of charge. At the time of discharge, constant current discharge was performed at a current of 0.2 C until the voltage reached 2.5 V. "0.2 C" is a current value at which the battery capacity (theoretical capacity) is discharged in 5 hours and "0.05 C" is a current value at which the battery capacity is discharged in 20 hours.

In the case of examining the voltage characteristics, the secondary battery was first charged and discharged in a normal temperature environment (temperature=23° C.) and then the secondary battery was charged again in the same environment. The voltage (voltage before storage) of the secondary battery in this charged state is 4.5 V as to be described later. Subsequently, the secondary battery in the charged state was stored (storage time=100 hours) in a high temperature environment (temperature=60° C.), and then the voltage (voltage after storage) of the secondary battery was measured. Subsequently, the voltage retention rate (%)= (voltage after storage/voltage before storage)×100 was calculated. Incidentally, the charge and discharge conditions in the case of examining the voltage characteristics were set to be the same as those in the case of examining the cycle characteristics. Finally, the voltage characteristics of the secondary battery were evaluated in four grades according to the value of the voltage retention rate calculated.

Specifically, it was evaluated as "A" in a case in which the voltage retention rate was 98% or more, as "B" in a case in which the voltage retention rate was 97%, as "C" in a case in which the voltage retention rate was 95% or more, and as "D" in a case in which the voltage retention rate was less than 95%.

TABLE 1

Negative electrode active material: graphite, Solvent: EC + PC + VC

| | | | Nitrile compound | | | | | |
| --- | --- | --- | --- | --- | --- | --- | --- | --- |
| | Cyclic nitrogen compound | | First nitrile compound | | Second nitrile compound | | Capacity retention | Voltage retention |
| Experimental Example | Kind | Content (wt %) | Kind | Content (wt %) | Kind | Content (wt %) | rate (%) | rate (%) |
| 1-1 | Formula (1-9) | 1 | SN | 1 | — | — | 86 | B |
| 1-2 | Formula (2-2) | 1 | SN | 1 | — | — | 80 | B |
| 1-3 | Formula (2-9) | 1 | SN | 1 | — | — | 83 | B |
| 1-4 | Formula (3-9) | 1 | SN | 1 | — | — | 80 | B |
| 1-5 | Formula (4-2) | 1 | SN | 1 | — | — | 84 | B |
| 1-6 | Formula (4-6) | 1 | SN | 1 | — | — | 85 | B |

TABLE 1-continued

Negative electrode active material: graphite, Solvent: EC + PC + VC

| Experimental Example | Cyclic nitrogen compound Kind | Content (wt %) | Nitrile compound First nitrile compound Kind | Content (wt %) | Second nitrile compound Kind | Content (wt %) | Capacity retention rate (%) | Voltage retention rate (%) |
|---|---|---|---|---|---|---|---|---|
| 1-7 | Formula (4-9) | 1 | SN | 1 | — | — | 88 | B |
| 1-8 | Formula (4-9) | 1 | SN | 5 | — | — | 80 | B |
| 1-9 | Formula (4-9) | 1 | ADN | 1 | — | — | 91 | A |
| 1-10 | Formula (4-9) | 0.1 | SBN | 1 | — | — | 86 | B |
| 1-11 | Formula (4-9) | 1 | SBN | 1 | — | — | 92 | A |
| 1-12 | Formula (4-9) | 3 | SBN | 1 | — | — | 93 | A |
| 1-13 | Formula (4-10) | 1 | SN | 1 | — | — | 87 | A |
| 1-14 | Formula (4-10) | 1 | SBN | 1 | — | — | 92 | A |
| 1-15 | Formula (4-11) | 1 | SN | 1 | — | — | 86 | A |
| 1-16 | Formula (4-9) | 1 | — | — | $LiB(CN)_4$ | 0.2 | 93 | A |
| 1-17 | Formula (5-9) | 1 | SN | 1 | — | — | 82 | B |
| 1-18 | Formula (6-9) | 1 | SN | 1 | — | — | 80 | B |
| 1-19 | — | — | — | — | — | — | 91 | D |
| 1-20 | Formula (4-9) | 1 | — | — | — | — | 68 | C |
| 1-21 | — | — | SN | 1 | — | — | 65 | D |
| 1-22 | — | — | SN | 2 | — | — | 55 | C |
| 1-23 | Formula (4-9) | 1 | PS | 1 | — | — | 66 | C |

SN: succinonitrile,
ADN: adiponitrile,
SBN: sebaconitrile,
PS: 1,3-propane sultone In a case (Experimental Example 1-19) in which neither a cyclic nitrogen compound nor a nitrile compound was used, a high capacity retention rate was obtained but the voltage remarkably decreased. The capacity retention rate and the voltage retention rate in a case in which both of a cyclic nitrogen compound and a nitrile compound are not used are taken as the comparison references below.

In a case (Experimental Example 1-20) in which a cyclic nitrogen compound was used but a nitrile compound was not used, the capacity retention rate remarkably decreased as well as the voltage also still remained low. In the same manner, in cases (Experimental Examples 1-21 and 1-22) in which a nitrile compound was used but a cyclic compound was not used as well, the capacity retention rate remarkably decreased as well as the voltage also still remained low.

A case (Experimental Example 1-23) in which a cyclic nitrogen compound was used as well as another compound (sulfonic acid ester) was used instead of a nitrile compound, approximately the same results as in cases (Experimental Examples 1-20 to 1-22) in which only either of a cyclic nitrogen compound or a nitrile compound was used were obtained. In other words, even when a sulfonic acid ester was used together with a cyclic nitrogen compound, the capacity retention rate remarkably decreased as well as the voltage also still remained low.

In contrast, in cases (Experimental Examples 1-1 to 1-18) of using a nitrile compound together with a cyclic nitrogen compound, the voltage did not remarkably decrease while a decrease in the capacity retention rate was suppressed to the minimum without depending on the kind of nitrile compound.

Particularly, in the cases (Experimental Examples 1-1 to 1-18) of using a nitrile compound together with a cyclic nitrogen compound, a specific advantage was obtained by the synergistic action of the cyclic nitrogen compound and the nitrile compound as to be described below.

Specifically, in the case of using only a cyclic nitrogen compound (Experimental Example 1-20), the capacity retention rate remarkably decreased as well as the voltage also remained low as compared with a case (Experimental Example 1-19) in which neither a cyclic nitrogen compound nor a nitrile compound was used. In the same manner, in the case of using only a nitrile compound (Experimental Examples 1-21 and 1-22) as well, the capacity retention rate remarkably decreased as well as the voltage also remained low as compared with the case (Experimental Example 1-19) in which neither a cyclic nitrogen compound nor a nitrile compound was used. From these results, it is expected that the capacity retention rate will remarkably decrease as well as the voltage will remain low even when a cyclic nitrogen compound and the nitrile compound are used together.

However, in the cases (Experimental Examples 1-1 to 1-18) of actually using a nitrile compound and a cyclic nitrogen compound together, the voltage hardly remarkably decreased while a decrease in the capacity retention rate was sufficiently suppressed contrary to the expectation described above. This result is a specific advantage to be obtained by the synergistic action of a cyclic nitrogen compound and a nitrile compound as is apparent from the result which is contrary to the expectation described above.

Experimental Examples 2-1 to 2-25

Secondary batteries were fabricated according to the same procedure except that a metal-based material (silicon) was used instead of a carbon material (graphite) as a negative electrode active material as well as the composition of solvent was changed as presented in Table 2, and the cycle characteristics and voltage characteristics of the secondary batteries were examined.

In the case of fabricating a negative electrode 34, the negative electrode 34 was fabricated according to the same procedure as in Experimental Examples 1-1 to 1-23 except those to be described below. A negative electrode mixture was prepared by mixing 97 parts by mass of a negative electrode active material (silicon) and 3 parts by mass of a negative electrode binder (polyvinylidene fluoride). The negative electrode mixture was put in an organic solvent (N-methyl-2-pyrrolidone) and then the organic solvent was stirred to prepare a paste-like negative electrode mixture slurry.

In the case of preparing an electrolytic solution (Experimental Examples 2-21, 2-22), the electrolytic solution was prepared according to the same procedure as in Experimental Examples 1-1 to 1-23 except that γ-butyrolactone (GBL) or 1,3-dioxolane (DOX) was used instead of vinylene carbonate. In this case, the content of γ-butyrolactone in the electrolytic solution was set to 1 wt % and the content of 1,3-dioxolane in the electrolytic solution was set to 1 wt %.

compound. Consequently, excellent battery characteristics are obtained in a secondary battery.

The present technology has been described above with reference to an embodiment and Examples, but the present technology is not limited to the modes described in an embodiment and Examples and can be modified in various manners.

Specifically, a case in which the battery structure of the secondary battery is a cylindrical structure and a laminated film type structure has been described, but the battery structure of the secondary battery of the present technology is not particularly limited. Specifically, the battery structure

TABLE 2

Negative electrode active material: silicon, Solvent: EC + PC + VC (2-21: EC + PC + GBL, 2-22: EC + PC + DOX)

| Experimental Example | Cyclic nitrogen compound Kind | Content (wt %) | Nitrile compound First nitrile compound Kind | Content (wt %) | Second nitrile compound Kind | Content (wt %) | Capacity retention rate (%) | Voltage retention rate (%) |
|---|---|---|---|---|---|---|---|---|
| 2-1 | Formula (1-9) | 1 | SN | 1 | — | — | 64 | B |
| 2-2 | Formula (2-2) | 1 | SN | 1 | — | — | 60 | B |
| 2-3 | Formula (2-9) | 1 | SN | 1 | — | — | 59 | B |
| 2-4 | Formula (3-9) | 1 | SN | 1 | — | — | 57 | B |
| 2-5 | Formula (4-2) | 1 | SN | 1 | — | — | 61 | B |
| 2-6 | Formula (4-6) | 1 | SN | 1 | — | — | 62 | B |
| 2-7 | Formula (4-9) | 1 | SN | 1 | — | — | 67 | A |
| 2-8 | Formula (4-9) | 1 | SN | 5 | — | — | 60 | A |
| 2-9 | Formula (4-9) | 1 | ADN | 1 | — | — | 71 | A |
| 2-10 | Formula (4-9) | 0.1 | SBN | 1 | — | — | 65 | B |
| 2-11 | Formula (4-9) | 1 | SBN | 1 | — | — | 72 | A |
| 2-12 | Formula (4-9) | 3 | SBN | 1 | — | — | 73 | A |
| 2-13 | Formula (4-10) | 1 | SN | 1 | — | — | 65 | A |
| 2-14 | Formula (4-10) | 1 | SBN | 1 | — | — | 70 | A |
| 2-15 | Formula (4-11) | 1 | SN | 1 | — | — | 62 | A |
| 2-16 | Formula (4-9) | 1 | — | — | LiB(CN)$_4$ | 0.2 | 73 | A |
| 2-17 | Formula (5-9) | 1 | SN | 1 | — | — | 59 | B |
| 2-18 | Formula (6-9) | 1 | SN | 1 | — | — | 57 | B |
| 2-19 | — | — | — | — | — | — | 70 | D |
| 2-20 | Formula (4-9) | 1 | — | — | — | — | 59 | C |
| 2-21 | Formula (4-9) | 1 | — | — | — | — | 20 | D |
| 2-22 | Formula (4-9) | 1 | — | — | — | — | 45 | C |
| 2-23 | — | — | SN | 1 | — | — | 50 | C |
| 2-24 | — | — | SN | 2 | — | — | 43 | C |
| 2-25 | Formula (4-9) | 1 | PS | 1 | — | — | 54 | C |

SN: succinonitrile,
ADN: adiponitrile,
SBN: sebaconitrile,
PS: 1,3-propane sultone The same results as in the case (Table 1) of using a carbon material (graphite) as a negative electrode active material were obtained in the case (Table 2) of using a metal-based material (silicon) as a negative electrode active material as well.

In other words, in cases (Experimental Examples 2-1 to 2-18) of using a cyclic nitrogen compound and a nitrile compound together, the voltage hardly remarkably decreased while a decrease in the capacity retention rate was sufficiently suppressed as compared with cases (Experimental Examples 2-19 to 2-25) of not using a cyclic nitrogen compound and a nitrile compound together.

From the results presented in Table 1 and Table 2, it has been found that the cycle characteristics and voltage characteristics are improved when the electrolytic solution contains a nitrile compound together with a cyclic nitrogen of the secondary battery may be, for example, other battery structures such as a rectangular structure and a coin structure.

In addition, a case in which the battery element has a wound structure has been described, but the structure of the battery element in the secondary battery of the present technology is not particularly limited. Specifically, the battery element may have, for example, other structures such as a stacked structure.

In addition, a secondary battery (lithium ion secondary battery) in which the capacity of the negative electrode is obtained by occlusion and release of lithium and a secondary battery (lithium metal secondary battery) in which the capacity of the negative electrode is obtained by precipitation and dissolution of lithium have been described, but the principle of obtaining the capacity of the negative electrode in the secondary battery of the present technology is not particularly limited. Specifically, for example, by setting the capacity of the negative electrode material capable of occluding and releasing lithium to be lower than the capacity of the positive electrode, the secondary battery may be a secondary battery in which the capacity of the negative electrode is obtained from the sum of the capacity due to occlusion and release of lithium and the capacity due to precipitation and dissolution of lithium, and the like.

In addition, a case in which lithium is used as an electrode reactant has been described, but the electrode reactant is not limited to this. The electrode reactant may be, for example, other group 1 elements in the long periodic table such as sodium (Na) and potassium (K), group 2 elements in the long periodic table such as magnesium (Mg) and calcium (Ca), or other light metals such as aluminum (Al). In addition, the electrode reactant may be an alloy containing any one kind or two or more kinds among the series of elements described above.

It should be noted that the effects described in the present description are merely examples and are not intended to be limited, and other effects may be obtained.

In addition, the present technology can also take the following constituent features.

(1)

A secondary battery including:
a positive electrode;
a negative electrode; and
an electrolytic solution containing at least one kind among cyclic nitrogen compounds represented by the following respective formulas (1) to (6) and at least either of a first nitrile compound represented by the following formula (7) or a second nitrile compound represented by the following formula (8).

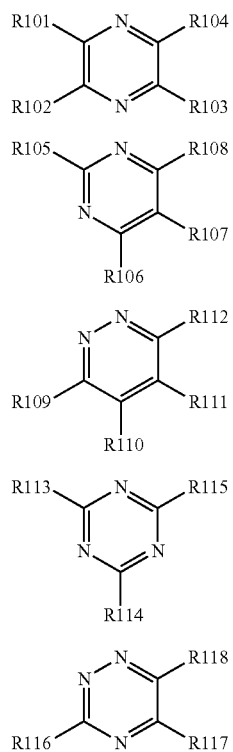

-continued

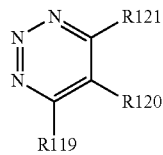

(R101 to R121 each represent any of a hydrogen group (—H), a halogen group, a monovalent hydrocarbon group, a monovalent halogenated hydrocarbon group, or a monovalent group in which two or more kinds of these groups are bonded to each other.)

$$R122\text{—}(\text{CN})_n \quad (7)$$

(R122 represents any of an n-valent hydrocarbon group, an n-valent halogenated hydrocarbon group, an n-valent oxygen-containing group, an n-valent nitrogen-containing group, an n-valent sulfur-containing group, an n-valent phosphorus-containing group, or an n-valent group in which two or more kinds of these groups are bonded to each other. n represents an integer of 1 or more.)

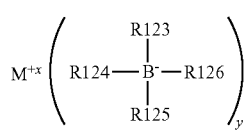

(M represents a metal element. R123 to R126 each represent any of a hydrogen group, a halogen group, a nitrile group (—CN), a monovalent hydrocarbon group, a monovalent halogenated hydrocarbon group, a monovalent oxygen-containing group, a monovalent nitrogen-containing group, a monovalent sulfur-containing group, a monovalent phosphorus-containing group, or a monovalent group in which two or more kinds of these groups are bonded to each other. Provided that at least one of R123 to R126 represents any of a nitrile group, a monovalent group in which a nitrile group and a monovalent hydrocarbon group are bonded to each other, a monovalent group in which a nitrile group and a monovalent halogenated hydrocarbon group are bonded to each other, a monovalent group in which a nitrile group and a monovalent oxygen-containing group are bonded to each other, a monovalent group in which a nitrile group and a monovalent nitrogen-containing group are bonded to each other, a monovalent group in which a nitrile group and a monovalent sulfur-containing group are bonded to each other, a monovalent group in which a nitrile group and a monovalent phosphorus-containing group are bonded to each other, or a monovalent group in which two or more kinds of these groups are bonded to each other. x and y each represent an integer of 1 or more.)

(2)

The second battery according to (1), in which
with regard to the formulas (1) to (6),
the halogen group is any of a fluorine group (—F), a chlorine group (—Cl), a bromine group (—Br), or an iodine group (—I),
the monovalent hydrocarbon group is any of an alkyl group, an alkenyl group, an alkynyl group, a cycloalkyl group, an aryl group, or a monovalent group in which two or more kinds of these groups are bonded to each other, and the monovalent halogenated hydrocarbon group is a group in which at least one hydrogen group in the monovalent hydrocarbon group has been substituted with at least one kind among the halogen groups.

(3)

The second battery according to (1) or (2), in which with regard to the formula (7), the n-valent hydrocarbon group is a group in which n hydrogen groups have been eliminated from a hydrocarbon and the hydrocarbon is any of an alkane, an alkene, an alkyne, an alicyclic hydrocarbon, an aromatic hydrocarbon, or a compound in which two or more kinds of these compounds are bonded to each other, the n-valent halogenated hydrocarbon group is a group in which at least one hydrogen group in the n-valent hydrocarbon group has been substituted with a halogen group, the n-valent oxygen-containing group is either of a group containing oxygen (O) or an n-valent group containing oxygen and at least one kind among hydrogen (H), carbon (C), and a halogen element as constituent elements, the n-valent nitrogen-containing group is either of a group containing nitrogen (N) or an n-valent group containing nitrogen and at least one kind among hydrogen, carbon, oxygen, and a halogen element as constituent elements, the n-valent sulfur-containing group is either of a group containing sulfur (S) or an n-valent group containing sulfur and at least one kind among hydrogen, carbon, oxygen, and a halogen element as constituent elements, the n-valent phosphorus-containing group is any of n-valent groups containing phosphorus (P) and at least one kind among hydrogen, carbon, oxygen, and a halogen element as constituent elements, the halogen group includes at least one kind among a fluorine group, a chlorine group, a bromine group, and an iodine group, and the halogen element includes at least one kind among fluorine (F), chlorine (Cl), bromine (Br), and iodine (I).

(4)

The second battery according to any one of (1) to (3), in which with regard to the formula (8), the metal element is any of lithium (Li), sodium (Na), potassium (K), magnesium (Mg), or calcium (Ca), the halogen group is any of a fluorine group, a chlorine group, a bromine group, or an iodine group, the monovalent hydrocarbon group is any of an alkyl group, an alkenyl group, an alkynyl group, a cycloalkyl group, an aryl group, or a monovalent group in which two or more kinds of these groups are bonded to each other, the monovalent halogenated hydrocarbon group is a group in which at least one hydrogen group in the monovalent hydrocarbon group has been substituted with at least one kind among the halogen groups, the monovalent oxygen-containing group is a monovalent group containing oxygen and at least one kind among hydrogen, carbon, and a halogen element as constituent elements, the monovalent nitrogen-containing group is a monovalent group containing nitrogen and at least one kind among hydrogen, carbon, oxygen, and a halogen element as constituent elements, the monovalent sulfur-containing group is a monovalent group containing sulfur and at least one kind among hydrogen, carbon, oxygen, and a halogen element as constituent elements, the monovalent phosphorus-containing group is a monovalent group containing phosphorus and at least one kind among hydrogen, carbon, oxygen, and a halogen element as constituent elements, and the halogen element includes at least one kind among fluorine, chlorine, bromine, and iodine.

(5)

The secondary battery according to any one of (1) to (4), in which R101 to R121 each represent either of a fluorine group or a monovalent fluorinated hydrocarbon group.

(6)

The secondary battery according to (5), in which the monovalent fluorinated hydrocarbon group is a perfluoroalkyl group, and the perfluoroalkyl group has 1 or more and 3 or less carbon atoms.

(7)

The secondary battery according to any one of (1) to (6), in which

R101 to R121 each represent a fluorine group, or

R101 to R121 each represent a monovalent fluorinated hydrocarbon group.

(8)

The secondary battery according to any one of (1) to (7), in which the first nitrile compound includes a compound represented by the following formula (9).

$$NC-R127-CN \qquad (9)$$

(R127 represents any of a divalent hydrocarbon group, a divalent halogenated hydrocarbon group, a divalent oxygen-containing group, a divalent nitrogen-containing group, a divalent sulfur-containing group, a divalent phosphorus-containing group, or a divalent group in which two or more kinds of these groups are bonded to each other.)

(9)

The secondary battery according to (8), in which

R127 represents an alkylene group, and the alkylene group has 1 or more and 8 or less carbon atoms.

(10)

The secondary battery according to any one of (1) to (9), in which R123 to R126 each represent the nitrile group.

(11)

The secondary battery according to any one of (1) to (10), in which a content of the cyclic nitrogen compound in the electrolytic solution is 0.1 wt % or more and 3 wt % or less, a content of the first nitrile compound in the electrolytic solution is 1 wt % or more and 5 wt % or less, and a content of the second nitrile compound in the electrolytic solution is 0.1 wt % or more and 1 wt % or less.

(12)

The secondary battery according to any one of (1) to (11), in which the negative electrode contains a negative electrode active material, the negative electrode active material contains at least either of a carbon material or a metal-based material, and the metal-based material contains at least either of silicon (Si) or tin (Sn) as a constituent element.

(13)

The secondary battery according to any one of (1) to (12), which is a lithium ion secondary battery.

(14)

An electrolytic solution for secondary battery containing:

at least one kind among cyclic nitrogen compounds represented by the following respective formulas (1) to (6); and at least either of a first nitrile compound represented by the following formula (7) or a second nitrile compound represented by the following formula (8).

[Chem. 29]

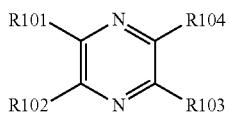
(1)

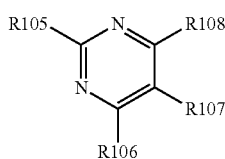
(2)

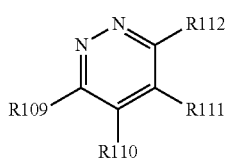
(3)

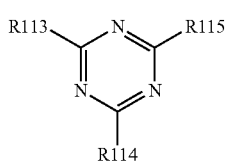
(4)

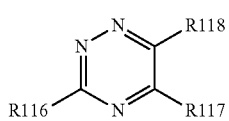
(5)

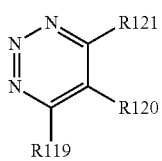
(6)

(R101 to R121 each represent any of a hydrogen group, a halogen group, a monovalent hydrocarbon group, a monovalent halogenated hydrocarbon group, or a monovalent group in which two or more kinds of these groups are bonded to each other.)

R122—(CN)$_n$ (7)

(R122 represents any of an n-valent hydrocarbon group, an n-valent halogenated hydrocarbon group, an n-valent oxygen-containing group, an n-valent nitrogen-containing group, an n-valent sulfur-containing group, an n-valent phosphorus-containing group, or an n-valent group in which two or more kinds of these groups are bonded to each other. n represents an integer of 1 or more.)

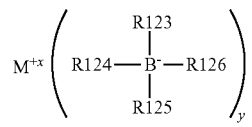
(8)

(M represents a metal element. R123 to R126 each represent any of a hydrogen group, a halogen group, a nitrile group, a monovalent hydrocarbon group, a monovalent halogenated hydrocarbon group, a monovalent oxygen-containing group, a monovalent nitrogen-containing group, a monovalent sulfur-containing group, a monovalent phosphorus-containing group, or a monovalent group in which two or more kinds of these groups are bonded to each other. Provided that at least one of R123 to R126 represents any of a nitrile group, a monovalent group in which a nitrile group and a monovalent hydrocarbon group are bonded to each other, a monovalent group in which a nitrile group and a monovalent halogenated hydrocarbon group are bonded to each other, a monovalent group in which a nitrile group and a monovalent oxygen-containing group are bonded to each other, a monovalent group in which a nitrile group and a monovalent nitrogen-containing group are bonded to each other, a monovalent group in which a nitrile group and a monovalent sulfur-containing group are bonded to each other, a monovalent group in which a nitrile group and a monovalent phosphorus-containing group are bonded to each other, or a monovalent group in which two or more kinds of these groups are bonded to each other. x and y each represent an integer of 1 or more.)

(15)

A battery pack including:

the secondary battery according to any one of (1) to (13);

a control unit which controls operation of the secondary battery; and a switch unit which switches operation of the secondary battery in accordance with an instruction from the control unit.

(16)

An electrically-driven vehicle including:

the secondary battery according to any one of (1) to (13);

a conversion unit which converts electric power supplied from the secondary battery into driving force;

a driving unit which drives in accordance with the driving force; and a control unit which controls operation of the secondary battery.

(17)

An electric power storage system including:

the secondary battery according to any one of (1) to (13);

one or two or more electric devices to which electric power is supplied from the secondary battery; and a control unit which controls electric power supply from the secondary battery to the electric devices.

(18)

An electrically-driven tool including:

the secondary battery according to any one of (1) to (13); and a movable unit to which electric power is supplied from the secondary battery.

(19)

An electronic device including the secondary battery according to any one of (1) to (13) as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
   a positive electrode;
   a negative electrode; and
   an electrolytic solution including at least one kind of cyclic nitrogen compounds represented by chemical formulas (1) to (6) and at least one of a first nitrile compound represented by chemical formula (7) and a second nitrile compound represented by chemical formula (8):

[chemical formulas (1) to (6)]

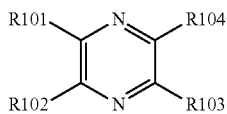 (1)

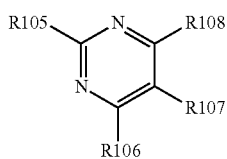 (2)

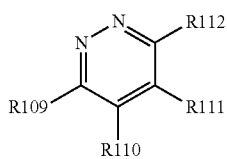 (3)

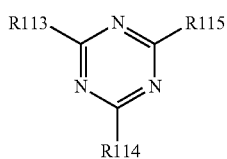 (4)

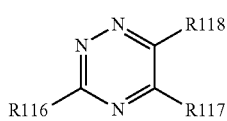 (5)

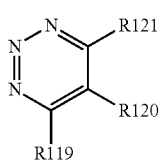 (6)

wherein R101 to R121 each represent one of a hydrogen group, a halogen group, a monovalent hydrocarbon group, a monovalent halogenated hydrocarbon group, or a monovalent group in which two or more kinds of these groups are bonded to each other,

[chemical formula (7)]

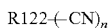 (7)

wherein R122 represents one of an n-valent hydrocarbon group, an n-valent halogenated hydrocarbon group, an n-valent oxygen-containing group, an n-valent nitrogen-containing group, an n-valent sulfur-containing group, an n-valent phosphorus-containing group, or an n-valent group in which two or more kinds of these groups are bonded to each other, and n represents an integer of 1 or more,

[chemical formula (8)]

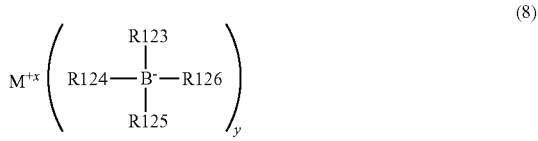 (8)

wherein M represents a metal element, R123 to R126 each represent any of a hydrogen group, a halogen group, a nitrile group, a monovalent hydrocarbon group, a monovalent halogenated hydrocarbon group, a monovalent oxygen-containing group, a monovalent nitrogen-containing group, a monovalent sulfur-containing group, a monovalent phosphorus-containing group, or a monovalent group in which two or more kinds of these groups are bonded to each other, and wherein at least one of R123 to R126 represents one of a nitrile group, a monovalent group in which a nitrile group and a monovalent hydrocarbon group are bonded to each other, a monovalent group in which a nitrile group and a monovalent halogenated hydrocarbon group are bonded to each other, a monovalent group in which a nitrile group and a monovalent oxygen-containing group are bonded to each other, a monovalent group in which a nitrile group and a monovalent nitrogen-containing group are bonded to each other, a monovalent group in which a nitrile group and a monovalent sulfur-containing group are bonded to each other, a monovalent group in which a nitrile group and a monovalent phosphorus-containing group are bonded to each other, or a monovalent group in which two or more kinds of these groups are bonded to each other, and x and y each represent an integer of 1 or more, wherein the first nitrile compound includes a compound represented by chemical formula (9):

[chemical formula (9)]

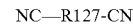 (9)

NC—R127-CN wherein R127 represents one of a divalent hydrocarbon group, a divalent halogenated hydrocarbon group, a divalent oxygen-containing group, a divalent nitrogen-containing group, a divalent sulfur-containing group, a divalent phosphorus-containing group, or a divalent group in which two or more kinds of these groups are bonded to each other.

2. The second battery according to claim 1, wherein with regard to the chemical formulas (1) to (6),
   the halogen group includes one of a fluorine group (—F), a chlorine group (—Cl), a bromine group (—Br), or an iodine group (—I),
   the monovalent hydrocarbon group includes one of an alkyl group, an alkenyl group, an alkynyl group, a cycloalkyl group, an aryl group, or a monovalent group in which two or more kinds of these groups are bonded to each other, and the monovalent halogenated hydrocarbon group includes a group in which at least one hydrogen group in the monovalent hydrocarbon group has been substituted with at least one kind of the halogen groups.

3. The second battery according to claim 1, wherein with regard to the chemical formula (7),
the n-valent hydrocarbon group includes a group in which n hydrogen groups have been eliminated from a hydrocarbon and the hydrocarbon includes one of an alkane, an alkene, an alkyne, an alicyclic hydrocarbon, an aromatic hydrocarbon, or a compound in which two or more kinds of these compounds are bonded to each other,
the n-valent halogenated hydrocarbon group includes a group in which at least one hydrogen group in the n-valent hydrocarbon group has been substituted with a halogen group,
the n-valent oxygen-containing group includes either of a group containing oxygen or an n-valent group containing oxygen and at least one kind of hydrogen, carbon, and a halogen element as constituent elements,
the n-valent nitrogen-containing group includes either of a group containing nitrogen or an n-valent group containing nitrogen and at least one kind of hydrogen, carbon, oxygen, and a halogen element as constituent elements,
the n-valent sulfur-containing group includes either of a group containing sulfur or an n-valent group containing sulfur and at least one kind of hydrogen, carbon, oxygen, and a halogen element as constituent elements,
the n-valent phosphorus-containing group includes one of n-valent groups containing phosphorus and at least one kind of hydrogen, carbon, oxygen, and a halogen element as constituent elements,
the halogen group includes at least one kind of a fluorine group, a chlorine group, a bromine group, and an iodine group, and
the halogen element includes at least one kind of fluorine, chlorine, bromine, and iodine.

4. The second battery according to claim 1, wherein with regard to the chemical formula (8),
the metal element includes one of lithium, sodium, potassium, magnesium, or calcium,
the halogen group includes one of a fluorine group, a chlorine group, a bromine group, or an iodine group,
the monovalent hydrocarbon group includes one of an alkyl group, an alkenyl group, an alkynyl group, a cycloalkyl group, an aryl group, or a monovalent group in which two or more kinds of these groups are bonded to each other,
the monovalent halogenated hydrocarbon group includes a group in which at least one hydrogen group in the monovalent hydrocarbon group has been substituted with at least one kind of the halogen groups,
the monovalent oxygen-containing group includes a monovalent group containing oxygen and at least one kind of hydrogen, carbon, and a halogen element as constituent elements,
the monovalent nitrogen-containing group includes a monovalent group containing nitrogen and at least one kind of hydrogen, carbon, oxygen, and a halogen element as constituent elements,
the monovalent sulfur-containing group includes a monovalent group containing sulfur and at least one kind among hydrogen, carbon, oxygen, and a halogen element as constituent elements,
the monovalent phosphorus-containing group includes a monovalent group containing phosphorus and at least one kind of hydrogen, carbon, oxygen, and a halogen element as constituent elements, and
the halogen element includes at least one kind of fluorine, chlorine, bromine, and iodine.

5. The secondary battery according to claim 1, wherein $R101$ to $R121$ each represent either of a fluorine group or a monovalent fluorinated hydrocarbon group.

6. The secondary battery according to claim 5, wherein the monovalent fluorinated hydrocarbon group includes a perfluoroalkyl group, and
the perfluoroalkyl group has 1 or more and 3 or less carbon atoms.

7. The secondary battery according to claim 1, wherein $R101$ to $R121$ each represent a fluorine group, or
$R101$ to $R121$ each represent a monovalent fluorinated hydrocarbon group.

8. The secondary battery according to claim 1, wherein $R127$ represents an alkylene group, and
the alkylene group has 1 or more and 8 or less carbon atoms.

9. The secondary battery according to claim 1, wherein $R123$ to $R126$ each represent the nitrile group.

10. The secondary battery according to claim 1, wherein
a content of the cyclic nitrogen compound in the electrolytic solution is from 0.1 wt % to 3 wt %,
a content of the first nitrile compound in the electrolytic solution is from 1 wt % to 5 wt %, and
a content of the second nitrile compound in the electrolytic solution is from 0.1 wt % to 1 wt %.

11. The secondary battery according to claim 1, wherein
the negative electrode includes a negative electrode active material,
the negative electrode active material includes at least either of a carbon material or a metal-based material, and
the metal-based material includes at least either of silicon or tin as a constituent element.

12. The secondary battery according to claim 1, wherein the secondary battery includes a lithium ion secondary battery.

13. An electrolytic solution for secondary battery comprising:
at least one kind of cyclic nitrogen compounds represented by chemical formulas (1) to (6); and
at least one of a first nitrile compound represented by chemical formula (7) and a second nitrile compound represented by chemical formula (8):

[chemical formulas (1) to (6)]

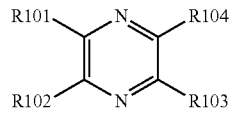
(1)

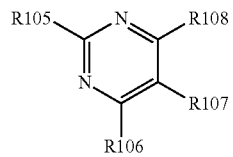
(2)

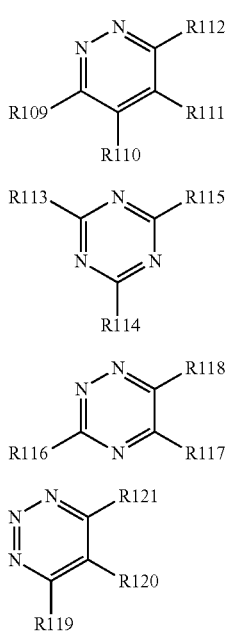

(3)

(4)

(5)

(6)

wherein R101 to R121 each represent one of a hydrogen group, a halogen group, a monovalent hydrocarbon group, a monovalent halogenated hydrocarbon group, or a monovalent group in which two or more kinds of these groups are bonded to each other,

[chemical formula (7)]

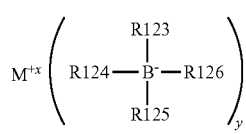

(7)

wherein R122 represents one of an n-valent hydrocarbon group, an n-valent halogenated hydrocarbon group, an n-valent oxygen-containing group, an n-valent nitrogen-containing group, an n-valent sulfur-containing group, an n-valent phosphorus-containing group, or an n-valent group in which two or more kinds of these groups are bonded to each other, and n represents an integer of 1 or more,

[chemical formula (8)]

$$M^{+x}\left(\begin{array}{c} R123 \\ | \\ R124-B^--R126 \\ | \\ R125 \end{array}\right)_y$$ (8)

wherein M represents a metal element, R123 to R126 each represent one of a hydrogen group, a halogen group, a nitrile group, a monovalent hydrocarbon group, a monovalent halogenated hydrocarbon group, a monovalent oxygen-containing group, a monovalent nitrogen-containing group, a monovalent sulfur-containing group, a monovalent phosphorus-containing group, or a monovalent group in which two or more kinds of these groups are bonded to each other, and wherein at least one of R123 to R126 represents any of a nitrile group, a monovalent group in which a nitrile group and a monovalent hydrocarbon group are bonded to each other, a monovalent group in which a nitrile group and a monovalent halogenated hydrocarbon group are bonded to each other, a monovalent group in which a nitrile group and a monovalent oxygen-containing group are bonded to each other, a monovalent group in which a nitrile group and a monovalent nitrogen-containing group are bonded to each other, a monovalent group in which a nitrile group and a monovalent sulfur-containing group are bonded to each other, a monovalent group in which a nitrile group and a monovalent phosphorus-containing group are bonded to each other, or a monovalent group in which two or more kinds of these groups are bonded to each other, and x and y each represent an integer of 1 or more, wherein the first nitrile compound includes a compound represented by chemical formula (9):

[chemical formula (9)]

NC—R127—CN (9)

wherein R127 represents one of a divalent hydrocarbon group, a divalent halogenated hydrocarbon group, a divalent oxygen-containing group, a divalent nitrogen-containing group, a divalent sulfur-containing group, a divalent phosphorus-containing group, or a divalent group in which two or more kinds of these groups are bonded to each other.

14. A battery pack comprising:

a secondary battery;

a controller configured to control operation of the secondary battery; and a switch configured to switch operation of the secondary battery in accordance with an instruction from the controller, wherein the secondary battery includes:

a positive electrode;

a negative electrode; and an electrolytic solution including at least one kind of cyclic nitrogen compounds represented by chemical formulas (1) to (6) and at least one of a first nitrile compound represented by chemical formula (7) and a second nitrile compound represented by chemical formula (8):

[chemical formulas (1) to (6)]

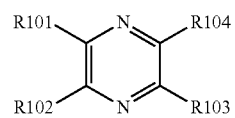

(1)

(2)

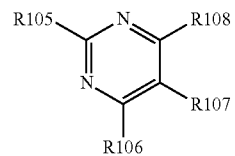

(3)

-continued

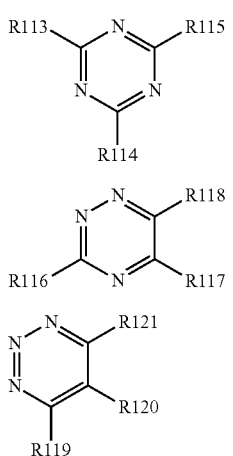

wherein R101 to R121 each represent one of a hydrogen group, a halogen group, a monovalent hydrocarbon group, a monovalent halogenated hydrocarbon group, or a monovalent group in which two or more kinds of these groups are bonded to each other,

[chemical formula (7)]

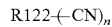 (7)

wherein R122 represents one of an n-valent hydrocarbon group, an n-valent halogenated hydrocarbon group, an n-valent oxygen-containing group, an n-valent nitrogen-containing group, an n-valent sulfur-containing group, an n-valent phosphorus-containing group, or an n-valent group in which two or more kinds of these groups are bonded to each other, and n represents an integer of 1 or more,

[chemical formula (8)]

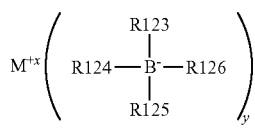 (8)

wherein M represents a metal element, R123 to R126 each represent one of a hydrogen group, a halogen group, a nitrile group, a monovalent hydrocarbon group, a monovalent halogenated hydrocarbon group, a monovalent oxygen-containing group, a monovalent nitrogen-containing group, a monovalent sulfur-containing group, a monovalent phosphorus-containing group, or a monovalent group in which two or more kinds of these groups are bonded to each other, and wherein at least one of R123 to R126 represents one of a nitrile group, a monovalent group in which a nitrile group and a monovalent hydrocarbon group are bonded to each other, a monovalent group in which a nitrile group and a monovalent halogenated hydrocarbon group are bonded to each other, a monovalent group in which a nitrile group and a monovalent oxygen-containing group are bonded to each other, a monovalent group in which a nitrile group and a monovalent nitrogen-containing group are bonded to each other, a monovalent group in which a nitrile group and a monovalent sulfur-containing group are bonded to each other, a monovalent group in which a nitrile group and a monovalent phosphorus-containing group are bonded to each other, or a monovalent group in which two or more kinds of these groups are bonded to each other, and x and y each represent an integer of 1 or more, wherein the first nitrile compound includes a compound represented by chemical formula (9):

[chemical formula (9)]

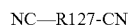 (9)

wherein R127 represents one of a divalent hydrocarbon group, a divalent halogenated hydrocarbon group, a divalent oxygen-containing group, a divalent nitrogen-containing group, a divalent sulfur-containing group, a divalent phosphorus-containing group, or a divalent group in which two or more kinds of these groups are bonded to each other.

15. An electrically-driven vehicle comprising:
the secondary battery according to claim 1;
a converter configured to convert electric power supplied from the secondary battery into driving force;
a driver configured to drive in accordance with the driving force; and
a controller configured to control operation of the secondary battery.

16. An electric power storage system comprising:
the secondary battery according to claim 1;
one or two or more electric devices to which electric power is configured to be supplied from the secondary battery; and
a controller configured to control electric power supply from the secondary battery to the electric devices.

17. An electrically-driven tool comprising:
the secondary battery according to claim 1; and
a movable unit to which electric power is configured to be supplied from the secondary battery.

18. An electronic device comprising the secondary battery according to claim 1 as an electric power supply source.

* * * * *